United States Patent
Walsh et al.

(10) Patent No.: US 10,601,942 B2
(45) Date of Patent: Mar. 24, 2020

(54) SYSTEMS AND METHODS FOR AUTOMATED MODULE-BASED CONTENT PROVISIONING

(71) Applicant: Pearson Management Services Limited

(72) Inventors: James Walsh, Palo Alto, CA (US); Suhail Khaki, Fremont, CA (US)

(73) Assignee: PEARSON MANAGEMENT SERVICES LIMITED, Harlow (GB)

( * ) Notice: Subject to any disclaimer, the term of this patent is extended or adjusted under 35 U.S.C. 154(b) by 6 days.

(21) Appl. No.: 16/020,927

(22) Filed: Jun. 27, 2018

(65) Prior Publication Data

US 2019/0320005 A1    Oct. 17, 2019

Related U.S. Application Data

(60) Provisional application No. 62/656,912, filed on Apr. 12, 2018.

(51) Int. Cl.
*G06F 15/16* (2006.01)
*H04L 29/08* (2006.01)
(Continued)

(52) U.S. Cl.
CPC ........ *H04L 67/2838* (2013.01); *G06F 9/4451* (2013.01); *G06F 9/542* (2013.01);
(Continued)

(58) Field of Classification Search
CPC ............. H04L 67/2838; H04L 41/0803; H04L 41/5051; H04L 41/5054; H04L 41/5096; H04L 63/0254; H04L 63/08; H04L 65/601; H04L 65/608; H04L 67/10; H04L 67/108; H04L 67/141; H04L 67/16; H04L 67/22; H04L 67/306; H04L 67/32; H04L 67/34; H04L 67/02; H04L 67/04; H04L 67/42; G06F 16/40; G06F 16/907; G06F 16/9574; G06F 16/9566; G06F 9/4451; G06F 9/542; G06F 9/546; G06F 9/547; G06F 11/2023; G06F 17/2785; G06N 20/00
(Continued)

(56) References Cited

U.S. PATENT DOCUMENTS

| | | |
|---|---|---|
| 8,607,054 B2 | 12/2013 | Ramarathinam et al. |
| 9,716,617 B1 | 7/2017 | Ahuja et al. |
| 9,781,122 B1 | 11/2017 | Wilson |
| 9,838,376 B1 | 12/2017 | Lander et al. |

(Continued)

*Primary Examiner* — Atta Khan
(74) *Attorney, Agent, or Firm* — Kilpatrick Townsend & Stockton LLP

(57) ABSTRACT

A global architecture (GLP), as disclosed herein, is based on the thin server architectural pattern; it delivers all its services in the form of web services and there are no user interface components executed on the GLP. Each web service exposed by the GLP is stateless, which allows the GLP to be highly scalable. The GLP is further decomposed into components. Each component is a microservice, making the overall architecture fully decoupled. Each microservice has fail-over nodes and can scale up on demand. This means the GLP has no single point of failure, making the platform both highly scalable and available. The GLP architecture provides the capability to build and deploy a microservice instance for each course-recipient-user combination. Because each student interacts with their own microservice, this makes the GLP scale up to the limit of cloud resources available—i.e. near infinity.

20 Claims, 35 Drawing Sheets

(51) Int. Cl.
*G06F 11/20* (2006.01)
*G06F 9/54* (2006.01)
*G06F 16/40* (2019.01)
*G06F 16/957* (2019.01)
*H04L 12/24* (2006.01)
*H04L 29/06* (2006.01)
*G06N 20/00* (2019.01)
*G06F 9/445* (2018.01)
*G06F 16/907* (2019.01)
*G06F 16/955* (2019.01)
*G06F 40/30* (2020.01)

(52) U.S. Cl.
CPC .............. *G06F 9/546* (2013.01); *G06F 9/547* (2013.01); *G06F 11/2023* (2013.01); *G06F 16/40* (2019.01); *G06F 16/907* (2019.01); *G06F 16/9566* (2019.01); *G06F 16/9574* (2019.01); *G06F 40/30* (2020.01); *G06N 20/00* (2019.01); *H04L 41/0803* (2013.01); *H04L 41/5051* (2013.01); *H04L 41/5054* (2013.01); *H04L 41/5096* (2013.01); *H04L 63/0254* (2013.01); *H04L 63/08* (2013.01); *H04L 65/601* (2013.01); *H04L 65/608* (2013.01); *H04L 67/10* (2013.01); *H04L 67/108* (2013.01); *H04L 67/141* (2013.01); *H04L 67/16* (2013.01); *H04L 67/22* (2013.01); *H04L 67/306* (2013.01); *H04L 67/32* (2013.01); *H04L 67/34* (2013.01); *H04L 67/02* (2013.01); *H04L 67/04* (2013.01); *H04L 67/42* (2013.01)

(58) Field of Classification Search
USPC ........................................................ 709/219
See application file for complete search history.

(56) References Cited

U.S. PATENT DOCUMENTS

| | | |
|---|---|---|
| 9,842,045 B2 | 12/2017 | Heorhiadi et al. |
| 10,013,550 B1 | 7/2018 | Ahuja et al. |
| 10,048,830 B2 | 8/2018 | Jose et al. |
| 2002/0073240 A1 | 6/2002 | Kokkinen et al. |
| 2010/0293576 A1 | 11/2010 | Hnyk et al. |
| 2015/0019670 A1 | 1/2015 | Redmann |
| 2015/0067107 A1 | 3/2015 | Larsen et al. |
| 2016/0070787 A1 | 3/2016 | Brezina |
| 2016/0124742 A1 | 5/2016 | Rangasamy et al. |
| 2016/0269926 A1 | 9/2016 | Sundaram |
| 2017/0187785 A1 | 6/2017 | Johnson et al. |
| 2017/0230349 A1 | 8/2017 | Gaur et al. |
| 2017/0364434 A1 | 12/2017 | Kairali et al. |
| 2018/0032534 A1 | 2/2018 | Koerner et al. |
| 2018/0034833 A1 | 2/2018 | Ahuja et al. |
| 2018/0115578 A1 | 4/2018 | Subbarayan et al. |
| 2018/0136931 A1 | 5/2018 | Hendrich et al. |
| 2018/0288129 A1 | 10/2018 | Joshi et al. |
| 2018/0309630 A1 | 10/2018 | Zhao et al. |
| 2018/0357274 A1 | 12/2018 | Vishal |
| 2018/0375712 A1 | 12/2018 | Kröhling et al. |

SYSTEMS AND METHODS FOR AUTOMATED MODULE-BASED CONTENT PROVISIONING

CROSS-REFERENCE TO RELATED APPLICATIONS

This application claims priority to U.S. Provisional Application Ser. No. 62/656,912 filed Apr. 12, 2018 and entitled SYSTEMS AND METHODS FOR MICRO SERVICE-BASED CONTENT PROVISIONING AND DELIVERY; the entirety of which is incorporated herein by reference.

BACKGROUND

A computer network or data network is a telecommunications network which allows computers to exchange data. In computer networks, networked computing devices exchange data with each other along network links (data connections). The connections between nodes are established using either cable media or wireless media. The best-known computer network is the Internet.

Network computer devices that originate, route and terminate the data are called network nodes. Nodes can include hosts such as personal computers, phones, servers as well as networking hardware. Two such devices can be said to be networked together when one device is able to exchange information with the other device, whether or not they have a direct connection to each other.

Computer networks differ in the transmission media used to carry their signals, i.e., the communications protocols to organize network traffic, the network's size, topology and organizational intent. In most cases, communications protocols are layered on other more specific or more general communications protocols, except for the physical layer that directly deals with the transmission media.

BRIEF SUMMARY

A global learning platform (GLP), also referred to herein as a global architecture, as disclosed herein, can be based on the thin server architectural pattern; and can deliver some or all its services in the form of web services; and there can be no user interface components executed on the GLP. Each web service exposed by the GLP can be stateless, which can allow the GLP to be highly scalable. The GLP is further decomposed into components. Each component is a microservice, making the overall architecture fully decoupled. Each microservice has fail-over nodes and can scale up on demand. This means the GLP has no single point of failure, making the platform both highly scalable and available. The GLP architecture provides the capability to build and deploy a microservice instance for each course-recipient-user combination. Because each student interacts with their own microservice, this makes the GLP scale up to the limit of cloud resources available—i.e. near infinity.

One aspect of the present disclosure relates to a system for hybrid content provisioning of remote content stored on a remote content platform and native content stored within the system. The system includes: a memory including: a content library database containing native content; and an asset database containing a plurality of package-data assets each including a link directing to content. In some embodiments, the content includes native content and remote content, which remote content can be stored on the remote content platform. The system can include at least one server. The at least one server can include: a communications microservice; a data packaging module; a model building module; and an engagement delivery module. In some embodiments, each of the data packaging module, the model building module, and the engagement delivery module can send data to the communications microservice and receive a digest from the communications microservice. In some embodiments, the at least one server can: receive first content information associated with first content stored on the remote content platform; package the received first content information into a first package-data asset including a link directing to first content stored on the remote content platform and enrich the first package-data asset with metadata relating to the received first content, which received first content information is packaged and which first package-data asset is enriched via the data packaging module; receive a first content request; identify a first package-data asset associated with remote content; deliver the first package-data asset to a user device; receive a second content request; identify a second package-data asset associated with native content; and deliver the second package-data asset to the user device.

In some embodiments, the first package-data asset is deliverable to the user device subsequent to receipt of an indicator of completion of enriching from the digest from the communications microservice. In some embodiments, the at least one server can: receive second content information associated with the second content, which second content includes native content; package the received second content information into a second package-data asset comprising a link directing to the second content; and enrich the second package-data asset with metadata relating to the second content. In some embodiments, the received second content information is packaged via the data packaging module, and second package-data asset is enriched via the data packaging module.

In some embodiments, the at least one server can: store the first package-data asset and the second package-data asset in the asset database. In some embodiments, the metadata enriching the first package-data asset identifies a first content type and the metadata enriching the second package-data asset identifies a second content type. In some embodiments, the first content type specifies a file type of the first content linked by the first package-data asset and the second content type specifies a file type of the second content linked by the second package-data asset. In some embodiments, the file type of the first content is the same as the file type of the second content. In some embodiments, the at least one server can determine a type of each of the first package-data asset and the second package-data asset.

One aspect of the present disclosure relates to a method for hybrid content provisioning of remote content stored on a remote content platform and native content. The method includes: receiving at least one server first content information associated with first content stored on a remote content platform; packaging with the at least one server the received first content information into a first packaged data-asset including a link directing to content stored on the remote content platform; enriching with the at least one server the first packaged data-asset with metadata relating to the received content; receiving at the server a first content request from a first user device; identifying a first package-data asset associated with remote content; delivering the first package-data asset to the first user device; receiving at the server a second content request from the first user device; identifying a second package-data asset associated with native content; and delivering the second package-data asset to the first user device.

In some embodiments, the at least one server includes: a communications microservice; a data packaging module; a model building module; and an engagement delivery module. In some embodiments, the received first content information is packaged via the data packaging module, and the first package data-asset is enriched via the data packaging module. In some embodiments, each of the data packaging module, the model building module, and the engagement delivery module send data to the communications microservice and receive a digest from the communications microservice.

In some embodiments, the first package-data asset is deliverable to the user device subsequent to receipt of an indicator of completion of enriching from the digest from the communications microservice. In some embodiments, the method includes: receiving second content information associated with the second content, which second content includes native content; packaging the received second content information into a second package-data asset including a link directing to the second content; and enriching the second package-data asset with metadata relating to the second content. In some embodiments, the received second content information is packaged via the data packaging module, and the second package-data asset is enriched via the data packaging module. In some embodiments, the method includes storing the first package-data asset and the second package-data asset in an asset database containing a plurality of package-data assets each enriched with metadata and each including a link directing to associated content.

In some embodiments, the metadata enriching the first package-data asset identifies a first content type and the metadata enriching the second package-data asset identifies a second content type. In some embodiments, the first content type specifies a file type of the first content linked by the first package-data asset and the second content type specifies a file type of the second content linked by the second package-data asset. In some embodiments, the file type of the first content is the same as the file type of the second content. In some embodiments, the method includes: determining a type of each of the first package-data asset and the second package-data asset.

One aspect of the present disclosure relates to a system for stacked microservice based content provisioning. The system includes a memory including: a content library database containing native content; and an asset database including a plurality of package-data assets each containing a link directing to content. In some embodiments, the content includes native content and remote content, which remote content is stored on the remote content platform. The system can include at least one processing resource including: a communications microservice; a data packaging module; a model building module; and an external communication module. In some embodiments, each of the data packaging module and the model building module can send data to the communications microservice and receive a digest from the communications microservice. In some embodiments, each of the modules includes a fail-over node. In some embodiments, the at least one processing resource can: receive a content request from a user device via the external communications module at an engagement delivery module; determine with the engagement delivery module to request information from at least one other module of the at least one processing resource; receive data at the communications microservice from the engagement delivery module, which received data is indicative of requested information; generate and output a digest with the communications microservice including the received data; receive the digest with at least one of the data packaging module; and the model building module; receive requested information at the engagement delivery module; and deliver requested information to a user device for delivery to a user.

In some embodiments, the at least one processing resource can: identify the requested information with the at least one of the data packaging module; and the model building module; and deliver the requested information to the engagement delivery module. In some embodiments, the at least one of the data packaging module; and the model building module can: identify relevant information from within the received digest; and identify the requested information based on the relevant information from within the received digest.

In some embodiments, the at least one processing resource can be a plurality of servers. In some embodiments, the plurality of servers can be arranged to provide each of the modules of the at least one processing resource with at least one fail-over node. In some embodiments, the at least one processing resource is configured such that each of the modules of the at least one processing resource is independently scalable.

In some embodiments, the communications module includes: an inter process communication service microservice; and notification services microservice. In some embodiments, the inter process communication service microservice implements a message passing interface. In some embodiments, the delivered requested information includes at least one package-data asset. In some embodiments, the package-data asset includes metadata and a link to content associated with the package-data asset. In some embodiments, the content associated with the package-data asset is stored remote from the memory and the at least one processing resource. In some embodiments, the engagement delivery module is located in the at least one processing resource. In some embodiments, the engagement delivery module is located on the user device.

One aspect of the present disclosure relates to method for stacked microservice based content provisioning. The method includes: receiving a content request from a user device via an external communications module at an engagement delivery module of at least one processing resource; determining with the engagement delivery module to request information from at least one other module of the at least one processing resource; receiving data at a communications microservice from the engagement delivery module, which received data is indicative of requested information; generating and outputting a digest with the communications microservice, the digest including the received data; receiving the digest with at least one of a data packaging module; and a model building module; receiving requested information at the engagement delivery module; and delivering requested information to a user device for delivery to a user.

In some embodiments, the method includes: requesting information from at least one other module of the at least one processing resource; identifying the requested information with the at least one of the data packaging module; and the model building module; and delivering the requested information to the engagement delivery module. In some embodiments, the at least one of the data packaging module; and the model building module can: identify relevant information from within the received digest; and identify the requested information based on the relevant information from within the received digest.

In some embodiments, the at least one processing resource includes a plurality of servers. In some embodiments, the plurality of servers are arranged to provide each of the modules of the at least one processing resource with at least one fail-over node. In some embodiments, each of the modules of the at least one processing resource is independently scalable.

In some embodiments, the delivered requested information includes at least one package-data asset. In some embodiments, the package-data asset includes metadata and a link to content associated with the package-data asset. In some embodiments, the content associated with the package-data asset is stored remote from the memory and the at least one processing resource. In some embodiments, the engagement delivery module is located on the user device.

One aspect of the present disclosure relates to a system for redundant content communications. The system includes a memory including an asset database containing a plurality of package-data assets each containing a link directing to content. In some embodiments, the content can native content and/or can be remote content. In some embodiments, the remote content is stored on a remote content platform. The system can include at least one server. The at least one server can include: a communications microservice; a data packaging module; a model building module; and an engagement delivery module. In some embodiments, each of the data packaging module, the model building module, and the engagement delivery module can send data to the communications microservice and receive a digest from the communications microservice. In some embodiments, the at least one server can: receive a connection request at the least one server from a user device; allow connection with the user device; establish a first connection with the user device via a first API, which first API receives data from the user device and provides data to the user device; establish a second connection with the user device via a second API, which second API receives data from the user device, and which data received by the second API from the user device is at least partially redundant to data received by the first API from the user device.

In some embodiments, the connection request comprises a unique user identifier. In some embodiments, the data received from the user device by the first API includes response and request information. In some embodiments, the data received from the user device by the second API includes user activity information. In some embodiments, the user activity information includes response information and request information.

In some embodiments, the at least one server can: ingest stream of activity information with the second API; and generate events from the stream of activity information with the second API. In some embodiments, the at least one server can push the generated events to recipient microservices. In some embodiments, the second connection is established via receipt of a token from the user device and validation of the token. In some embodiments, the at least one server can: receive a user input via the first API, wherein the user input identifies a state of the user; and provide a response to the user device via the first API based in part on the state identified in the user input. In some embodiments, the first API is stateless.

One aspect of the present disclosure relates to a method of redundant content communications. The method includes: receiving a connection request at at least one server from a user device; allowing connection with the user device; establishing a first connection with the user device via a first API, which first API receives data from the user device and provides data to the user device; establishing a second connection with the user device via a second API, which second API receives data from the user device, and which data received by the second API from the user device is at least partially redundant to data received by the first API from the user device.

In some embodiments, the connection request can be a unique user identifier. In some embodiments, the data received from the user device by the first API includes response and request information. In some embodiments, the data received from the user device by the second API includes user activity information. In some embodiments, the user activity information includes response information and request information.

In some embodiments, the method includes: ingesting stream of activity information with the second API; and generating events from the stream of activity information with the second API. In some embodiments, the method includes pushing the generated events to recipient microservices. In some embodiments, the second connection is established via receipt of a token from the user device and validation of the token. In some embodiments, the method includes: receiving a user input via the first API, which user input identifies a state of the user; and providing a response to the user device via the first API based in part on the state identified in the user input. In some embodiments, the first API is stateless.

One aspect of the present disclosure relates to a system for automatic generation of a package-data asset. The system includes a memory including an asset database containing a plurality of package-data assets each including a link directing to content. In some embodiments, the content can be remote content. In some embodiments, the remote content is stored on a remote content platform. The system can include at least one server communicatingly coupled with the memory. The at least one server including a data packaging microservice. In some embodiments, the data packaging microservice can: receive at least one server first content information associated with first content; parse the received first content information; extract semantic elements from the received first content information, which semantic elements are embedded in the received first content information; package the received first content information into a first package-data asset including a link directing to the first content; and enrich the first package-data asset with metadata relating to the first content.

In some embodiments, the data packaging microservice includes: a semantic enricher; an asset manager; and a resource manager. In some embodiments, the semantic enricher can extract the semantic elements from the received first content information and enrich the first package-data asset. In some embodiments, the first content information includes metadata associated with a piece of content. In some embodiments, the first content information identifies a location of content associated with the first content information. In some embodiments, information identifying a location can includes at least one of a directory path; and a uniform resource locator.

In some embodiments, the received content information is parsed by a natural language processing algorithm. In some embodiments, the at least one server can store the first package data asset in the memory. In some embodiments, the data packaging microservice is communicatingly coupled with a recipient-user microservice that can deliver content associated with the package data asset to a user. In some embodiments, the recipient-user microservice is customized to the user.

One aspect of the present disclosure relates to a method of automatic generation of a package-data asset. The method includes: receiving at a data packaging microservice of at least one server first content information associated with first content; parsing the received first content information; extracting semantic elements from the received first content information, which semantic elements are embedded in the received first content information; packaging the received first content information into a first package-data asset containing a link directing to the first content; and enriching the first package-data asset with metadata relating to the first content.

In some embodiments, the data packaging microservice includes: a semantic enricher; an asset manager; and a resource manager. In some embodiments, the semantic enricher can extract the semantic elements from the received first content information and enrich the first package-data asset. In some embodiments, the first content information includes metadata associated with a piece of content. In some embodiments, the first content information identifies a location of content associated with the first content information.

In some embodiments, information identifying a location can include at least one of a directory path; and a uniform resource locator. In some embodiments, the received content information is parsed by a natural language processing algorithm. In some embodiments, the method includes storing the first package data asset in a memory. In some embodiments, the data packaging microservice is communicatingly coupled with a recipient-user microservice configured to delivery content associated with the package data asset to a user. In some embodiments, the method includes generating the recipient-user microservice for the user.

One embodiment of the present disclosure relates to a system for hybrid content graph creation. The system includes a memory including: an asset database containing a plurality of package-data assets each including a link directing to content, at least some of the content is stored on a remote content platform; and a capability database including information identifying capabilities of a plurality of microservices. The system can include at least one server including the plurality of microservices. The at least one server can: identify a set of package-data assets from the asset database of the memory; retrieve a content model associated with the set of package-data assets; automatically determine a sequencing of package-data assets in the set of package-data assets, which sequencing is partially adaptive-based and partially non-adaptive-based; and generate a graphical representation of the set of package-data assets based on the determined sequencing.

In some embodiments, the content model is retrieved from the memory. In some embodiments, the at least one server can identify a first group including at least some of the set of package-data assets as having a first asset type and identify a second group including at least some of the set of package-data assets as having a second asset type. In some embodiments, the at least some of the set of package-data assets included in the first group are different than the at least some of the set of package-data assets included in the second group. In some embodiments, the first asset type includes content-type package-data assets and the second asset type includes non-content-type package-data assets.

In some embodiments, the at least one server can: (a) select a one of the package-data assets in the set of package-data assets; (b) determine a sequencing type for the selected one of the package-data assets, which sequencing type identifies at least one of adaptive sequencing, non-adaptive sequencing, and partially adaptive sequencing; and repeat (a) and (b) until a sequencing type for all of package-data assets in the set of package data assets is determined. In some embodiments, determining the sequencing includes, for non-adaptive package-data assets: retrieving sequencing information; and sequencing the non-adaptive package-data assets according to the retrieved sequencing information. In some embodiments, determining the sequencing includes, for the adaptive package-data assets: determining a skill level for package-data assets having and adaptive sequencing type; and identifying prerequisite relationships between the package-data assets. In some embodiments, the at least one server can store non-content type package-data assets in the memory. In some embodiments, the at least one server can link content-type package-data assets and non-content-type package-data assets.

One aspect of the present disclosure relates to a method of automatic hybrid content graph creation. The method includes: identifying a set of package-data assets; retrieving a content model associated with the set of package-data assets; automatically determining an initial sequencing of package-data assets in the set of package-data assets, which sequencing is partially adaptive-based and partially non-adaptive-based; and generating a graphical representation of the set of package-data assets based on the determined sequencing.

In some embodiments, the content model is retrieved from a memory. In some embodiments, the method includes identifying a first group including at least some of the set of package-data assets as having a first asset type and identifying a second group including at least some of the set of package-data assets as having a second asset type. In some embodiments, the at least some of the set of package-data assets included in the first group are different than the at least some of the set of package-data assets included in the second group. In some embodiments, the first asset type includes content-type package-data assets and the second asset type includes non-content-type package-data assets.

In some embodiments, the method includes: (a) selecting a one of the package-data assets in the set of package-data assets; (b) determining a sequencing type for the selected one of the package-data assets. In some embodiments, the sequencing type identifies at least one of adaptive sequencing, non-adaptive sequencing, and partially adaptive sequencing. In some embodiments, the method includes repeating (a) and (b) until a sequencing type for all of package-data assets in the set of package data assets is determined. In some embodiments, determining the sequencing includes, for non-adaptive package-data assets: retrieving sequencing information; and sequencing the non-adaptive package-data assets according to the retrieved sequencing information. In some embodiments, determining the sequencing includes, for the adaptive package-data assets: determining a skill level for package-data assets having and adaptive sequencing type; and identifying prerequisite relationships between the package-data assets. In some embodiments, the method includes storing non-content type package-data assets in the memory. In some embodiments, the method includes linking content-type package-data assets and non-content-type package-data assets.

One aspect of the present disclosure relates to a system for automated personalized microservice generation. The system includes a memory including: a custom microservice database including data identifying generated customized microservices and associated users;

and an asset database including a plurality of package-data assets. The system can include and at least one server including an engagement delivery microservice. In some embodiments, the engagement delivery microservice includes a microservices builder module. In some embodiments, the at least one server can: receive a content request identifying requested content from a user device; determine prior creation of a custom user microservice corresponding to the content request; retrieve package-data asset information relevant to the content request; create a new microservice when a custom user microservice was not previously created, which new microservice corresponds to the received content request; and deliver the requested content to the user device via the new microservice.

In some embodiments, the content request identifies a user, requested content, and a content group. In some embodiments, the at least one server can identify capability requirements associated with the content request. In some embodiments, the capability requirements correspond to a content type of the requested content. In some embodiments, delivering the requested content to the user device includes rendering the requested content with the new microservice.

In some embodiments, the at least one server can direct downloading of the new microservice to the user device. In some embodiments, the downloading of the new microservice to the user device includes creation of a copy of the new microservice on the user device. In some embodiments, the new microservice includes an independent recommendation engine. In some embodiments, the independent recommendation engine includes a machine-learning algorithm trained to identify next content based on an attribute of the next content and of the user. In some embodiments, the new microservice is specific to the user and to the content group.

One aspect of the present disclosure relates to a method of automated personalized microservice generation. The method includes: receiving at least one server a content request identifying requested content from a user device; determining prior creation of a custom user microservice corresponding to the content request; retrieving package-data asset information relevant to the content request; creating with the at least one server a new microservice when a custom user microservice was not previously created, which new microservice corresponds to the received content request; and delivering the requested content to the user device via the new microservice.

In some embodiments, the content request identifies a user, requested content, and a content group. In some embodiments, the method includes identifying capability requirements associated with the content request. In some embodiments, the capability requirements correspond to a content type of the requested content. In some embodiments, delivering the requested content to the user device includes rendering the requested content with the new microservice.

In some embodiments, the method includes directing downloading of the new microservice to the user device. In some embodiments, the downloading of the new microservice to the user device includes creation of a copy of the new microservice on the user device. In some embodiments, the new microservice includes an independent recommendation engine. In some embodiments, the independent recommendation engine includes a machine-learning algorithm trained to identify next content based on an attribute of the next content and of the user. In some embodiments, the new microservice is specific to the user and to the content group.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
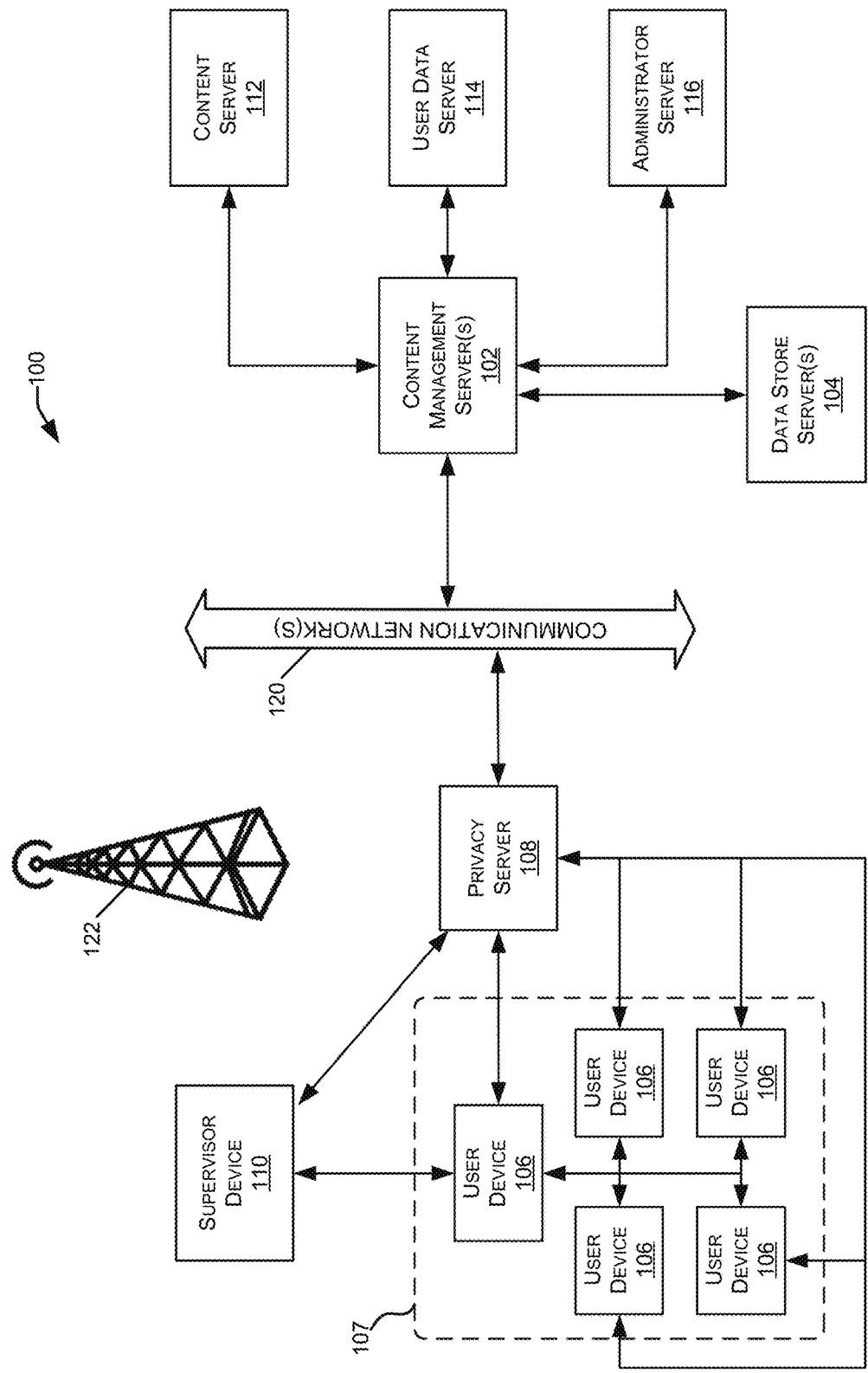
FIG. 1 is a block diagram illustrating an example of a content distribution network.

With reference now to FIG. 1, a block diagram is shown illustrating various components of a content distribution network (CDN) 100 which implements and supports certain embodiments and features described herein. In some embodiments, the content distribution network 100 can comprise one or several physical components and/or one or several virtual components such as, for example, one or several cloud computing components. In some embodiments, the content distribution network 100 can comprise a mixture of physical and cloud computing components.

Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing unit, memory systems, hard drives, network interfaces, power supplies, etc. Content management server 102 may include one or more server farms, clusters, or any other appropriate arrangement and/or combination of computer servers. Content management server 102 may act according to stored instructions located in a memory subsystem of the server 102, and may run an operating system, including any commercially available server operating system and/or any other operating systems discussed herein.

The content distribution network 100 may include one or more data store servers 104, such as database servers and file-based storage systems. The database servers 104 can access data that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the database server 104, and particularly, the tier 0 storage is the fastest storage that is not RAM or cache memory. In some embodiments, the tier 0 memory can be embodied in solid state memory such as, for example, a solid-state drive (SSD) and/or flash memory.

In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks. These hard disks can be one or both of physically or communicatingly connected such as, for example, by one or several fiber channels. In some embodiments, the one or several disks can be arranged into a disk storage system, and specifically can be arranged into an enterprise class disk storage system. The disk storage system can include any desired level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives or one or several NL-SATA drives.

In some embodiments, the one or several hardware and/or software components of the database server 104 can be arranged into one or several storage area networks (SAN), which one or several storage area networks can be one or several dedicated networks that provide access to data storage, and particularly that provide access to consolidated, block level data storage. A SAN typically has its own network of storage devices that are generally not accessible through the local area network (LAN) by other devices. The SAN allows access to these devices in a manner such that these devices appear to be locally attached to the user device.

Data stores 104 may comprise stored data relevant to the functions of the content distribution network 100. Illustrative examples of data stores 104 that may be maintained in certain embodiments of the content distribution network 100 are described below in reference to FIG. 3. In some embodiments, multiple data stores may reside on a single server 104, either using the same storage components of server 104 or using different physical storage components to assure data security and integrity between data stores. In other embodiments, each data store may have a separate dedicated data store server 104.

Content distribution network 100 also may include one or more user devices 106 and/or supervisor devices 110. User devices 106 and supervisor devices 110 may display content received via the content distribution network 100, and may support various types of user interactions with the content. User devices 106 and supervisor devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as thin-client computers, Internet-enabled gaming systems, business or home appliances, and/or personal messaging devices, capable of communicating over network(s) 120.

In different contexts of content distribution networks 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location 107, such as a classroom or conference room. In such cases, the devices may contain components that support direct communications with other nearby devices, such as a wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 114, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, content server 112 may include data stores of training materials, presentations, plans, syllabi, reviews, evaluations, interactive programs and simulations, course models, course outlines, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including his or her user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content distribution network 100. For example, the administrator server 116 may monitor device status and performance for the various servers, data stores, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

The content distribution network 100 may include one or several navigation systems or features including, for example, the Global Positioning System ("GPS"), GALILEO, or the like, or location systems or features including, for example, one or several transceivers that can determine location of the one or several components of the content distribution network 100 via, for example, triangulation. All of these are depicted as navigation system 122.

In some embodiments, navigation system 122 can include one or several features that can communicate with one or several components of the content distribution network 100 including, for example, with one or several of the user devices 106 and/or with one or several of the supervisor devices 110. In some embodiments, this communication can include the transmission of a signal from the navigation system 122 which signal is received by one or several components of the content distribution network 100 and can be used to determine the location of the one or several components of the content distribution network 100.

Figure 2:
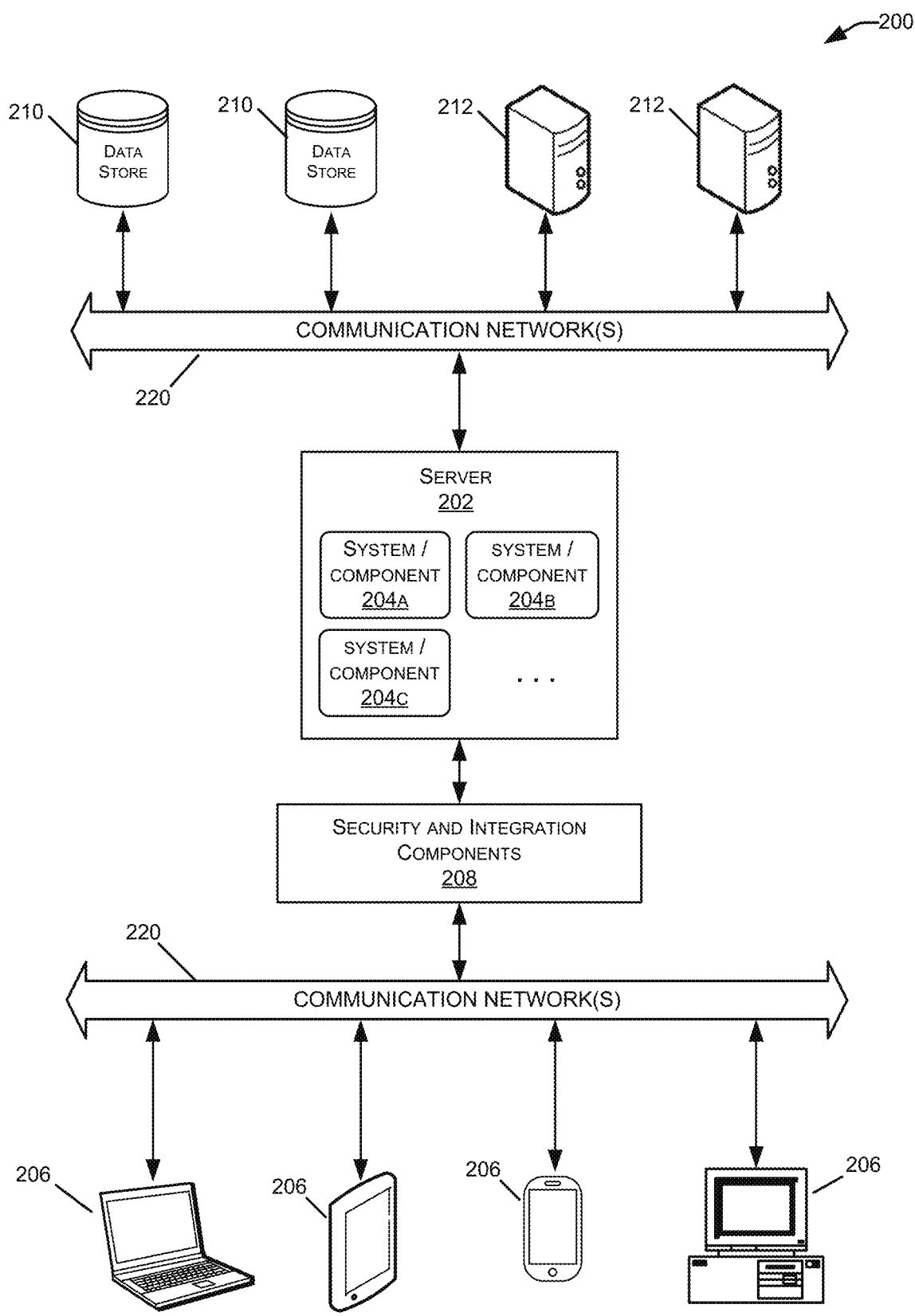
FIG. 2 is a block diagram illustrating a computer server and computing environment within a content distribution network.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser-based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of the same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. Some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using REST over HTTPS with the OAuth open standard for authentication, or using the WS-Security standard which provides for secure SOAP messages using XML, encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as public switched telephone networks (PSTNs), or virtual networks such as an intranet or an extranet. Infrared and wireless networks (e.g., using the Institute of Electrical and Electronics (IEFE) 802.11 protocol suite or other wireless protocols) also may be included in networks 220.

Computing environment 200 also may include one or more data stores 210 and/or back-end servers 212. In certain examples, the data stores 210 may correspond to data store server(s) 104 discussed above in FIG. 1, and back-end servers 212 may correspond to the various back-end servers 112-116. Data stores 210 and servers 212 may reside in the same datacenter or may operate at a remote location from server 202. In some cases, one or more data stores 210 may reside on a non-transitory storage medium within the server 202. Other data stores 210 and back-end servers 212 may be remote from server 202 and configured to communicate with server 202 via one or more networks 220. In certain embodiments, data stores 210 and back-end servers 212 may reside in a storage-area network (SAN), or may use storage-as-a-service (STaaS) architectural model.

Figure 3:
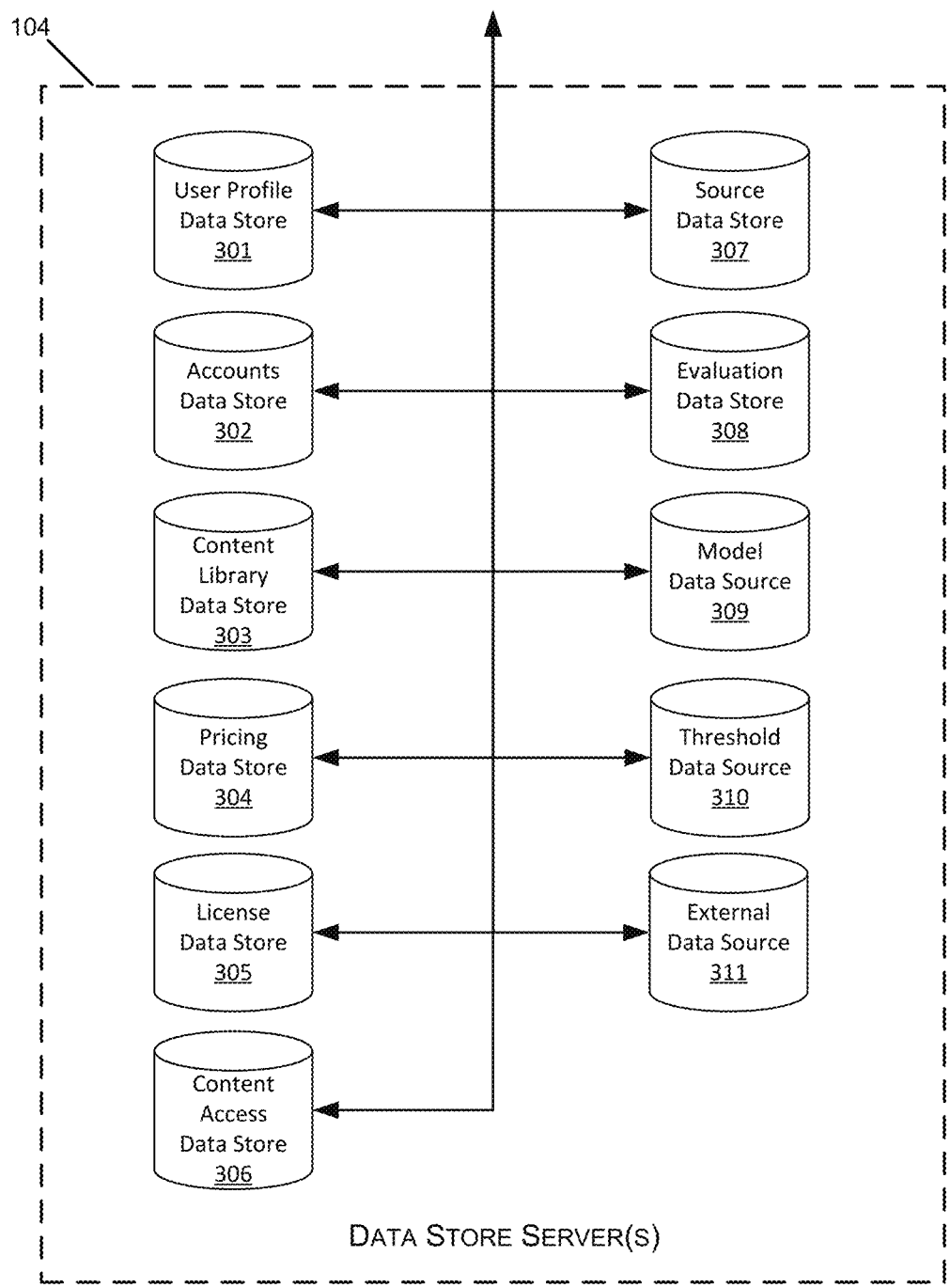
FIG. 3 is a block diagram illustrating an embodiment of one or more data store servers within a content distribution network.

With reference to FIG. 3, an illustrative set of data stores and/or data store servers is shown, corresponding to the data store servers 104 of the content distribution network 100 discussed above in FIG. 1. One or more individual data stores 301-311 may reside in storage on a single computer server 104 (or a single server farm or cluster) under the control of a single entity, or may reside on separate servers operated by different entities and/or at remote locations. In some embodiments, data stores 301-311 may be accessed by the content management server 102 and/or other devices and servers within the network 100 (e.g., user devices 106, supervisor devices 110, administrator servers 116, etc.). Access to one or more of the data stores 301-311 may be limited or denied based on the processes, user credentials, and/or devices attempting to interact with the data store.

The paragraphs below describe examples of specific data stores that may be implemented within some embodiments of a content distribution network 100. It should be understood that the below descriptions of data stores 301-311, including their functionality and types of data stored therein, are illustrative and non-limiting. Data stores server architecture, design, and the execution of specific data stores 301-311 may depend on the context, size, and functional requirements of a content distribution network 100. For example, in content distribution systems 100 used for professional training and educational purposes, separate databases or file-based storage systems may be implemented in data store server(s) 104 to store trainee and/or student data, trainer and/or professor data, training module data and content descriptions, training results, evaluation data, and the like. In contrast, in content distribution systems 100 used for media distribution from content providers to subscribers, separate data stores may be implemented in data stores server(s) 104 to store listings of available content titles and descriptions, content title usage statistics, subscriber profiles, account data, payment data, network usage statistics, etc.

A user profile data store 301, also referred to herein as a user profile database 301, may include information relating to the end users within the content distribution network 100. This information may include user characteristics such as the user names, access credentials (e.g., logins and passwords), user preferences, and information relating to any previous user interactions within the content distribution network 100 (e.g., requested content, posted content, content modules completed, training scores or evaluations, other associated users, etc.). In some embodiments, this information can relate to one or several individual end users such as, for example, one or several students, teachers, administrators, or the like, and in some embodiments, this information can relate to one or several institutional end users such as, for example, one or several schools, groups of schools such as one or several school districts, one or several colleges, one or several universities, one or several training providers, or the like. In some embodiments, this information can identify one or several user memberships in one or several groups such as, for example, a student's membership in a university, school, program, grade, course, class, or the like.

The user profile database 301 can include information relating to a user's status, location, or the like. This information can identify, for example, a device a user is using, the location of that device, or the like. In some embodiments, this information can be generated based on any location detection technology including, for example, a navigation system 122, or the like.

Information relating to the user's status can identify, for example, logged-in status information that can indicate whether the user is presently logged-in to the content distribution network 100 and/or whether the log-in-is active. In some embodiments, the information relating to the user's status can identify whether the user is currently accessing content and/or participating in an activity from the content distribution network 100.

In some embodiments, information relating to the user's status can identify, for example, one or several attributes of the user's interaction with the content distribution network 100, and/or content distributed by the content distribution network 100. This can include data identifying the user's interactions with the content distribution network 100, the content consumed by the user through the content distribution network 100, or the like. In some embodiments, this can include data identifying the type of information accessed through the content distribution network 100 and/or the type of activity performed by the user via the content distribution network 100, the lapsed time since the last time the user accessed content and/or participated in an activity from the content distribution network 100, or the like. In some embodiments, this information can relate to a content program comprising an aggregate of data, content, and/or activities, and can identify, for example, progress through the content program, or through the aggregate of data, content, and/or activities forming the content program. In some embodiments, this information can track, for example, the amount of time since participation in and/or completion of one or several types of activities, the amount of time since communication with one or several supervisors and/or supervisor devices 110, or the like.

In some embodiments in which the one or several end users are individuals, and specifically are students, the user profile database 301 can further include information relating to these students' academic and/or educational history. This information can identify one or several courses of study that the student has initiated, completed, and/or partially completed, as well as grades received in those courses of study. In some embodiments, the student's academic and/or educational history can further include information identifying student performance on one or several tests, quizzes, and/or assignments. In some embodiments, this information can be stored in a tier of memory that is not the fastest memory in the content delivery network 100.

The user profile database 301 can include information relating to one or several student learning preferences. In some embodiments, for example, the user, also referred to herein as the student or the student-user may have one or several preferred learning styles, one or several most effective learning styles, and/or the like. In some embodiments, the student's learning style can be any learning style describing how the student best learns or how the student prefers to learn. In one embodiment, these learning styles can include, for example, identification of the student as an auditory learner, as a visual learner, and/or as a tactile learner. In some embodiments, the data identifying one or several student learning styles can include data identifying a learning style based on the student's educational history such as, for example, identifying a student as an auditory learner when the student has received significantly higher grades and/or scores on assignments and/or in courses favorable to auditory learners. In some embodiments, this information can be stored in a tier of memory that is not the fastest memory in the content delivery network 100.

In some embodiments, the user profile data store 301 can further include information identifying one or several user skill levels. In some embodiments, these one or several user skill levels can identify a skill level determined based on past performance by the user interacting with the content delivery network 100, and in some embodiments, these one or several user skill levels can identify a predicted skill level determined based on past performance by the user interacting with the content delivery network 100 and one or several predictive models.

The user profile database 301 can further include information relating to one or several teachers and/or instructors who are responsible for organizing, presenting, and/or managing the presentation of information to the student. In some embodiments, user profile database 301 can include information identifying courses and/or subjects that have been taught by the teacher, data identifying courses and/or subjects currently taught by the teacher, and/or data identifying courses and/or subjects that will be taught by the teacher. In some embodiments, this can include information relating to one or several teaching styles of one or several teachers. In some embodiments, the user profile database 301 can further include information indicating past evaluations and/or evaluation reports received by the teacher. In some embodiments, the user profile database 301 can further include information relating to improvement suggestions received by the teacher, training received by the teacher, continuing education received by the teacher, and/or the like. In some embodiments, this information can be stored in a tier of memory that is not the fastest memory in the content delivery network 100.

The user profile database 301 can include a microservice sub-database. The microservice sub-database can include information identifying one or several custom user microservices, also referred to herein as learner microservices. In some embodiments, these learner microservices can form a part of the learning engagement delivery microservice 1020 to be discussed at greater length below. In some embodiments, for example, a custom user microservice can be generated for each user, such that each user has a unique custom user microservice. In some embodiments, a custom user microservice can be generated for each unique combination of course and user such that if a first user was enrolled in a first course and a second course, a first custom user microservice would be generated for the first user in the first course and a second custom user microservice would be generated for the first user in the second course.

An accounts data store 302, also referred to herein as an accounts database 302, may generate and store account data for different users in various roles within the content distribution network 100. For example, accounts may be created in an accounts data store 302 for individual end users, supervisors, administrator users, and entities such as companies or educational institutions. Account data may include account types, current account status, account characteristics, and any parameters, limits, restrictions associated with the accounts.

A content library data store 303, also referred to herein as a content library database 303, may include information describing the individual content items (or content resources or data packets) available via the content distribution network 100. In some embodiments, these data packets in the content library database 303 can be linked to form an object network. In some embodiments, these data packets can be linked in the object network according to one or several prerequisite relationships that can, for example, identify the relative hierarchy and/or difficulty of the data objects. In some embodiments, this hierarchy of data objects can be generated by the content distribution network 100 according to user experience with the object network, and in some embodiments, this hierarchy of data objects can be generated based on one or several existing and/or external hierarchies such as, for example, a syllabus, a table of contents, or the like. In some embodiments, for example, the object network can correspond to a syllabus such that content for the syllabus is embodied in the object network.

In some embodiments, the content library data store 303 can comprise a syllabus, a schedule, or the like. In some embodiments, the syllabus or schedule can identify one or several tasks and/or events relevant to the user. In some embodiments, for example, when the user is a member of a group such as a section or a class, these tasks and/or events relevant to the user can identify one or several assignments, quizzes, exams, or the like.

In some embodiments, the library data store 303 may include metadata, properties, and other characteristics associated with the content resources stored in the content server 112. Such data may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library data store 303 may be configured to allow updating of content metadata or properties, and to allow the addition and/or removal of information relating to the content resources. For example, content relationships may be implemented as graph structures, which may be stored in the library data store 303 or in an additional store for use by selection algorithms along with the other metadata.

In some embodiments, the content library data store 303 can contain information used in evaluating responses received from users. In some embodiments, for example, a user can receive content from the content distribution network 100 and can, subsequent to receiving that content, provide a response to the received content. In some embodiments, for example, the received content can comprise one or several questions, prompts, or the like, and the response to the received content can comprise an answer to those one or several questions, prompts, or the like. In some embodiments, information, referred to herein as "comparative data," from the content library data store 303 can be used to determine whether the responses are the correct and/or desired responses.

In some embodiments, the content library database 303 and/or the user profile database 301 can comprise an aggregation network, also referred to herein as a content network or content aggregation network. The aggregation network can comprise a plurality of content aggregations that can be linked together by, for example: creation by common user; relation to a common subject, topic, skill, or the like; creation from a common set of source material such as source data packets; or the like. In some embodiments, the content aggregation can comprise a grouping of content comprising the presentation portion that can be provided to the user in the form of, for example, a flash card and an extraction portion that can comprise the desired response to the presentation portion such as for example, an answer to a flash card. In some embodiments, one or several content aggregations can be generated by the content distribution network 100 and can be related to one or several data packets that can be, for example, organized in object network. In some embodiments, the one or several content aggregations can be each created from content stored in one or several of the data packets.

In some embodiments, the content aggregations located in the content library database 303 and/or the user profile database 301 can be associated with a user-creator of those content aggregations. In some embodiments, access to content aggregations can vary based on, for example, whether a user created the content aggregations. In some embodiments, the content library database 303 and/or the user profile database 301 can comprise a database of content aggregations associated with a specific user, and in some embodiments, the content library database 303 and/or the user profile database 301 can comprise a plurality of databases of content aggregations that are each associated with a specific user. In some embodiments, these databases of content aggregations can include content aggregations created by their specific user and, in some embodiments, these databases of content aggregations can further include content aggregations selected for inclusion by their specific user and/or a supervisor of that specific user. In some embodiments, these content aggregations can be arranged and/or linked in a hierarchical relationship similar to the data packets in the object network and/or linked to the object network in the object network or the tasks or skills associated with the data packets in the object network or the syllabus or schedule.

In some embodiments, the content aggregation network, and the content aggregations forming the content aggregation network can be organized according to the object network and/or the hierarchical relationships embodied in the object network. In some embodiments, the content aggregation network, and/or the content aggregations forming the content aggregation network can be organized according to one or several tasks identified in the syllabus, schedule or the like.

A pricing data store 304 may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee, or pricing based on network usage. In other cases, pricing may be tied to specific content resources. Certain content resources may have associated pricing information, whereas other pricing determinations may be based on the resources accessed, the profiles and/or accounts of the user, and the desired level of access (e.g., duration of access, network speed, etc.). Additionally, the pricing data store 304 may include information relating to compilation pricing for groups of content resources, such as group prices and/or price structures for groupings of resources.

A license data store 305 may include information relating to licenses and/or licensing of the content resources within the content distribution network 100. For example, the license data store 305 may identify licenses and licensing terms for individual content resources and/or compilations of content resources in the content server 112, the rights holders for the content resources, and/or common or large-scale right holder information such as contact information for rights holders of content not included in the content server 112.

A content access data store 306 may include access rights and security information for the content distribution network 100 and specific content resources. For example, the content access data store 306 may include login information (e.g., user identifiers, logins, passwords, etc.) that can be verified during user login attempts to the network 100. The content access data store 306 also may be used to store assigned user roles and/or user levels of access. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source data store 307 may include information relating to the source of the content resources available via the content distribution network. For example, a source data store 307 may identify the authors and originating devices of content resources, previous pieces of data and/or groups of data originating from the same authors or originating devices, and the like.

An evaluation data store 308 may include information used to direct the evaluation of users and content resources in the content management network 100. In some embodiments, the evaluation data store 308 may contain, for example, the analysis criteria and the analysis guidelines for evaluating users (e.g., trainees/students, gaming users, media content consumers, etc.) and/or for evaluating the content resources in the network 100. The evaluation data store 308 also may include information relating to evaluation processing tasks, for example, the identification of users and user devices 106 that have received certain content resources or accessed certain applications, the status of evaluations or evaluation histories for content resources, users, or applications, and the like. Evaluation criteria may be stored in the evaluation data store 308 including data and/or instructions in the form of one or several electronic rubrics or scoring guides for use in the evaluation of the content, users, or applications. The evaluation data store 308 also may include past evaluations and/or evaluation analyses for users, content, and applications, including relative rankings, characterizations, explanations, and the like.

A model data store 309, also referred to herein as a model database 309, can store information relating to one or several predictive models. In some embodiments, these can include one or several evidence models, risk models, skill models, or the like. In some embodiments, an evidence model can be a mathematically-based statistical model. The evidence model can be based on, for example, Item Response Theory (IRT), Bayesian Network (Bayes net), Performance Factor Analysis (PFA), or the like. The evidence model can, in some embodiments, be customizable to a user and/or to one or several content items. Specifically, one or several inputs relating to the user and/or to one or several content items can be inserted into the evidence model. These inputs can include, for example, one or several measures of user skill level, one or several measures of content item difficulty and/or skill level, or the like. The customized evidence model can then be used to predict the likelihood of the user providing desired or undesired responses to one or several of the content items.

In some embodiments, the risk models can include one or several models that can be used to calculate one or several model function values. In some embodiments, these one or several model function values can be used to calculate a risk probability, which risk probability can characterize the risk of a user such as a student-user failing to achieve a desired outcome such as, for example, failing to correctly respond to one or several data packets, failure to achieve a desired level of completion of a program, for example in a pre-defined time period, failure to achieve a desired learning outcome, or the like. In some embodiments, the risk probability can identify the risk of the student-user failing to complete 60% of the program.

In some embodiments, these models can include a plurality of model functions including, for example, a first model function, a second model function, a third model function, and a fourth model function. In some embodiments, some or all of the model functions can be associated with a portion of the program such as, for example, a completion stage and/or completion status of the program. In one embodiment, for example, the first model function can be associated with a first completion status, the second model function can be associated with a second completion status, the third model function can be associated with a third completion status, and the fourth model function can be associated with a fourth completion status. In some embodiments, these completion statuses can be selected such that some or all of these completion statuses are less than the desired level of completion of the program. Specifically, in some embodiments, these completion statuses can be selected to all be at less than 60% completion of the program, and more specifically, in some embodiments, the first completion status can be at 20% completion of the program, the second completion status can be at 30% completion of the program, the third completion status can be at 40% completion of the program, and the fourth completion status can be at 50% completion of the program. Similarly, any desired number of model functions can be associated with any desired number of completion statuses.

In some embodiments, a model function can be selected from the plurality of model functions based on a student-user's progress through a program. In some embodiments, the student-user's progress can be compared to one or several status trigger thresholds, each of which status trigger thresholds can be associated with one or more of the model functions. If one of the status triggers is triggered by the student-user's progress, the corresponding one or several model functions can be selected.

The model functions can comprise a variety of types of models and/or functions. In some embodiments, each of the model functions outputs a function value that can be used in calculating a risk probability. This function value can be calculated by performing one or several mathematical operations on one or several values indicative of one or several user attributes and/or user parameters, also referred to herein as program status parameters. In some embodiments, each of the model functions can use the same program status parameters, and in some embodiments, the model functions can use different program status parameters. In some embodiments, the model functions use different program status parameters when at least one of the model functions uses at least one program status parameter that is not used by others of the model functions.

In some embodiments, a skill model can comprise a statistical model identifying a predictive skill level of one or several students. In some embodiments, this model can identify a single skill level of a student and/or a range of possible skill levels of a student. In some embodiments, this statistical model can identify a skill level of a student-user and an error value or error range associated with that skill level. In some embodiments, the error value can be associated with a confidence interval determined based on a confidence level. Thus, in some embodiments, as the number of student interactions with the content distribution network increases, the confidence level can increase and the error value can decrease such that the range identified by the error value about the predicted skill level is smaller.

A threshold source 310, also referred to herein as a threshold database, can store one or several threshold values. These one or several threshold values can delineate between states or conditions. In one exemplary embodiment, for example, a threshold value can delineate between an acceptable user performance and an unacceptable user performance, between content appropriate for a user and content that is inappropriate for a user, between risk levels, or the like.

In addition to the illustrative data stores described above, data store server(s) 104 (e.g., database servers, file-based storage servers, etc.) may include one or more external data aggregators 311. External data aggregators 311 may include third-party data sources accessible to the content management network 100, but not maintained by the content management network 100. External data aggregators 311 may include any electronic information source relating to the users, content resources, or applications of the content distribution network 100. For example, external data aggregators 311 may be third-party data stores containing demographic data, education-related data, consumer sales data, health-related data, and the like. Illustrative external data aggregators 311 may include, for example, social networking web servers, public records data stores, learning management systems, educational institution servers, business servers, consumer sales data stores, medical record data stores, etc. Data retrieved from various external data aggregators 311 may be used to verify and update user account information, suggest user content, and perform user and content evaluations.

Figure 4:
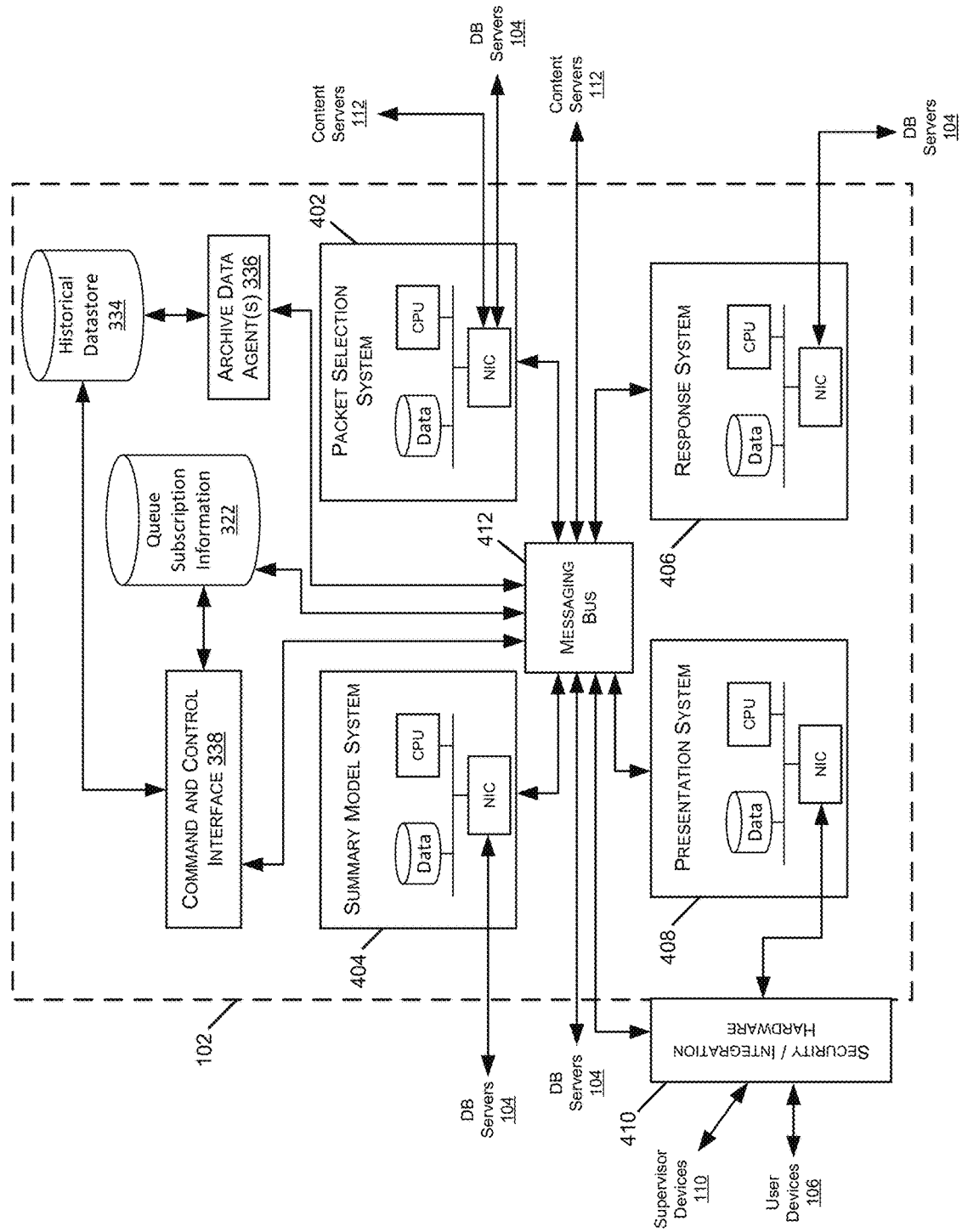
FIG. 4 is a block diagram illustrating an embodiment of one or more content management servers within a content distribution network.

With reference now to FIG. 4, a block diagram is shown illustrating an embodiment of one or more content management servers 102 within a content distribution network 100. In such an embodiment, content management server 102 performs internal data gathering and processing of streamed content along with external data gathering and processing. Other embodiments could have either all external or all internal data gathering. This embodiment allows reporting timely information that might be of interest to the reporting party or other parties. In this embodiment, the content management server 102 can monitor gathered information from several sources to allow it to make timely business and/or processing decisions based upon that information. For example, reports of user actions and/or responses, as well as the status and/or results of one or several processing tasks could be gathered and reported to the content management server 102 from a number of sources.

Internally, the content management server 102 gathers information from one or more internal components 402-408. The internal components 402-408 gather and/or process information relating to such things as: content provided to users; content consumed by users; responses provided by users; user skill levels; content difficulty levels; next content for providing to users; etc. The internal components 402-408 can report the gathered and/or generated information in real-time, near real-time or along another time line. To account for any delay in reporting information, a time stamp or staleness indicator can inform others of how timely the information was sampled. The content management server 102 can opt to allow third parties to use internally or externally gathered information that is aggregated within the server 102 by subscription to the content distribution network 100.

A command and control (CC) interface 338 configures the gathered input information to an output of data streams, also referred to herein as content streams. APIs for accepting gathered information and providing data streams are provided to third parties external to the server 102 who want to subscribe to data streams. The server 102 or a third party can design as yet undefined APIs using the CC interface 338. The server 102 can also define authorization and authentication parameters using the CC interface 338 such as authentication, authorization, login, and/or data encryption. CC information is passed to the internal components 402-408 and/or other components of the content distribution network 100 through a channel separate from the gathered information or data stream in this embodiment, but other embodiments could embed CC information in these communication channels. The CC information allows throttling information reporting frequency, specifying formats for information and data streams, deactivation of one or several internal components 402-408 and/or other components of the content distribution network 100, updating authentication and authorization, etc.

The various data streams that are available can be researched and explored through the CC interface 338. Those data stream selections for a particular subscriber, which can be one or several of the internal components 402-408 and/or other components of the content distribution network 100, are stored in the queue subscription information database 322. The server 102 and/or the CC interface 338 then routes selected data streams to processing subscribers that have selected delivery of a given data stream. Additionally, the server 102 also supports historical queries of the various data streams that are stored in an historical data store 334 as gathered by an archive data agent 336. Through the CC interface 238 various data streams can be selected for archiving into the historical data store 334.

Components of the content distribution network 100 outside of the server 102 can also gather information that is reported to the server 102 in real-time, near real-time or along another time line. There is a defined API between those components and the server 102. Each type of information or variable collected by server 102 falls within a defined API or multiple APIs. In some cases, the CC interface 338 is used to define additional variables to modify an API that might be of use to processing subscribers. The additional variables can be passed to all processing subscribes or just a subset. For example, a component of the content distribution network 100 outside of the server 102 may report a user response but define an identifier of that user as a private variable that would not be passed to processing subscribers lacking access to that user and/or authorization to receive that user data. Processing subscribers having access to that user and/or authorization to receive that user data would receive the subscriber identifier along with response reported that component. Encryption and/or unique addressing of data streams or sub-streams can be used to hide the private variables within the messaging queues.

The user devices 106 and/or supervisor devices 110 communicate with the server 102 through security and/or integration hardware 410. The communication with security and/or integration hardware 410 can be encrypted or not. For example, a socket using a TCP connection could be used. In addition to TCP, other transport layer protocols like SCTP and UDP could be used in some embodiments to intake the gathered information. A protocol such as SSL could be used to protect the information over the TCP connection. Authentication and authorization can be performed to any user devices 106 and/or supervisor device interfacing to the server 102. The security and/or integration hardware 410 receives the information from one or several of the user devices 106 and/or the supervisor devices 110 by providing the API and any encryption, authorization, and/or authentication. In some cases, the security and/or integration hardware 410 reformats or rearranges this received information.

The messaging bus 412, also referred to herein as a messaging queue or a messaging channel, can receive information from the internal components of the server 102 and/or components of the content distribution network 100 outside of the server 102 and distribute the gathered information as a data stream to any processing subscribers that have requested the data stream from the messaging queue 412. Specifically, in some embodiments, the messaging bus 412 can receive and output information from at least one of the packet selection system, the presentation system, the response system, and the summary model system. In some embodiments, this information can be output according to a "push" model, and in some embodiments, this information can be output according to a "pull" model.

As indicated in FIG. 4, processing subscribers are indicated by a connector to the messaging bus 412, the connector having an arrow head pointing away from the messaging bus 412. Only data streams within the messaging queue 412 that a particular processing subscriber has subscribed to may be read by that processing subscriber if received at all. Gathered information sent to the messaging queue 412 is processed and returned in a data stream in a fraction of a second by the messaging queue 412. Various multicasting and routing techniques can be used to distribute a data stream from the messaging queue 412 that a number of processing subscribers have requested. Protocols such as Multicast or multiple Unicast could be used to distribute streams within the messaging queue 412. Additionally, transport layer protocols like TCP, SCTP and UDP could be used in various embodiments.

Through the CC interface 338, an external or internal processing subscriber can be assigned one or more data streams within the messaging queue 412. A data stream is a particular type of message in a particular category. For example, a data stream can comprise all of the data reported to the messaging bus 412 by a designated set of components. One or more processing subscribers could subscribe and receive the data stream to process the information and make a decision and/or feed the output from the processing as gathered information fed back into the messaging queue 412. Through the CC interface 338 a developer can search the available data streams or specify a new data stream and its API. The new data stream might be determined by processing a number of existing data streams with a processing subscriber.

The CDN 110 has internal processing subscribers 402-408 that process assigned data streams to perform functions within the server 102. Internal processing subscribers 402-408 could perform functions such as providing content to a user, receiving a response from a user, determining the correctness of the received response, updating one or several models based on the correctness of the response, recommending new content for providing to one or several users, or the like. The internal processing subscribers 402-408 can decide filtering and weighting of records from the data stream. To the extent that decisions are made based upon analysis of the data stream, each data record is time stamped to reflect when the information was gathered such that additional credibility could be given to more recent results, for example. Other embodiments may filter out records in the data stream that are from an unreliable source or stale. For example, a particular contributor of information may prove to have less than optimal gathered information and that could be weighted very low or removed altogether.

Internal processing subscribers 402-408 may additionally process one or more data streams to provide different information to feed back into the messaging queue 412 to be part of a different data stream. For example, hundreds of user devices 106 could provide responses that are put into a data stream on the messaging queue 412. An internal processing subscriber 402-408 could receive the data stream and process it to determine the difficulty of one or several data packets provided to one or several users, and supply this information back onto the messaging queue 412 for possible use by other internal and external processing subscribers.

As mentioned above, the CC interface 338 allows the CDN 110 to query historical messaging queue 412 information. An archive data agent 336 listens to the messaging queue 412 to store data streams in a historical database 334. The historical database 334 may store data streams for varying amounts of time and may not store all data streams. Different data streams may be stored for different amounts of time.

With regard to the components 402-408, the content management server(s) 102 may include various server hardware and software components that manage the content resources within the content distribution network 100 and provide interactive and adaptive content to users on various user devices 106. For example, content management server(s) 102 may provide instructions to and receive information from the other devices within the content distribution network 100, in order to manage and transmit content resources, user data, and server or client applications executing within the network 100.

A content management server 102 may include a packet selection system 402. The packet selection system 402 may be implemented using dedicated hardware within the content distribution network 100 (e.g., a packet selection server 402), or using designated hardware and software resources within a shared content management server 102. In some embodiments, the packet selection system 402 may adjust the selection and adaptive capabilities of content resources to match the needs and desires of the users receiving the content. For example, the packet selection system 402 may query various data stores and servers 104 to retrieve user information, such as user preferences and characteristics (e.g., from a user profile data store 301), user access restrictions to content recourses (e.g., from a content access data store 306), previous user results and content evaluations (e.g., from an evaluation data store 308), and the like. Based on the retrieved information from data stores 104 and other data sources, the packet selection system 402 may modify content resources for individual users.

In some embodiments, the packet selection system 402 can include a recommendation engine, also referred to herein as an adaptive recommendation engine. In some embodiments, the recommendation engine can select one or several pieces of content, also referred to herein as data packets, for providing to a user. These data packets can be selected based on, for example, the information retrieved from the database server 104 including for example, the user profile database 301, the content library database 303, the model database 309, or the like. In some embodiments, these one or several data packets can be adaptively selected and/or selected according to one or several selection rules. In one embodiment, for example, the recommendation engine can retrieve information from the user profile database 301 identifying, for example, a skill level of the user. The recommendation engine can further retrieve information from the content library database 303 identifying, for example, potential data packets for providing to the user and the difficulty of those data packets and/or the skill level associated with those data packets.

The recommendation engine can identify one or several potential data packets for providing and/or one or several data packets for providing to the user based on, for example, one or several rules, models, predictions, or the like. The recommendation engine can use the skill level of the user to generate a prediction of the likelihood of one or several users providing a desired response to some or all of the potential data packets. In some embodiments, the recommendation engine can pair one or several data packets with selection criteria that may be used to determine which packet should be delivered to a student-user based on one or several received responses from that student-user. In some embodiments, one or several data packets can be eliminated from the pool of potential data packets if the prediction indicates either too high a likelihood of a desired response or too low a likelihood of a desired response. In some embodiments, the recommendation engine can then apply one or several selection criteria to the remaining potential data packets to select a data packet for providing to the user. These one or several selection criteria can be based on, for example, criteria relating to a desired estimated time for receipt of response to the data packet, one or several content parameters, one or several assignment parameters, or the like.

A content management server 102 also may include a summary model system 404. The summary model system 404 may be implemented using dedicated hardware within the content distribution network 100 (e.g., a summary model server 404), or using designated hardware and software resources within a shared content management server 102. In some embodiments, the summary model system 404 may monitor the progress of users through various types of content resources and groups, such as media compilations, courses or curriculums in training or educational contexts, interactive gaming environments, and the like. For example, the summary model system 404 may query one or more databases and/or data store servers 104 to retrieve user data such as associated content compilations or programs, content completion status, user goals, results, and the like.

A content management server 102 also may include a response system 406, which can include, in some embodiments, a response processor. The response system 406 may be implemented using dedicated hardware within the content distribution network 100 (e.g., a response server 406), or using designated hardware and software resources within a shared content management server 102. The response system 406 may be configured to receive and analyze information from user devices 106. For example, various ratings of content resources submitted by users may be compiled and analyzed, and then stored in a data store (e.g., a content library data store 303 and/or evaluation data store 308) associated with the content. In some embodiments, the response server 406 may analyze the information to determine the effectiveness or appropriateness of content resources with, for example, a subject matter, an age group, a skill level, or the like. In some embodiments, the response system 406 may provide updates to the packet selection system 402 or the summary model system 404, with the attributes of one or more content resources or groups of resources within the network 100. The response system 406 also may receive and analyze user evaluation data from user devices 106, supervisor devices 110, and administrator servers 116, etc. For instance, response system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

In some embodiments, the response system 406 can be further configured to receive one or several responses from the user and analyze these one or several responses. In some embodiments, for example, the response system 406 can be configured to translate the one or several responses into one or several observables. As used herein, an observable is a characterization of a received response. In some embodiments, the translation of the one or several responses into one or several observables can include determining whether the one or several responses are correct responses, also referred to herein as desired responses, or are incorrect responses, also referred to herein as undesired responses. In some embodiments, the translation of the one or several responses into one or several observables can include characterizing the degree to which one or several responses are desired responses and/or undesired responses. In some embodiments, one or several values can be generated by the response system 406 to reflect user performance in responding to the one or several data packets. In some embodiments, these one or several values can comprise one or several scores for one or several responses and/or data packets.

A content management server 102 also may include a presentation system 408. The presentation system 408 may be implemented using dedicated hardware within the content distribution network 100 (e.g., a presentation server 408), or using designated hardware and software resources within a shared content management server 102. The presentation system 408 can include a presentation engine that can be, for example, a software module running on the content delivery system.

The presentation system 408, also referred to herein as the presentation module or the presentation engine, may receive content resources from the packet selection system 402 and/or from the summary model system 404, and provide the resources to user devices 106. The presentation system 408 may determine the appropriate presentation format for the content resources based on the user characteristics and preferences, and/or the device capabilities of user devices 106. If needed, the presentation system 408 may convert the content resources to the appropriate presentation format and/or compress the content before transmission. In some embodiments, the presentation system 408 may also determine the appropriate transmission media and communication protocols for transmission of the content resources.

In some embodiments, the presentation system 408 may include specialized security and integration hardware 410, along with corresponding software components to implement the appropriate security features, content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 5:
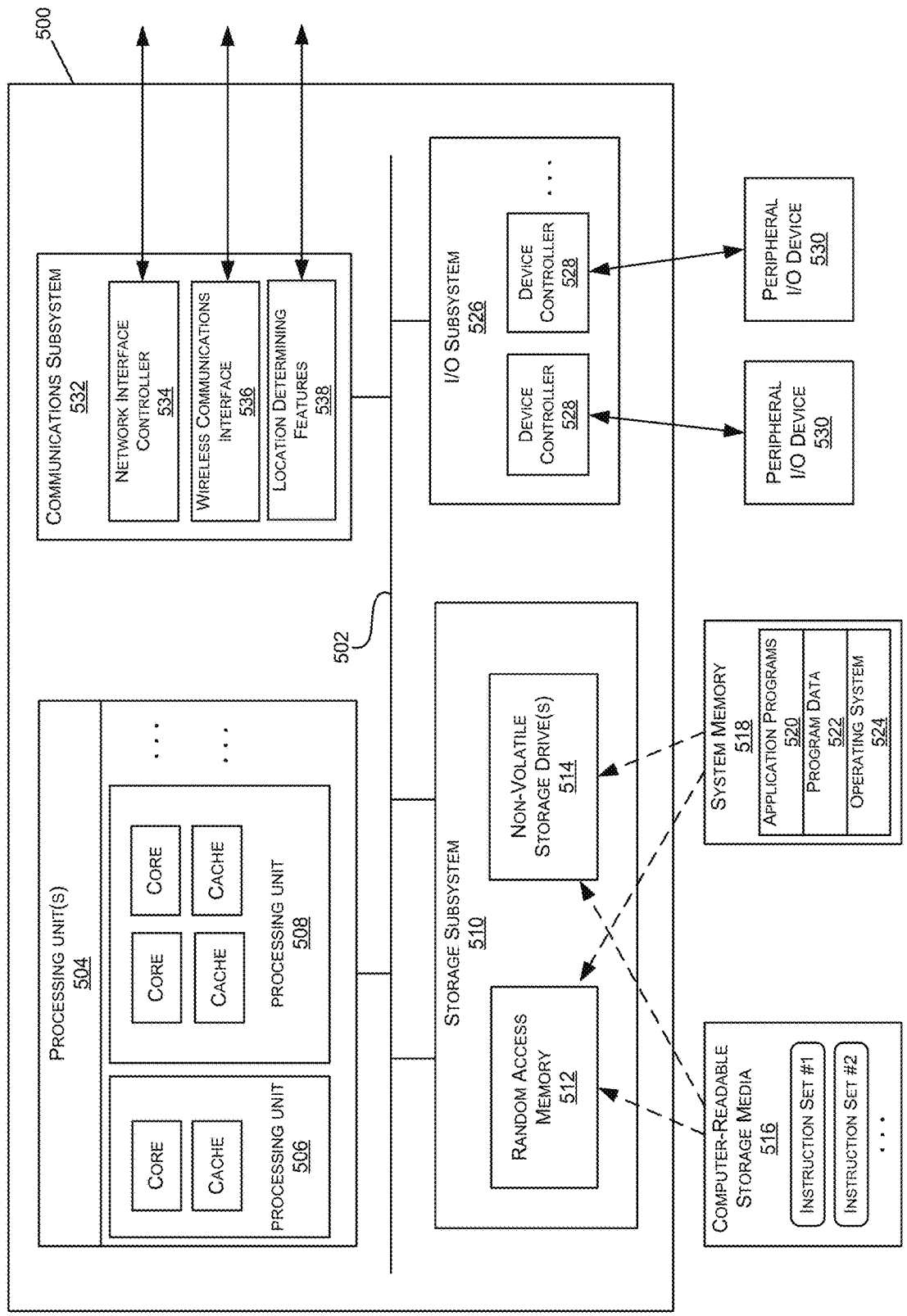
FIG. 5 is a block diagram illustrating the physical and logical components of a special-purpose computer device within a content distribution network.

With reference now to FIG. 5, a block diagram of an illustrative computer system is shown. The system 500 may correspond to any of the computing devices or servers of the content distribution network 100 described above, or any other computing devices described herein, and specifically can include, for example, one or several of the user devices 106, the supervisor device 110, and/or any of the servers 102, 104, 108, 112, 114, 116. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater).

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500. The I/O subsystem 526 may provide one or several outputs to a user by converting one or several electrical signals to the user in perceptible and/or interpretable form, and may receive one or several inputs from the user by generating one or several electrical signals based on one or several user-caused interactions with the I/O subsystem such as the depressing of a key or button, the moving of a mouse, the interaction with a touchscreen or trackpad, the interaction of a sound wave with a microphone, or the like.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 518 may be stored in volatile memory (such as random access memory (RAM) 512) and/or in non-volatile storage drives 514 (such as read-only memory (ROM), flash memory, etc.). The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that, when executed by a processor, provide the functionality described herein may be stored in storage subsystem 510. These software modules or instructions may be executed by processing units 504. Storage subsystem 510 may also provide a repository for storing data used in accordance with the present invention.

Storage subsystem 500 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing transmitting, and retrieving computer-readable information.

Computer-readable storage media 516 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD)

cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. As illustrated in FIG. 5, the communications subsystem 532 may include, for example, one or more location determining features 538 such as one or several navigation system features and/or receivers, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 532 also may include radio frequency (RF) transceiver components for accessing wireless voice and/or data networks (e.g., using cellular telephone technology, advanced data network technology, such as 3G, 4G or EDGE (enhanced data rates for global evolution), WiFi (TFFF 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 311). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring etc.). Communications subsystem 532 may output such structured and/or unstructured data feeds, event streams, event updates, and the like to one or more data stores 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
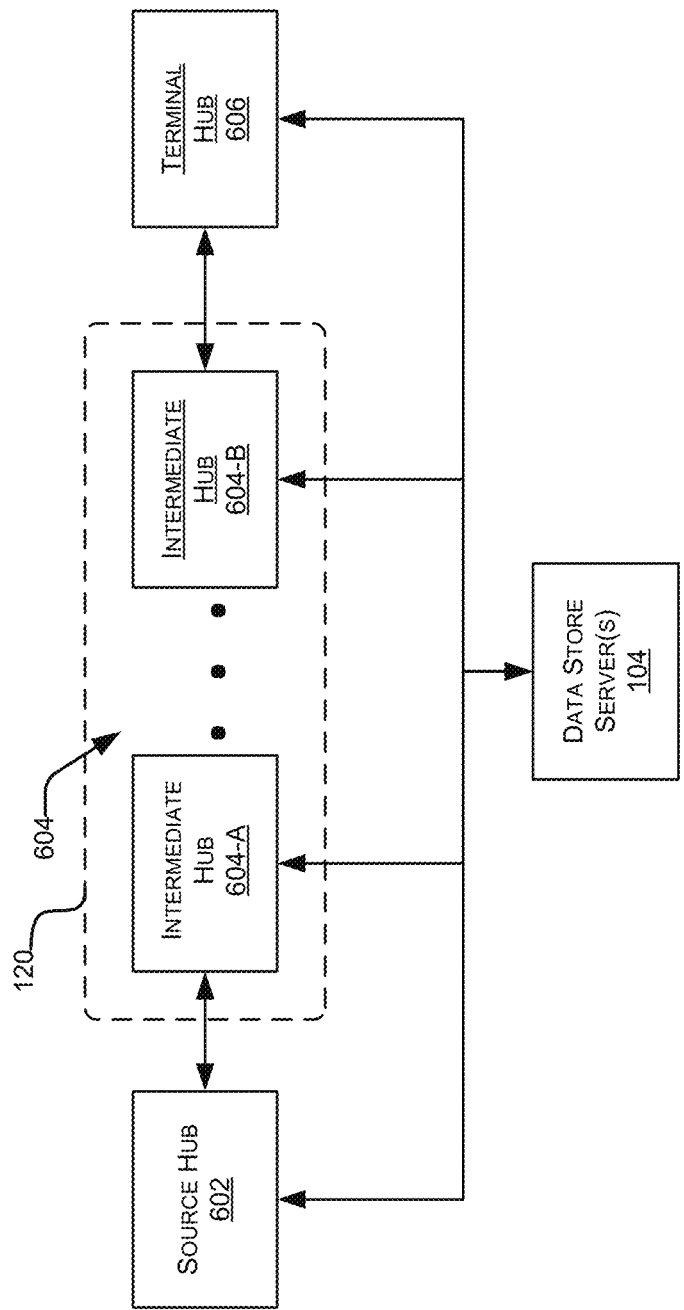
FIG. 6 is a block diagram illustrating one embodiment of the communication network.

With reference now to FIG. 6, a block diagram illustrating one embodiment of the communication network is shown. Specifically, FIG. 6 depicts one hardware configuration in which messages are exchanged between a source hub 602 via the communication network 120 that can include one or several intermediate hubs 604. In some embodiments, the source hub 602 can be any one or several components of the content distribution network generating and initiating the sending of a message, and the terminal hub 606 can be any one or several components of the content distribution network 100 receiving and not re-sending the message. In some embodiments, for example, the source hub 602 can be one or several of the user device 106, the supervisor device 110, and/or the server 102, and the terminal hub 606 can likewise be one or several of the user device 106, the supervisor device 110, and/or the server 102. In some embodiments, the intermediate hubs 604 can include any computing device that receives the message and resends the message to a next node.

As seen in FIG. 6, in some embodiments, each of the hubs 602, 604, 606 can be communicatingly connected with the data store 104. In such an embodiments, some or all of the hubs 602, 604, 606 can send information to the data store 104 identifying a received message and/or any sent or resent message. This information can, in some embodiments, be used to determine the completeness of any sent and/or received messages and/or to verify the accuracy and completeness of any message received by the terminal hub 606.

In some embodiments, the communication network 120 can be formed by the intermediate hubs 604. In some embodiments, the communication network 120 can comprise a single intermediate hub 604, and in some embodiments, the communication network 120 can comprise a plurality of intermediate hubs. In one embodiment, for example, and as depicted in FIG. 6, the communication network 120 includes a first intermediate hub 604-A and a second intermediate hub 604-B.

Figure 7:
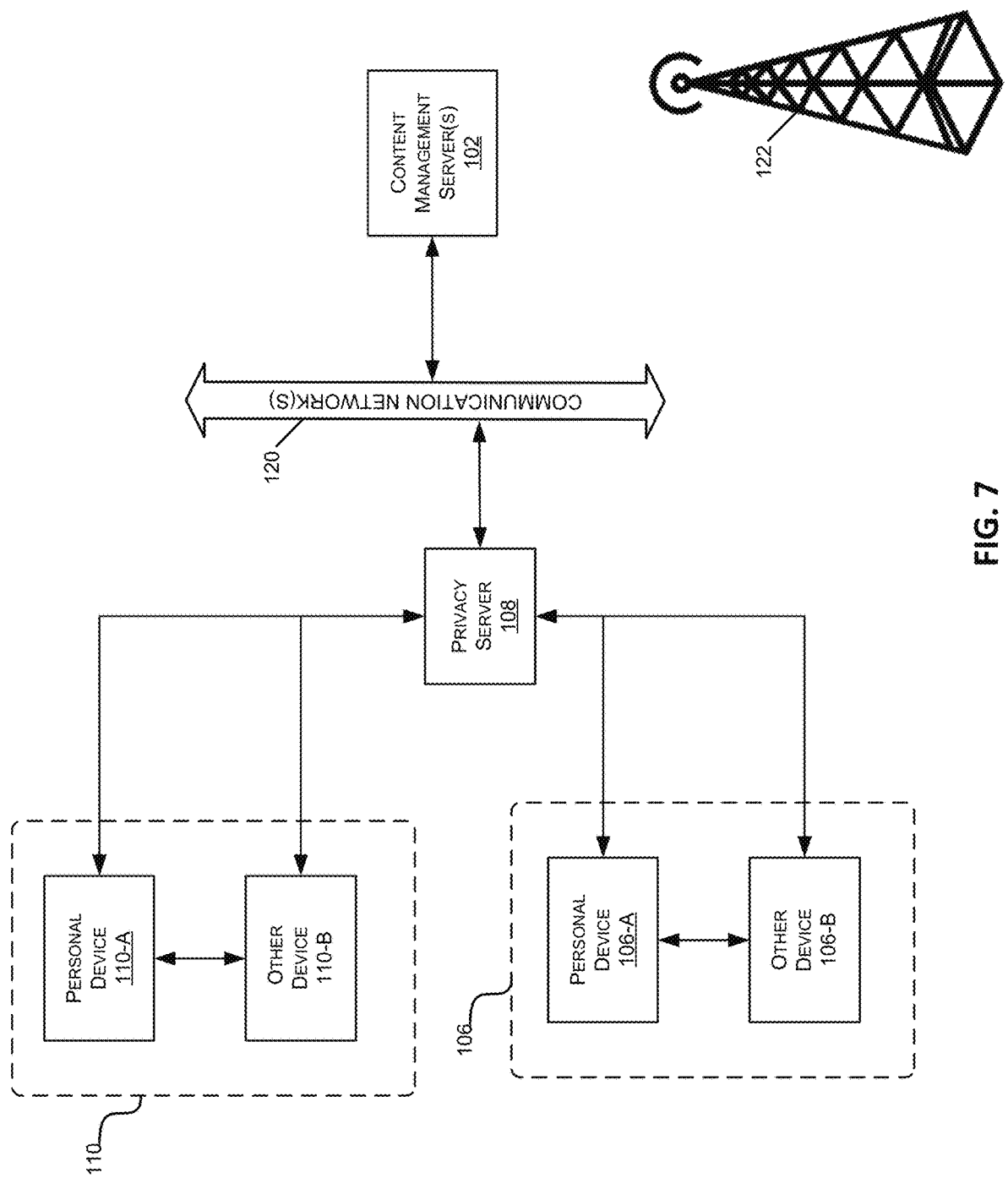
FIG. 7 is a block diagram illustrating one embodiment of the user device and supervisor device communication.

With reference now to FIG. 7, a block diagram illustrating one embodiment of user device 106 and supervisor device 110 communication is shown. In some embodiments, for example, a user may have multiple devices that can connect with the content distribution network 100 to send or receive information. In some embodiments, for example, a user may have a personal device such as a mobile device, a Smartphone, a tablet, a Smartwatch, a laptop, a PC, or the like. In some embodiments, the other device can be any computing device in addition to the personal device. This other device can include, for example, a laptop, a PC, a Smartphone, a tablet, a Smartwatch, or the like. In some embodiments, the other device differs from the personal device in that the personal device is registered as such within the content distribution network 100 and the other device is not registered as a personal device within the content distribution network 100.

Specifically with respect to FIG. 7, the user device 106 can include a personal user device 106-A and one or several other user devices 106-B. In some embodiments, one or both of the personal user device 106-A and the one or several other user devices 106-B can be communicatingly connected to the content management server 102 and/or to the navigation system 122. Similarly, the supervisor device 110 can include a personal supervisor device 110-A and one or several other supervisor devices 110-B. In some embodiments, one or both of the personal supervisor device 110-A and the one or several other supervisor devices 110-B can be communicatingly connected to the content management server 102 and/or to the navigation system 122.

In some embodiments, the content distribution network can send one or more alerts to one or more user devices 106 and/or one or more supervisor devices 110 via, for example, the communication network 120. In some embodiments, the receipt of the alert can result in the launching of an application within the receiving device, and in some embodiments, the alert can include a link that, when selected, launches the application or navigates a web-browser of the device of the selector of the link to a page or portal associated with the alert.

In some embodiments, for example, the providing of this alert can include the identification of one or several user devices 106 and/or student-user accounts associated with the student-user and/or one or several supervisor devices 110 and/or supervisor-user accounts associated with the supervisor-user. After these one or several devices 106, 110 and/or accounts have been identified, the providing of this alert can include determining an active device of the devices 106, 110 based on determining which of the devices 106, 110 and/or accounts are actively being used, and then providing the alert to that active device.

Specifically, if the user is actively using one of the devices 106, 110 such as the other user device 106-B and the other supervisor device 110-B, and/or accounts, the alert can be provided to the user via that other device 106-B, 110-B and/or account that is actively being used. If the user is not actively using another device 106-B, 110-B and/or account, a personal device 106-A, 110-A device, such as a smart phone or tablet, can be identified and the alert can be provided to this personal device 106-A, 110-A. In some embodiments, the alert can include code to direct the default device to provide an indicator of the received alert such as, for example, an aural, tactile, or visual indicator of receipt of the alert.

In some embodiments, the recipient device 106, 110 of the alert can provide an indication of receipt of the alert. In some embodiments, the presentation of the alert can include the control of the I/O subsystem 526 to, for example, provide an aural, tactile, and/or visual indicator of the alert and/or of the receipt of the alert. In some embodiments, this can include controlling a screen of the supervisor device 110 to display the alert, data contained in alert and/or an indicator of the alert.

Figure 8:
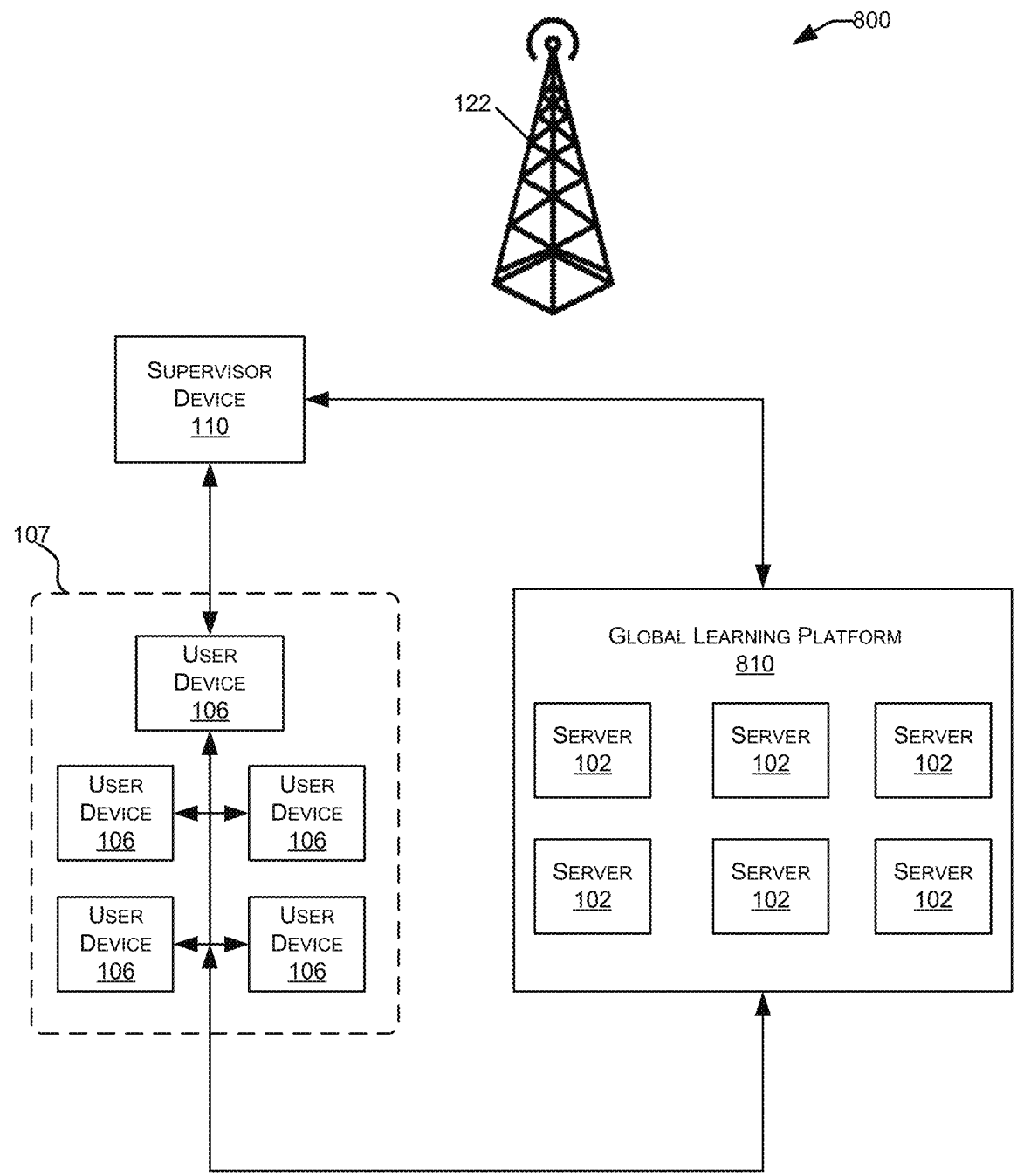
FIG. 8 is a schematic illustration of one embodiment of the global architecture in a personal content delivery system.

FIG. 8 is a block diagram of the global architecture 810 in a personal content delivery system 800 shown in the context of the components just described. The global architecture 810 is shown in an overview block diagram in FIG. 10, more fully described below.

The global architecture 810 can facilitate in one or several users, also referred to herein as learners or recipient-users, achieving one or several learning objectives, also referred to herein as one or several objectives. In some embodiments, an objective can be a statement or text string describing a goal for a recipient-user who is seeking mastery or knowledge of a certain domain or skill or topic. The attainment of these objectives can be facilitated by resources, which resources can be a means of achieving and/or evaluating/assessing the objective. Resources can be of different categories. A resource of category type "content" can be content provisioned into the global architecture 810. A resource associates metadata to content such as resource title, resource type, delivery mode, etc. A resource category type "inline-text" indicates that text content is embedded inside the resource. A resource category type "widget" can be UI widget deployed in a computing environment such as on the server 102. A resource can also be of non-content type such as "Ask a Question" which can be included as a part of a chatting software tool.

In some embodiments, the global architecture 810 contains content, in some embodiments, the global architecture 810 contains only metadata about content and/or connections to content, and in some embodiments the global architecture 810 contains both content and metadata about content. In some embodiments, the global architecture 810 does not contain any content, but it contains metadata about content. The content can be an artifact, such as a digital artifact, available on a Content Management System (CMS) or on a web or a file on an intranet and accessed through a URL.

In one embodiment, a portion of the global architecture 810 can receive content and/or information relating to that content and can extract and/or generate metadata from that content. In some embodiments, this metadata can include a link which can be data identifying a location and/or pointing to a location in which the content is stored. This link can include, for example, a URL, a pointer, a directory path, or the like. In some embodiments, the global architecture 810 can take this link and enrich it with metadata. This combination of a link and metadata is a resource. One or several resources can be packaged as a learning asset, also referred to herein as a package-data asset, which learning asset can be stored in the database server 104 or other memory associated with the global architecture 810. An asset can be any number of things that can be content such as a video or an assessment item. Or it can be some other type of asset like notifications. The content can have a known type, which type (narrative content, video, multiple choice question, etc.) can dictate the rendering. In some embodiments, the content and the type or types can be provisioned onto the global architecture 810.

Figure 35:
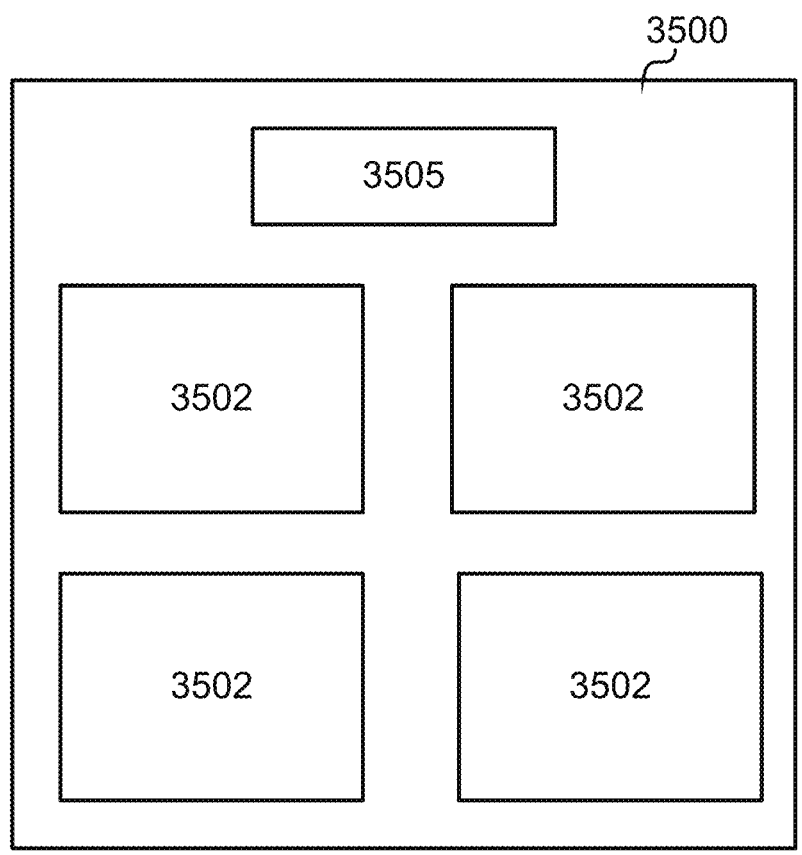
FIG. 35 is a depiction of one embodiment of a content data asset.

One embodiment of a content data asset is shown in FIG. 35. The content data asset 3500 includes a plurality of resources 3502. These resources each comprise metadata and a link 3505 coupling the resource to content 3506 that can be stored in a content repository 3504 such as, for example, the content platform 2820 of the enabling services 1070.

A product, as used herein can be an independently saleable and specific learning experience. The product can include a set of metadata descriptions of learning assets that can be used to identify content, formatting and display, as well as to enable platform features such as social (chat, collaboration, discussions, etc.), school and instructional management, adaptive learning, and other digital features. A product model, as used herein, can be a grouping of products that have similar characteristics. This grouping is defined for business rather than technical reasons; i.e. all the products in a product model address a similar business need. A product model organizes the content and non-content learning assets to make available to particular students in a particular sequence. A product platform is a set of technologies that supports one or more product models, and/or describes how to sequence the content.

Figure 9:
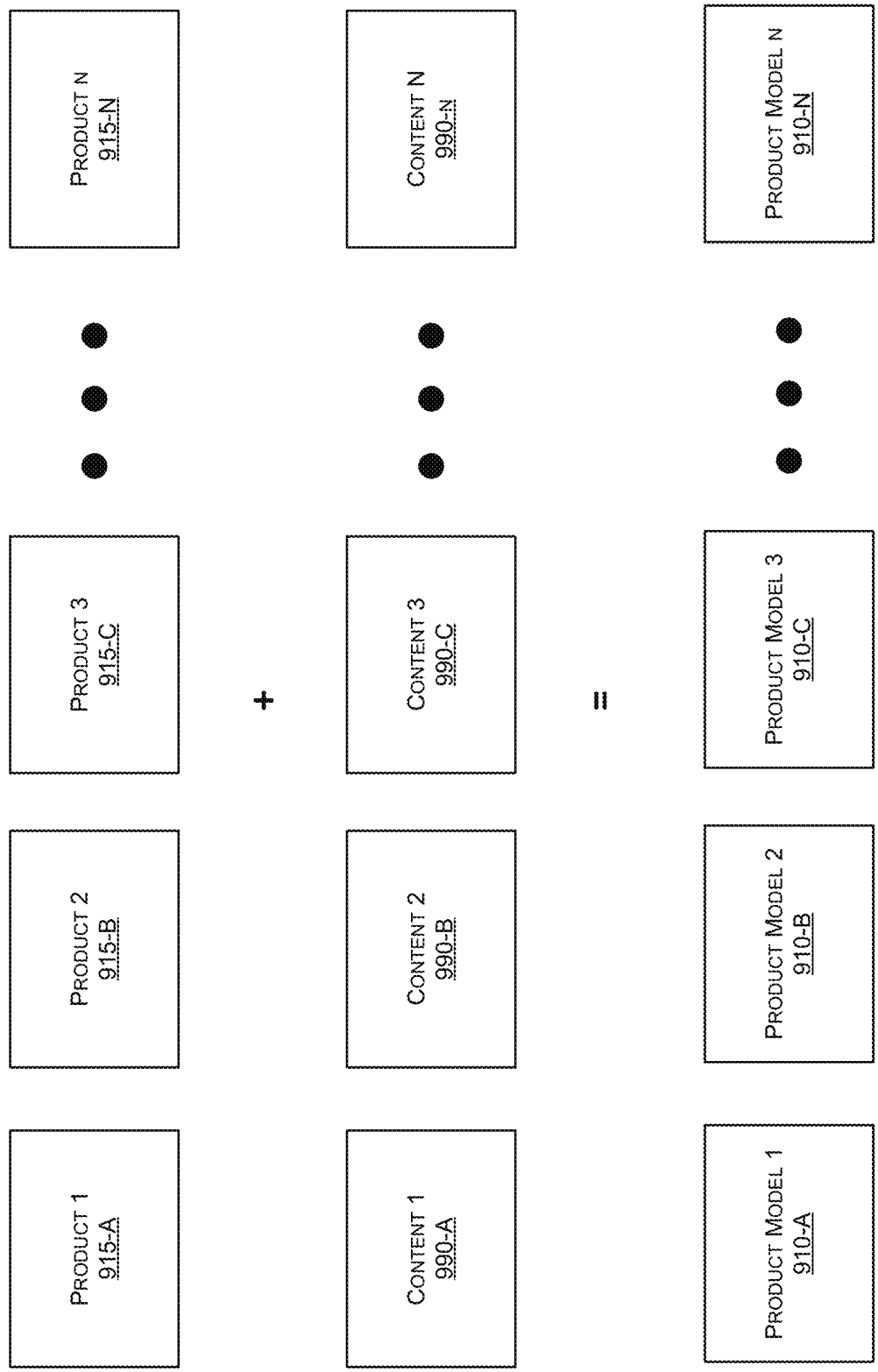
FIG. 9 is a schematic illustration of combinations of products and content to create product models.

In some embodiments, a product is linked to specific content, and in some embodiments, a product is content independent. Specifically, in some embodiments, a product can be linked with and/or connected with one or several different pieces of content. In one embodiment, for example, a single product may be linked with the first content for a set of first recipient-users and the product may be linked with the second content for second recipient-users. While the content linked to the product changes between these two sets of recipient-users, the product remains the same. In some embodiments, this different content can be linked based on attributes of the recipient-user such as, for example, based on a skill level of the recipient-user, based on a learning style or preference of the recipient-user, or the like. In some embodiments, one or several products, each of which can be linked with content, can be combined to form a product model. This can be repeated to create multiple product models as shown in FIG. 9. FIG. 9 shows products 915-A through 915-N, content 990-A through 990-N, and product models 910-A through 910-N. Each of the products 915-A through 915-N can be combined with at least one content 990-A through 990-N. A combination of products 915-A through 915-N linked with content can then be combined to form one of the product models 910-A through 910-N. In some embodiments, the products within a product model can be sequenced according to an adaptive sequencing which can be, for example, authored adaptive sequencing or dynamic adaptive sequencing. In embodiments having authored adaptive sequencing, next content can be selected according to predetermined criteria. In embodiments that are dynamically adaptively sequenced, next content and/or next products can be selected by a machine-learning algorithm trained to recommend products and/or content based on a determined user skill level and/or based on a determined difficulty of the products and/or content. In some embodiments, the products within the product model can be linearly sequenced, which linear sequencing may be based on, for example, sequencing according to a Table of Contents. In one such embodiment of sequencing according to a Table of Contents chapter 1 section 1 is followed by chapter 1 section 2 and then followed by chapter 1 section 3.

Products can intersect with diverse content such as crowd-sourced content and can improve and articulate the content according to context including, for example, recipient-user attributes, with machine learning. In some embodiments, the product models can sequence content for each learner targeted to that learner's needs and learning styles. For example, when the global architecture 810 uses feedback to learn that a particular student benefits from video stimulus, the product model can present a YouTube video having relevant content. Thus, global architecture 810 can be a personalized content delivery system, and the content delivered by the global architecture 810 can be any desired content including, for example, educational content, new content, entertainment content, or any other desired content.

The global architecture 810 can provide non-content learning assets or "tools" to create a learning experience. Social and communication features, allowing connection and collaboration between recipient-users, and between recipient-users and instructors, can facilitate many learning experiences. In addition, the global architecture 810 itself can include, for example, reminder-type and programmatic notification and announcement functions through a variety of channels including Video Conferencing/multi-participant Video Chat, audio conferencing, whiteboarding, discussions, sharing, social profiles, and text chat. Those channels can include a collaboration function that when coupled with other features, such as audio and video conferencing, can support peer-to-peer collaboration on projects such as writing assignments, homework problems, and a wide variety of platform apps (writing assignments, etc.) and $3^{rd}$ party tools (e.g. PPT, Word, etc.). This can allow students using self-paced ("asynchronous") on-line learning to give or get help from other students taking the same course, or students taking another type of course to do joint projects. The global architecture 810 can support "push" (that is, from platform to user) notifications through a variety of channels including email, in-browser delivery, in-App (mobile native app) delivery, and SMS. The global architecture 810 can support an ability for the institution/instructor to customize notification templates, and to configure when notifications are sent. Notifications may be sent to a configurable set of participants or roles in response to events (e.g. analytic criteria like a student at risk of failure; or homework items being overdue), at defined times, or asynchronously initiated by an instructor—to provide information or otherwise broadcast to a class, section, or set of students. The global architecture 810 can support recipient-user-initiated notifications that can permit one or several students to notify a teacher that they do not understand a particular concept, and to ask the instructor for help.

The global architecture 810 can provide school management features for institutions to oversee the effectiveness of their instructors, manage students and enrolment, and service the needs of the institutional administrator. The analytics and adaptive, one of such management features, are separate though related functions provided by the global architecture 810. The adaptive functionality—that is, the software controlling real-time student engagement—can leverage the information produced by the analytics engine. The analytics engine can maintain and keep current based on interactive and streamed information, models for efficacy, usage of content for royalty purposes, student mastery of learning objectives, and many other functions.

Instructional management can be provided by the global architecture 810 to the instructor or the institution employing the instructor. Important instructional management functionality can include the following described functionality. A gradebook can be a main dashboard for instructors, institutions and students to monitor students' progress. While, as the name suggests, grades for quizzes, assessments and courses can be presented here, the gradebook can also act as a dashboard for an institution or instructor to determine how well their students are grasping the "learning objectives" embodied in the course. The gradebook can present statistics derived from the student activity streams showing how long it is taking students to read material, how much of the material they have read, demonstrated mastery of specific learning objectives through assessment questions, how much of any video or other interactive content students actually watched, the number of attempts and time taken to answer questions, and other metrics. In addition, grades for a given quiz or assessment can be computed using algorithms that incorporate number of retries, time taken, and other factors. The gradebook can be used to identify and review systematic causes of error—for example, adding both the numerator and denominator of a fraction, rather than finding a common denominator, when learning addition of fractions. The view of the Gradebook can vary between students—who, in some embodiments, only see their own or their workgroup's information—and institutions and instructors, who can see progress for all their students. An instructor can use this information during the course itself to add or re-arrange assignments and material to address issues his or her class can be experiencing. The Gradebook can also be used by a teacher (or other person with appropriate permission, like a teaching assistant) to grade assignments manually. Facilities can be provided to grade group assignments, to incorporate participation and other factors into grades, to manually override grades, etc. In some embodiments, one feature supporting the gradebook functionality can be the "student model". For a given recipient-user (student), this model can show and/or track to what extent he or she has demonstrated mastery of each learning objective. This model can be maintained algorithmically using an "activity stream" from the reader, taking into account the student's performance (right or wrong responses, etc.) to assessment items and other learning objects (time to read, percent of video watched, etc.) that map to a given learning objective. The student's mastery can be measured in an absolute sense, or relative to other students who have taken the same assessment items or encountered the same learning objects. A lesson planner supports instructor-sequenced lesson plans and is an important feature of the global architecture 810. Lesson planning can enable an instructor to organize content into assignments, and to attach due dates to these assignments. Assignments can be created for specific individuals, for sections of a larger class, or for a class as a whole. Some features of the lesson planner are curriculum management, class management, front of classroom management, outcome management, assignment management, and scheduling. These features help instructors schedule events, classes, assignments and book AV and other resources used as a part of their teaching experience. The system can also make such information selectively visible to students, such as a calendar, resource booking, as well as due dates.

In some embodiments, the global architecture can provide narrative content, assessments, and simulations which can facilitate "learning by doing" via, for example, practicing new skills and/or demonstrating mastery. In some embodiments, assessments can provide the ability to flexibly ask and answer questions, and flexibly score the responses based on a number of scoring criteria. Simulations place recipient-users in a situation that mimics aspects of "real life," enabling instructors and "intelligent agents" to monitor and record the student's performance in near real-time, potentially adapting the scenario to the student's previous responses while he or she is still interacting with the simulation. Simulations may also be scored, either by the instructor, or by an automated system. The line between assessments and simulations is somewhat blurred, because many assessments actually do mimic aspects of real-life, while many simulations do set out questions to be answered. For example, one assessment scenario presents a business problem and requests that a student fill out an actual balance sheet, while an IT simulation requires that the user create a table in Word. While there may be a distinction in a pedagogical sense, assessments and simulations may both be treated uniformly by the global architecture 810. An "assessment" is student activity that can be scored. The global architecture 810 monitors activity stream and many aspects of the student's interaction with the system—including time to read, time to respond. And nearly any activity, including simulations, can be scored. This renders many or most simulations and interactives as assessments.

The global architecture 810 supports assessments of several types. A first type is a high stakes assessment. These are assessments where the results have a major impact on a student's course grade—such as a mid-term or final exam—or on the issuance of a professional or other license. In general, a much higher degree of security and scrutiny surrounds this type of assessment than other types. In particular, the setting in which the assessment may be taken—the IP addresses of the machines, and so on—are often controlled. Systems are often "locked down", and physically isolated. Another type is a low stakes assessment. While a recipient-user's performance on quizzes and practice problems generally does have an impact on their grade, these are considered low-stakes in the sense that their primary purpose is learning rather than assessment. While potential cheating is still a consideration, flexibility, ease-of-use and educational value become the primary concerns of a low-stakes assessment. Other types of assessments include diagnostic, administration, psychometric, automated language evaluation, and performance reporting. The global architecture includes item and test construction tools for the authoring of test questions and answers. These tools provide support for constructing good questions, tying them to a specific learning objective, and assessing their efficacy. There are a variety of ways assessment questions potentially interact with the global architecture 810. The first is self-contained; score data output only. The global architecture 810 launches a self-contained assessment or simulation when required, but does not set the initial conditions of the assessment. The student interacts with the assessment, with the student's interaction with that assessment determined totally by the assessment component. The assessment component reports either a raw score (#retries, #correct, etc.) or a pre-computed score back to the platform. The sequence in which individual assessments or simulations are presented to the student are platform controlled in an adaptive or instructor-determined model. To the global architecture 810, each assessment question is a "black box". A second embodiment is when the global architecture 810 sets initial conditions and scores data output only. In this scenario, the global architecture 810 supplies a list of parameters to the assessment and determines the specific set of variables to be used in the assessment. In this embodiment the "model" defining those parameters is executed on the platform, rather than as an embedded part of a self-contained assessment. The advantage to executing the model on the global architecture 810 is that the variables driving the assessment or simulation can be chosen systematically rather than randomly. In particular, these variables can be based on complex factors like the student's current mastery of the material, as determined by the analytic models governing the student model. Other embodiments include sending the activity stream data that would allow the global architecture 810 to gather more nuanced data on efficacy and student behaviour. Another embodiment is a fully interactive mode, where the player sends activity stream and student responses, and the global architecture 810 responds to each interaction.

An important characteristic of the self-contained assessment model in the "global architecture 810 is that it sets initial conditions and does not require instructor interactivity while the question is being answered by the recipient-user. From the standpoint of the global architecture 810, such questions can be "fire and forget"—once the assessment or simulation is launched, and initialization of the question is (optionally) done, the global architecture 810 simply waits for an answer. While the interaction with the recipient-user appears—and in fact is—richly interactive, that interactivity is completely determined by the initial conditions of the problem, and can therefore be implemented in a self-contained assessment component. This makes this type of question very scalable, and useful off-line as well. The way assessment questions are structured is to some degree a matter of style and intent. A question could be self-contained, requiring no input; all numerical values required could be generated within the assessment question itself and not require initialization by the global architecture 810. At the other extreme, the same question could be driven entirely by the global architecture 810, with the global architecture 810 itself supplying initial and intermediate values, as well as doing the scoring. The global architecture 810 can deal with multiple styles of questions, because the interaction of the global architecture 810 with assessment components can be, in some embodiments, entirely model-driven.

The global architecture 810 offers administration and user features for student management functionality to manage student registration for courses, to publish available courses, and to manage student's entitlements to courses and course material based on their enrolment. Other administration and user features are on boarding, login/registration, user management, catalog/course listings, and entitlements.

The global architecture 810 provides a reader client that is used by the recipient-user or instructor to consume content, as well as to access other non-content global architecture 810 features such as notifications or chat. A reader may be browser-based, mobile-native, or implemented on other technologies. In some embodiments, more than 50 readers can be associated with the global architecture 810, including, for example, Reader+, eText2, and Revel. Important features of the reader clients include: rendering and layout of narrative content, navigation, glossary, annotations, bookmarks, search, offline operation, and downloadable content capable.

Learning tools are global architecture 810 features that are offered independently of a particular product or learning model. Since the global architecture 810 supports multiple learning models packaged in the same product, learning tools may be either "integrated" or "bundled" with a given product. The distinction is that integrated learning tools are in-line with the content and other resources of a title, while "bundled" products sit side-by-side, or are available to an instructor to add to a course. The learning tools can include in-class interactivity and peer-to-peer learning by: students in a classroom setting notifying the instructor that they do not understand a particular concept, and asking for help; the instructor viewing tabulated student responses to a quiz in near-real time while in class, so he or she knows where students need help; the teacher delivering interactive worksheets and quizzes to students while in class; and teachers creating transient or persistent study groups for assignments or in-class discussions. The learning tools also include peer-to-peer learning for asynchronous online courses. This leverages the global architecture 810 social/communication features to allow students in self-paced learning courses to work with each other in real-time; outside-of-class questions. Additional learning tools include questions the instructor assigns for students to work on independently, outside of class. In some embodiments, the questions and answers persist so that a student may return to them later for review. Learning tools can also include math tools including a set of browser-based teaching aids that can be used by instructors interactively when teaching questions. These can include: counters, fractions, geometry, place-value blocks, money, data and graphs, number line, input-output machine, strip diagrams, measuring cylinders, number charts, and pan balance. The learning tools can include writing tools that allow students to write and upload assignments, as well as access notes, tips, and resources such as a dictionary and thesaurus. The learning tools can also provide features for the instructor such as the ability to create assignment, score completed assignments using grading rubrics, and the ability to provide personalized feedback to students. The writing tool can also allow automated essay scoring system using natural language processing and an add-in to Microsoft Word that can offer coaching tools such as grammar and style checkers and editorial guidance, as well as composition tools such as citation tracking, multi-project organization, and note-taking add-ons. The writing tools can enable sharing, commenting on and grading of video and textual content in a social-media type paradigm. The instructor can, in some embodiments, create and grade assignments, and comment on video as the video plays. This can be used to score group assignments, presentations and other content. Students may also create their own social-media type profiles.

Figure 10:
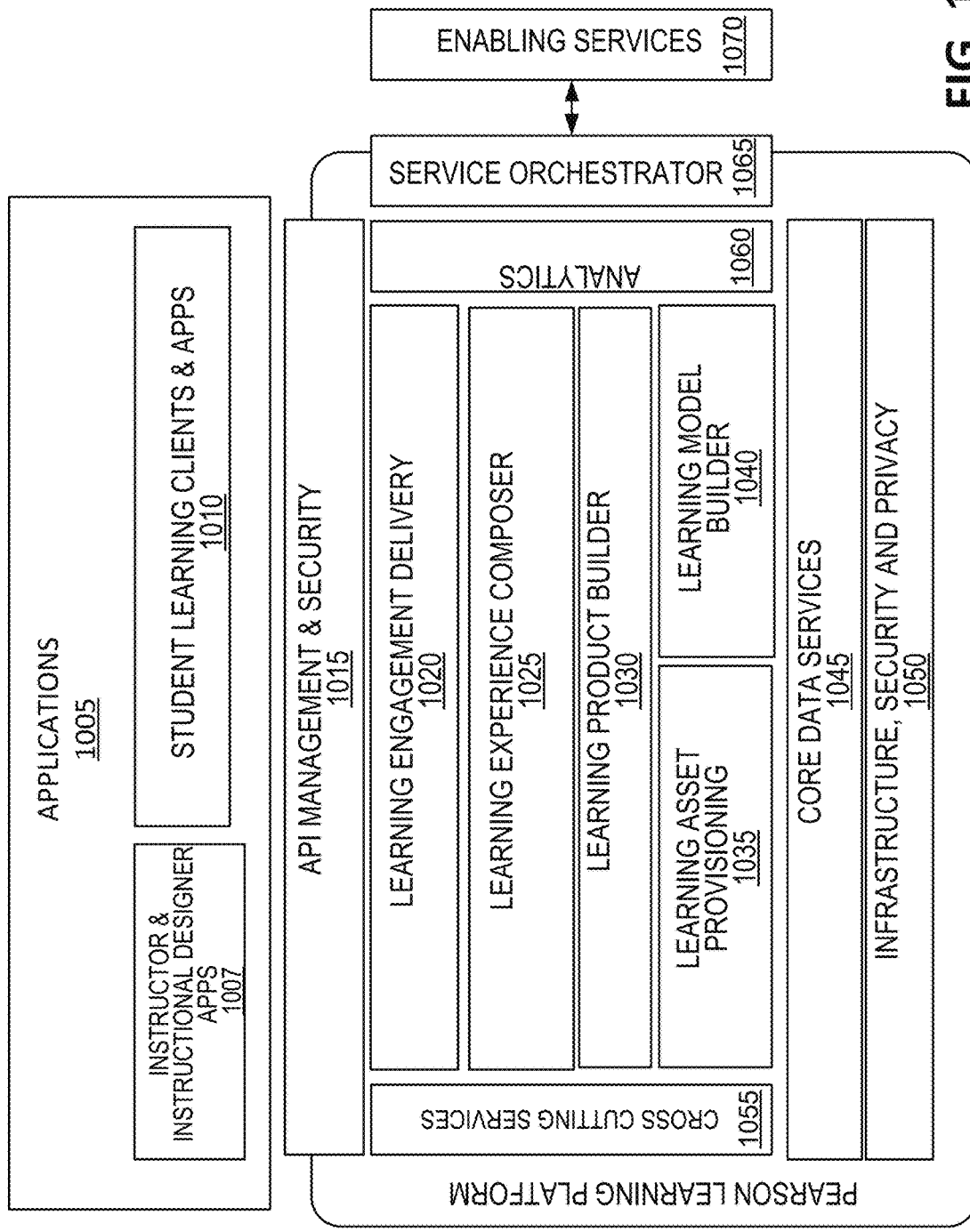
FIG. 10 is an overview block diagram of the components of the global architecture.

FIG. 10 is an overview block diagram of the components of the global architecture 810, specifically, FIG. 10 depicts a block diagram overview of the global architecture 810 connected to applications and enabling services. Microservices 1020, 1025, 1030, 1035, 1040, and 1045 are the unique services that define the global architecture 810, while the other services are cross cutting or enabling services. The global architecture 810 is also built on strong foundational layers 1050 of security and privacy, infrastructure, internationalization and data governance and management. The various microservices in the Platform can be organized into the following groups: core services; analytics; enabling services; cross-cutting services; and API management and security.

This global architecture 810 can be highly flexible and provide multiple capabilities and allow for these capabilities to be reused by different "products" and "learning models" via configuration. This flexibility can allow multiple learning models to be served from the global architecture 810, with the option of personalizing the experience for each student. While personalization is not needed in all scenarios, the global architecture 810 and architecture support such an ability. The architecture can be built for "web scale" by supporting horizontal scalability, functional partitioning and data partitioning The architecture can be built primarily on the principles of the microservices architectural pattern. This pattern can allow each component to be self-sufficient and scalable on-demand with its own life cycle management. Another important feature can be the loose coupling between microservices that can enable a distributed team working in multiple locations to work on the business functionality without blocking other teams. The architecture of the global architecture 810 can also support simultaneous work on "back-end" (framework) and "front-end" (application) functionality that provides for a telescoped implementation schedule. An additional feature can be that the global architecture 810 can be built as a thin server that can provide a clear separation between the user interface components and backend services. Furthermore, the system layers can be clearly defined, with access via APIs using publish and subscription functionality. The global architecture 810 architecture can make each of the microservices "stateless", with state being fetched when the microservice is instantiated. This can allow each microservice to efficiently scale horizontally, and can also result in a highly available system. The global architecture 810 architecture can have no single point of failure, making it highly scalable as well as highly available. And because of its ability to scale, the architecture can be highly performant in both user-facing and API-cantered applications. The global architecture 810 architecture can also support rapid application development principles by limiting the amount of coding required for changes and increasing re-use of what has been coded before. The global architecture 810 architecture can use ESB (enterprise service bus)-based service orchestrator for its connection to third party enabling services. This can be a part of a SOA (service oriented architecture) architectural pattern, and can provide support for disparate communication protocols and data models.

The global architecture 810 can be the encapsulation of the "server-side" components of the overall system. The global architecture 810 can be based on the thin server architectural pattern; in some embodiments, it can deliver all its services in the form of web services and in some embodiments, there are no user interface components executed on the global architecture 810. The global architecture 810 can be further decomposed into components. These components can be grouped together based on their scope within the overall architecture. Each component can be a microservice, making the overall architecture fully decoupled. Each microservice can have fail-over nodes and can scale at its own pace based on the demand for that particular service. This means the global architecture 810 has no single point of failure, making the platform both highly scalable and available. In some embodiments, for example, the global architecture 810 can comprise a plurality of servers 102. In some embodiments, each microservive in the global architecture can be associated with at least one server 102, and can, in some embodiments, be associated with at least one server 102 functioning as a primary node and at least one server 102 functioning as a fail-over node for that microservice. In some embodiments, for example, each microservice can be embodied on a plurality of servers 102, some of which servers 102 function as primary nodes and execute the functions of the microservice under normal operating conditions, and some of the plurality of servers 102 function as fail-over nodes and, in some embodiments, are used only in a failure such as, for example, when traffic exceeds the capabilities of the primary nodes and/or when one of the primary nodes fails. In some embodiments, each microservice can be associated with a plurality of servers 102 that can be communicatingly coupled to each other. In some embodiments, some or all of this plurality of servers can operate as primary nodes and as fail-over nodes. In one embodiment, for example, a portion of a server's 102 processing capabilities can be held in reserve to function as a fail-over node, whereas other portions of the server's 102 processing capabilities can operate as the primary node. The global architecture 810 architecture provides the capability to build and deploy a microservice instance for each course-recipient-user combination; that is, a given student could have one microservice service instance for each course that student is taking. Because each student interacts with their own microservice, this makes the global architecture 810 scale up to the limit of cloud resources available—i.e. near infinity.

Figure 11:
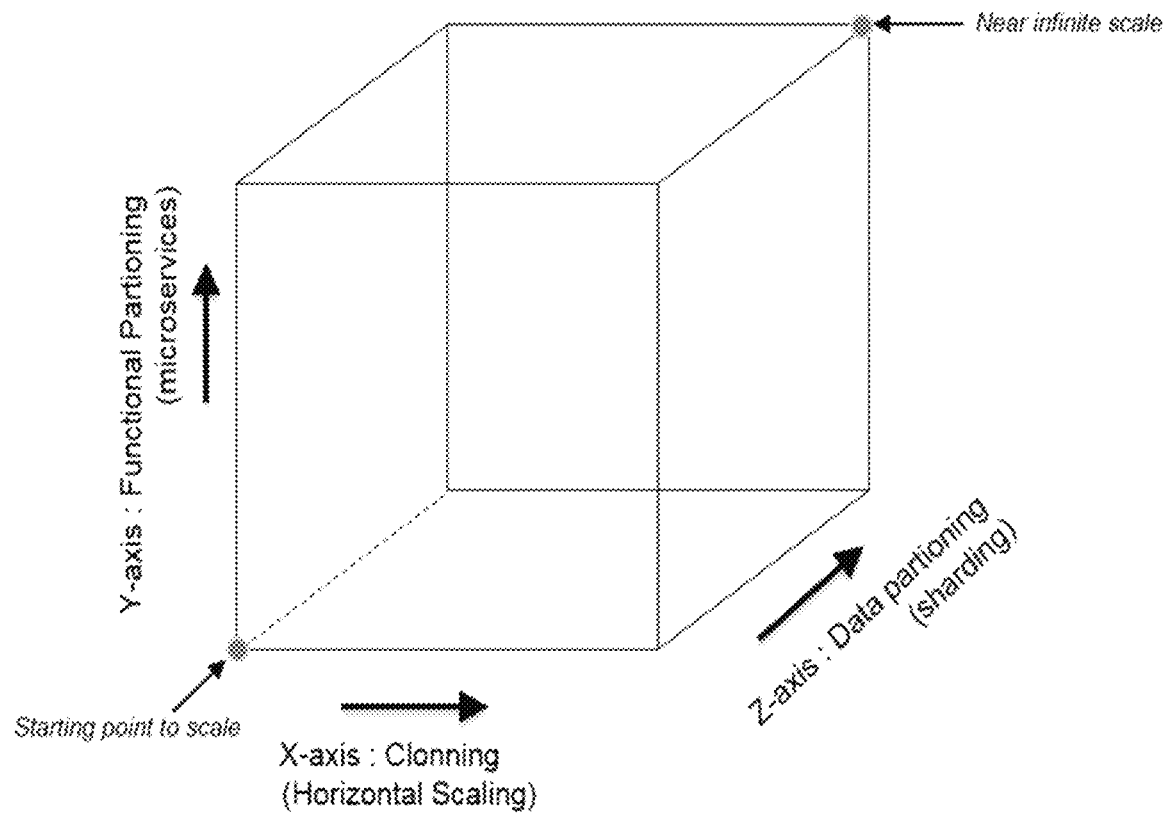
FIG. 11 is a graphical depiction of scalability.

Any scalable application stretches itself in the direction of at least one of the dimensions of a scale cube as shown in FIG. 11. The scale cube has three dimensions X, Y and Z. The x-axis represents scaling an application by cloning it. This is sometimes called horizontal scaling. A traditional example of cloning is multiple web server instances front-ended by a load balancer. Horizontal scaling means scaling an application or service by duplicating the executing code on various physical nodes. The y-axis scaling is partitioning the application by splitting it based on business or other logical groupings of functions. Many traditional e-commerce web applications, for example, were built by having one machine (or group of machines) handling payments, another set of machines running the shopping basket, and so on. Next, on the z-axis is scaling an application by data partitioning. Data partitioning also requires cloning the code just like x-axis, but in this option each clone only processes a contextualized sub-set of the data. This improves the performance of the application and makes it scalable too, since each system has to do less. "Map-reduce" where each "mapper" only operates on a subset of data is also an example of data partitioning. Referring to the cube in FIG. 11, if the bottom left corner ("starting point to scale") is the starting point for application scaling, and the right top corner (labeled "near infinite scale") is the ultimate scale to be achieved, then we have to scale through all three dimensions to reach that point. Maximum scale means that we have to scale by cloning (X-axis), functional partitioning (Y-axis) and data partitioning (Z-axis).

The global architecture 810 architecture scales in all three dimensions of the cube. Along the x-axis, the services are designed as "stateless", which means that they can scale horizontally to any level. Along the y-axis are the microservices such that the whole application is decomposed into smaller parts that can be built and deployed independently to achieve functional partitioning. Along the z-axis is the fine grained data partitioning achieved by the capability of the architecture to decompose itself to a level where it creates a microservice for each course-recipient-user combination. In this way, the global architecture 810 architecture can achieve near infinite scale; or at least the highest current technology can support.

Returning again to FIG. 10, the global architecture 810 includes an: API management and security component 1015, also referred to herein as an external communication module; a learning engagement delivery microservice 1020, also referred to herein as an engagement delivery module 1020 or as an engagement delivery microservice 1020; a learning experience composer microservice 1025, also referred to herein as an experience composer microservice 1025; a learning product builder microservice 1030, also referred to herein as a product builder microservice 1030; a learning asset provisioning microservice 1035, also referred to herein as a data packaging module 1035 or as a data packaging microservice 1035; a learning model builder microservice 1040, also referred to herein as a model building module 1040 or as a model building microservice 1040; a core data services microservice 1045; foundational layers 1050 which can include security and/or privacy modules; a cross-cutting services microservice 1055; an analytics microservice 1060; and a service orchestrator 1065.

The global architecture can interact and/or communication with one or several applications 1005 and/or enabling services 1070. The enabling services component 1070 can form the input to the global architecture 810 from other systems or can consume the output of the global architecture 810 for further processing such as Billing, e-Commerce, etc. The service orchestrator 1065 can interact with the enabling services 1070.

The applications 1005 can include, for example, instructor and instructional designer applications 1007 and/or student learning clients and applications 1010. Instructor and instructional designer applications 1007 and student learning clients and applications 1010 can be, in some embodiments, the consumers of the global architecture 810 APIs. Instructor and instructional designer applications 1007 and student learning clients and applications 1010 can, in some embodiments, directly interact with end users, and can, from a global architecture 810 perspective, provide a user interface to the various services provided by the global architecture 810.

In some embodiments, the global architecture 810 can distinguish between the global architecture 810 and instructor and instructional designer applications 1007 and student learning clients and applications 1010. In particular, in some embodiments, instructor and instructional designer applications 1007 and student learning clients and applications 1010 can be consumers of global architecture 810 services and can be used for navigation and user interaction. In some embodiments, the instructor and instructional designer applications 1007 and student learning clients and applications 1010 do not execute "business logic", but execute "display logic". In particular, adaptivity and decisions on the sequencing of content based on dynamic factors can occur on the global architecture 810-side, not on the application-side—with the exception of the disconnected case where the recipient-user microservice migrates to the client. Advantageously, this can mitigate maintainability issues and can prevent fragmentation of services.

In some embodiments, the instructor and instructional designer applications 1007 and student learning clients and applications 1010 can be usable in an off-line mode. In such embodiments, some business logic and content must reside on them, at least temporarily while in that mode. Specifically, in such embodiments, a unique learner microservice, or copy of the same, can reside on the instructor and instructional designer applications 1007 and/or the student learning clients and applications 1010, and/or the devices 106, 110 containing the same. The instructor and instructional designer applications 1007 and student learning clients and applications 1010 may be hosted on multiple platforms including web browsers, mobile-native and other devices.

In some embodiments, access to the global architecture 810 can be through a common set of REST APIs. The global architecture 810 can, in some embodiments, supply data to the instructor and instructional designer applications 1007 and student learning clients and applications 1010. In some embodiments, the global architecture 810 does not provide rendering of screens or content, but rather those functions are performed by the instructor and instructional designer applications 1007 and student learning clients and applications 1010. The instructor and instructional designer applications 1007 and student learning clients and applications 1010 can perform some or all elements of data rendering and presentation, using the widgets and other display assets that are appropriate to the device 106, 110 hosting the instructor and instructional designer applications 1007 and student learning clients and applications 1010.

In some embodiments, the global architecture 810 can implement one or several processes for the ingestion, curating, and delivery of content. This can include the receipt of content. In some embodiments, at the time of receipt of content, the content and/or data such as metadata associated with the content can be converted to a format corresponding to the format of the global architecture 810. This content can undergo content provisioning by, for example, the learning asset provisioning microservice 1035, which can make the global architecture 810 "aware" of the content. This provisioning can further include the retrieval and packaging of metatdata and links associated with content to form resources, which resources can be combined with one or several other resources to form a learning asset. Some or all of these learning assets can be associated with one or several configurable palettes of capabilities that are available to and/or available in the global architecture 810. These learning assets can then be combined in one or several learning models, from which one or several products can be created.

Figure 12:
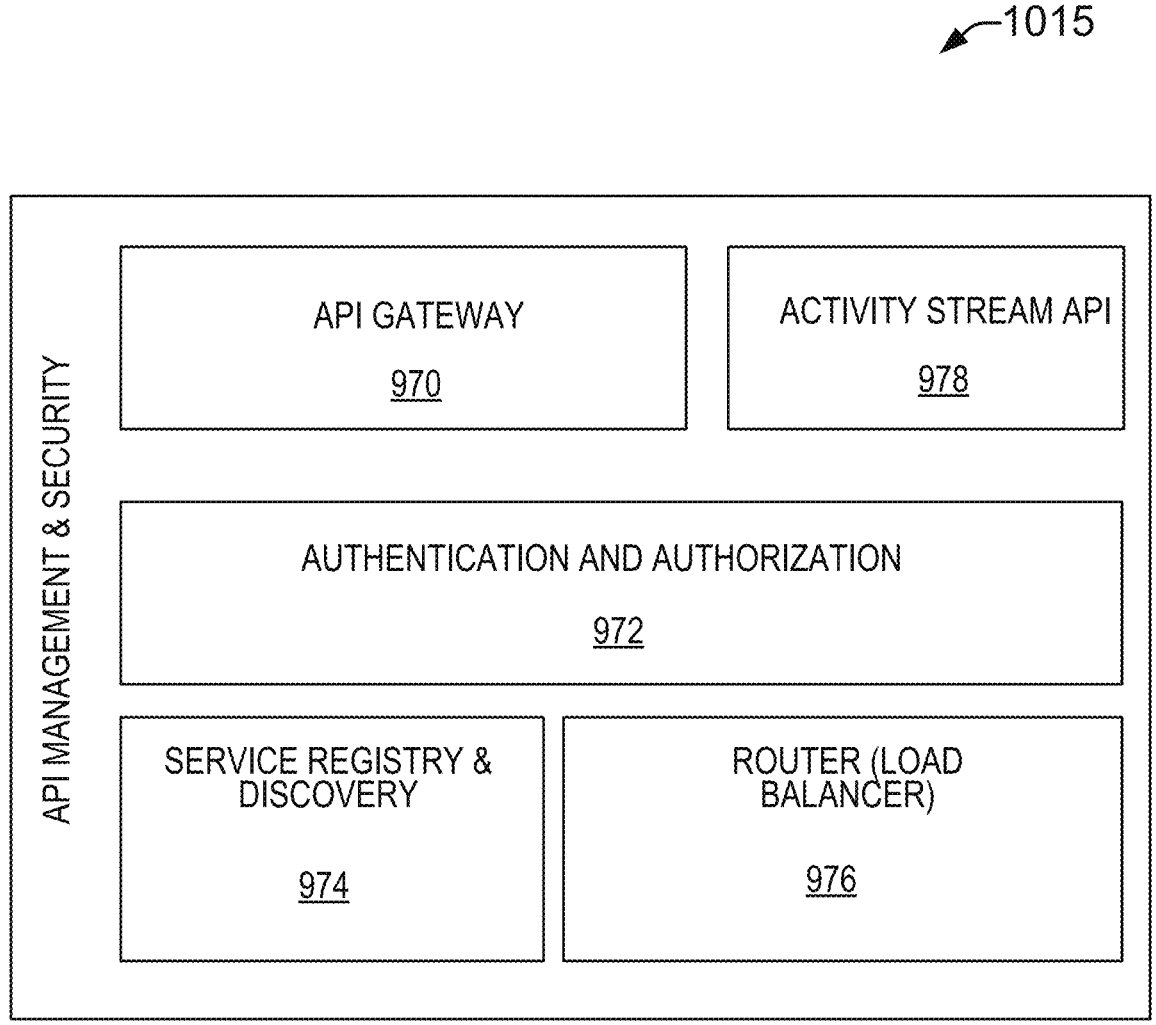
FIG. 12 is a schematic illustration of one embodiment of the API management and security microservice.

FIG. 12 is a schematic illustration of one embodiment of the API management and security microservice 1015. The API management and security microservice 1015 can be the doorway to global architecture 810 and the components within the API management and security microservice 1015 can act as gatekeepers. The API management and security microservice 1015 can include the API gateway 972, the authentication and authorization component 972, the service and registry component 974, and the router (load balancer) 976. The API gateway 970 can be the external endpoint made available to the consumers of the global architecture 810 services, and can encapsulate the business functionality of the overall global architecture 810. The API gateway 970 can be a common entry point for some or all clients (desktop, mobile, tablet or hubs) accessing the global architecture 810 services.

APIs used by the API gateway 970 can be business functionality made available over the internet using a standard simple stateless architecture over HTTP. These APIs can be REST (Representational State Transfer) services using JSON (JavaScript Object Notation). The APIs can follow the constraints of REST services, including having a uniform interface, being stateless and/or cacheable, and operating using client/server protocol. The uniform interface can use a restricted set of verbs (GET, PUT, DELETE, etc.), and/or can use query-string parameters, bodies and headers that can, for example, fully define the interface between the client and the services provided by the back-end. The REST or "system" API can connect clients and third party applications to the facilities provided by the system back-end, and can provide access to system functionality, data and services.

In some embodiments, some or all of the APIs in the API management and security microservice 1015 can be stateless from the point of view of the client. Specifically, in some embodiments, all "session state" information is not passed along with each call, but can be stored accessible by the APIs. In such an embodiment, when a client makes a request for content, this request can be communicated through the API management and security microservice 1015 to one or several other microservices 1020, 1025, 1030, 1035, 1040 of the global architecture. This API request can be communicated with the client's current token at the time the client makes a request. In some embodiments, the token can be communicated as part of a URI, query-string parameters, body, or headers. In such an embodiment, the URI can uniquely identify the resource and the body can contain the state (or state change) of the resource or client. After processing performed by the back end, the appropriate state, or one or several relevant piece(s) of state, can be communicated back to the client via headers, status, and/or response body. In some embodiments, all API responses can be cached on the client device. In some embodiments, responses can, implicitly or explicitly, define themselves as cacheable, or not, to prevent clients reusing stale or inappropriate data in response to further requests.

In some embodiments, the API acts as a decoupling agent which decouples the client from the global architecture 810. This separation of concerns means that clients are not concerned with data storage or the "how" which remains internal to the back-end server-side system. Further, the global architecture 810 is not concerned with the user interface or user state, so that the global architecture 810 can be simpler and more scalable. This allows for evolution of both the client and the global architecture 810 separately as long as the interface governing the communication between them remains unaltered.

To support near-real-time analytics against incoming data activity streams, there is a separate activity stream API 978. The activity stream API 978 can ingest and capture one or several activity streams. In some embodiments, each of these activity steams can identify some or all of the interactions of a user with features, content, and/or components of the global architecture 810. In some embodiments, this activity steam can be independent of content provided to the user. In some embodiments, for example, a user connecting to the global architecture 810 can connect via both the API gateway 970 and the activity stream API 978. The API gateway 970 can collect content related inputs, such as responses to questions, from the user, and the activity stream API 978 can capture these same inputs, as well as additional inputs. Thus, the activity stream API 978 can collect information that is at least partially redundant to information collected by the API gateway 970 and/or the activity stream API 978 can collect more information than is collected by the API gateway 970.

In some embodiments, the activity stream API 978 further distinguishes itself from the gateway API 970 in that the activity stream API 978 does not return a response. In some embodiments, the activity stream API 978 can be directly exposed to the devices 106, 110 sending information to the activity stream API 978, and in some embodiments, the activity stream API 978 can be pre-configured to the device at the time of provisioning the device. In some embodiments, the activity stream API does not include a service registry, discovery, and/or authorization occurring in the activity stream API 978. In some embodiments, this lack of authorization can be achieved as the act of provisioning the device 106, 110 enables the device 106, 110 to become known to the activity stream API 978 and a token can be supplied to the device 106, 110 which allows verification and/or determination of the identity of the device 106, 110.

In some embodiments, all events and activities from the device are accepted by the activity stream API provided the token is supplied. The token is the authentication accepted by the activity stream API 978, which activity stream API 978 can continuously ingest and store streams from as many devices as are connected to the global architecture, which can be 1,000 devices, 10,000 devices, 50,000 devices, 100,000 devices, 1,000,000 devices, 10,000,000 devices, 500,000,000 devices, 1,000,000,000 devices, and/or any other or intermediate number of devices. In some embodiments, inputs provided to some or all of these devices can be collected by the activity stream API 978 and can be used to generate events, and specifically can be used to generate a large number of events.

In some embodiments, the activity stream API 978 can function to capture or "ingest" activity data at high speed. The activity stream API 978 can then process the activity data to identify one or several activities from the activity data for pushing to the global architecture 810 as one or several events. In some embodiments, activity data can be processed in batch mode to provide a better view of the recipient-user and their interactions with the global architecture 810 and/or presented content. In some embodiments, some activities captured in the activity data may require prompt response from the global architecture 810 and such activities may be individually processed or not processed in batch.

The authentication and authorization component 972 can utilize a claims-based authorization approach that can accommodate the requirement to support federated authorization. A claim can be based on a mixture of information such as identity, role, permissions, rights, and other factors. Claims-based authorization can also provide additional layers of abstraction that make it easier to separate authorization rules from the authorization and authentication mechanism. For example, the authentication and authorization component 972 can authenticate a user with a certificate or with username/password credentials and then pass that claim-set to the service to determine access to resources.

In some embodiments, the global architecture 810 itself can be Identity Management, Access Management (IDAM) implementation independent. IDAM, Authorization and Entitlements can be treated as enabling services provided through an external toolset and accessed via an enterprise service bus. Interaction with external systems can be via a well-defined and simple interface, with the IDAM system itself hiding considerable complexity from the global architecture 810. This can allow the global architecture 810 to focus on permitted interactions with authorized individuals rather than concerning itself with how the entitlements and authentication itself is done. The REST API layer can be protected by token based authentication and an SSL enabled transport layer. In some embodiments, a user may be required to present a valid token in order to access any API.

The service registry and discovery component 974 can use server-side discovery, as each instance of the service exposes an API gateway 970 with a particular location and version. The global architecture 810 can use a server-side registry as it can then continuously expose new and updated services. The service registry and discovery component 974 is a database of services, their instances and their locations. Service instances are registered with the service registry and discovery component 974 on start-up and deregistered on shutdown. The service registry and discovery component 974 can be used for external and internal services and clients of the service and/or routers query the service registry and discovery component 974 to find the available instances of a service.

The router (load balancer) 976 works in conjunction with the service registry and discovery component 974 to ensure that all instances of the API are consumed in equal measure. The global architecture 810 can use many forms of load balancing known to those of skill in the art as round robin, weighted round robin, least connections, and weighted least connections. The global architecture 810 can also use least pending requests. In some embodiments, least pending requests selects the server with the least active sessions based on real-time monitoring.

Figure 13:
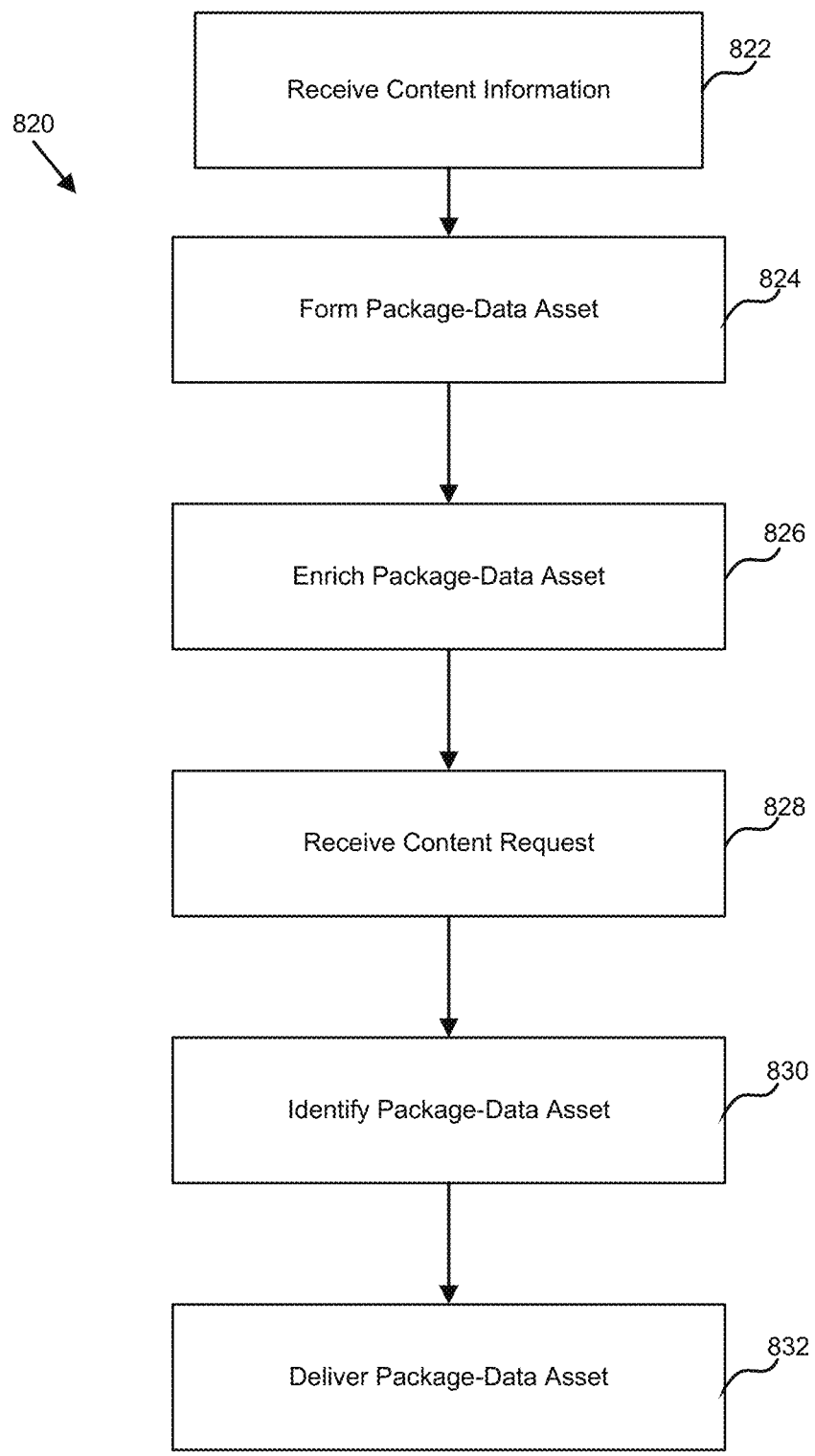
FIG. 13 is a flowchart illustrating one embodiment of a process for hybrid content provisioning.

With reference now to FIG. 13, a flowchart illustrating one embodiment of a process 820 for hybrid content provisioning is shown. In some embodiments, this process 820 can be for hybrid content provisioning of remote content stored on a remote content platform such as in the enabling services 1070 and native content stored within the global architecture 810. The process 820 can be performed by the content distribution network 100, including, for example, the global architecture 810 as located within the CDN 100.

The process 820 begins at block 822 wherein content information is received. In some embodiments, the content information can be received by the one or several servers 102 and specifically by the global architecture 810. In some embodiments, the content information can be received by one of the microservices of the global architecture 810, and specifically by the data packaging model 1035. In some embodiments, the content information can be associated with content that can be stored associated with the global architecture 810 where they can be stored remotely from the global architecture 810, and specifically on a remote content platform. In some embodiments, the content can be stored in the enabling services 1070, in some embodiments, the global architecture 810 can access the content, the global architecture 810 does not have control of the content.

After the content information has been received, the process 820 proceeds to block 824 wherein a package-data asset is formed. In some embodiments, the package-data asset can be performed by the data packaging module 1035. In some embodiments, an asset can comprise two or more resources. In some embodiments, the packaging of the content information into package-data asset can include the generation of a link directing or pointing to the content associated with the content information and the storing of that link. In some embodiments, that link and/or the package-data asset can be stored in a database of the data packaging module 1035, and in some embodiments, the link and/or the package-data asset can be stored in one or several databases within the global architecture 810.

After the package-data asset has been formed, the process 820 proceeds to block 826 wherein the package-data asset is enriched. In some embodiments, the package-data asset can be enriched by the application of metadata relevant to the content associated with the package-data asset. In some embodiments, this metadata can identify one or several attributes of the content learned by the package-data asset including, for example, information relating to the rendering and/or presentation of the content link to the package-data asset. In some embodiments, this metadata can identify the type of the content linked with the package-data asset, which type can specify, for example, a file type, such as, a text document, an image, a video, and audio file, or the like. In some embodiments, the package-data asset can be enriched by the data packaging module 1035.

After the package-data asset has been enriched, the process 820 proceeds to block 828 wherein a content request is received. In some embodiments, the content request can be received by the at least one server 100 including, for example, by the global architecture 810. In some embodiments, the content request can be received by the global architecture 810 via API that is contained in the applications 1005, which API can direct the content request to, for example, the engagement delivery module 1020.

After the content request is then received, the process 820 proceeds to block 830, wherein one or several package-data assets requested in the content request received in block 828 are identified. In some embodiments, this can include matching information contained within the content request to information associated with the package-data assets. This can be performed by, for example, the engagement delivery module 1020 through evaluation of a database of the engagement delivery module 1020. After the package-data asset the question the content request received in block 828 has been identified, the process 820 proceeds to block 832 wherein the package-data asset is delivered. In some embodiments, the package-data asset can be delivered to the user device 106 and specifically to the user of the user device. In some embodiments, the delivery of the package-data asset can include the rendering of the package-data asset and/or control of one or several microservices within the global architecture 810 to render the package-data asset and/or to coordinate the control of software and/or hardware modules to deliver the package-data asset.

Figure 14:
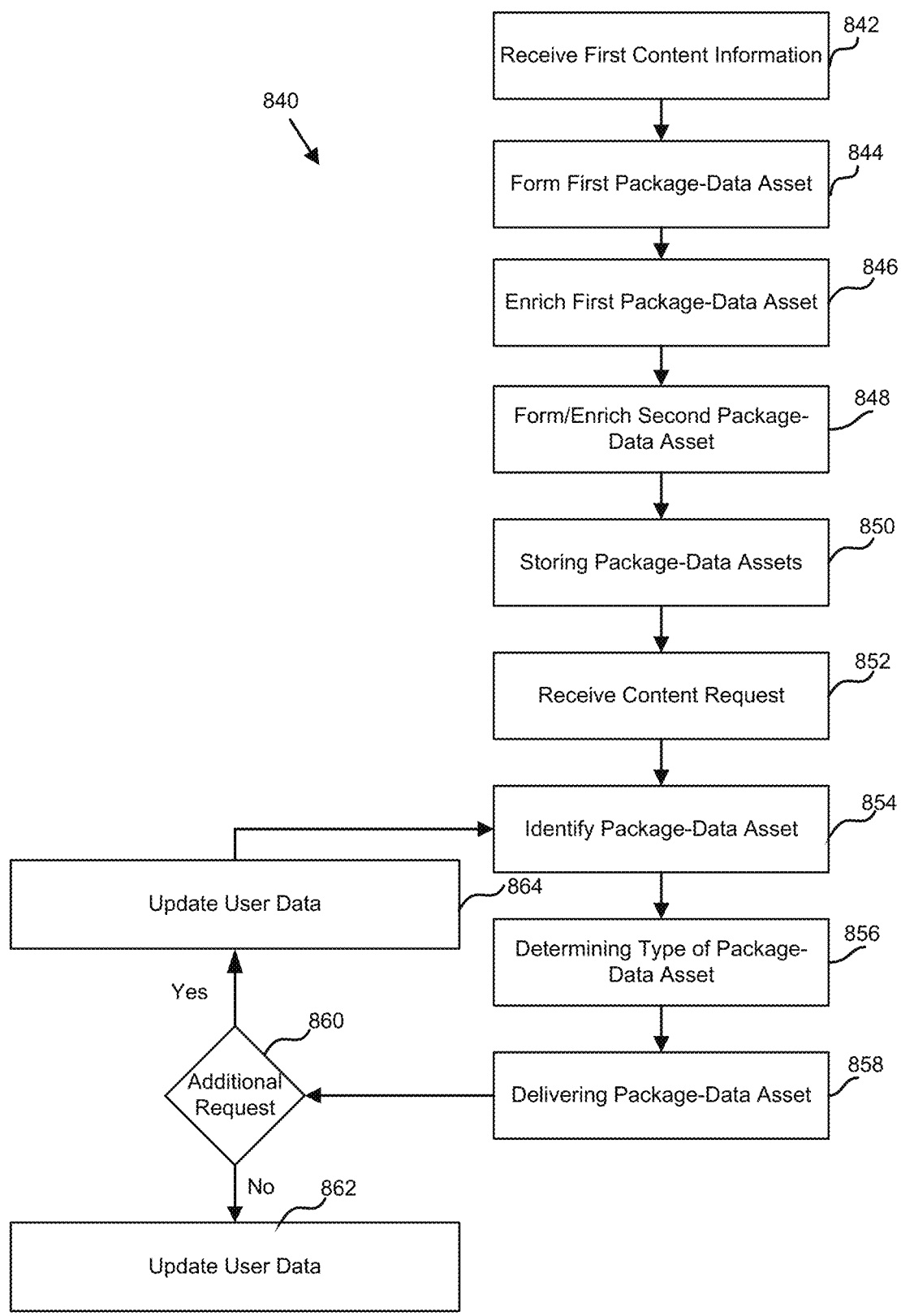
FIG. 14 is a flowchart illustrating one embodiment of a process for hybrid content provisioning.

With reference now to FIG. 14, a flowchart illustrating one embodiment of a process 840 for hybrid content provisioning is shown. In some embodiments, this process 840 can be for hybrid content provisioning of remote content stored on a remote content platform such as in the enabling services 1070 and native content stored within the global architecture 810. The process 840 can be performed by the content distribution network 100, including, for example, the global architecture 810 as located within the CDN 100.

The process 840 begins at block 842 wherein first content information is received. In some embodiments, the first content information can be received by the one or several servers 102 and specifically by the global architecture 810. In some embodiments, the content information can be received by one of the microservices of the global architecture 810, and specifically by the data packaging model 1035. In some embodiments, the content information can be associated with content that can be stored associated with the global architecture 810 where they can be stored remotely from the global architecture 810, and specifically on a remote content platform. In some embodiments, the content can be stored in the enabling services 1070, in some embodiments, the global architecture 810 can access the content, the global architecture 810 does not have control of the content. In one embodiment, the first content information can be associated with first content stored on a remote content platform such as, for example, within the enabling services 1070.

At block 844, the first package-data asset is formed. In some embodiments, the first package-data asset can be formed by the data packaging module 1035. In some embodiments, the packaging of the first content information into the first package-data asset can include the generation of a link directing or pointing to the first content associated with the first content information and the storing of that link. In some embodiments, that link and/or the first package-data asset can be stored in a database of the data packaging module 1035, and in some embodiments, the link and/or the package-data asset can be stored in one or several databases within the global architecture 810.

At block 846, the first package-data asset is enriched. In some embodiments, the first package-data asset can be enriched by the application of metadata relevant to the first content associated with the first package-data asset. In some embodiments, this metadata can identify one or several attributes of the first content linked by the package-data asset including, for example, information relating to the rendering and/or presentation of the first content linked to the first package-data asset. In some embodiments, this metadata can identify the type of the first content linked with the first package-data asset, which type can specify, for example, a file type, such as, a text document, an image, a video, an audio file, or the like. In some embodiments, the first package-data asset can be enriched by the data packaging module 1035.

At block 848, a second package-data asset can be formed and/or enriched. In some embodiments, this can include the receiving of second content information in a similar manner to that described with respect to lock 842. In some embodiments, this second content information can relate to second content which can be native content to the global architecture 810 and specifically can be stored in memory or in a database that can be, in some embodiments, in or controlled by the global architecture 810. After the second content information has been received, the second package-data asset can be formed in the same manner as discussed with respect to the first package-data asset in step 844. After the second package-data asset has been formed, the second package-data asset can be enriched with metadata associated with the second content. This enriching can be similar to the enriching performed in block 846 of FIG. 13.

At block 850, the first package-data asset and the second package-data asset are stored. In some embodiments, these package-data assets can be stored in memory associated with the global architecture. After the storing of the package-data assets, the process 840 proceeds to block 852, wherein a content request is received. In some embodiments, the content request can be received by the at least one server 100 including, for example, by the global architecture 810. In some embodiments, the content request can be received by the global architecture 810 via API that is contained in the applications 1005, which API can direct the content request to, for example, the engagement delivery module 1020.

After the content request is then received, the process 840 proceeds to block 854, wherein one or several package-data assets requested in the content request received in block 852 are identified. In some embodiments, this can include matching information contained within the content request to information associated with the package-data assets. This can be performed by, for example, the engagement delivery module 1020 through evaluation of a database of the engagement delivery module 1020.

After the package-data asset requested in the content request received in block 852 has been identified, the process 840 proceeds to block 856 wherein a type of the requested package-data asset is identified. In some embodiments, this determination can be performed based on enriching metadata associated with the requested package-data asset. This type of information can specify, for example, a file type of the requested content, capabilities for rendering and/or presenting the requested content, or the like.

After the type of the package-data asset has been determined, the process 840 proceeds to block 858, wherein the package-data asset is delivered. In some embodiments this can include the delivery of the first package-data asset, the delivery of the second package-data asset, or the delivery of both the first and the second package-data assets. In some embodiments, the package-data asset can be delivered to the user device 106 and specifically to the user of the user device. In some embodiments, the delivery of the package-data asset can include the rendering of the package-data asset and/or control of one or several microservices within the global architecture 810 to render the package-data asset and/or to coordinate the control of software and/or hardware modules to deliver the package-data asset. In some embodiments, the package-data asset can include metadata and a link to content associated with the metadata. In such an embodiment, delivery of the package-data asset may trigger the recipient device to automatically retrieve the content via the link and/or to display the content to the user of the recipient device. In some embodiments, this display of the content can be according to the rendering of the package-data asset.

After the package-data asset has been delivered, the process 840 proceeds to decision state 860, wherein it is determined if an additional content request is received. If no additional content request is received, then the process 840 proceeds to block 862, wherein user data of the user recipient of the package-data asset delivered in block 858 is updated. In some embodiments, information relating to the delivered package-data asset can be further updated. These updates can, in some embodiments, be based on one or several responses received by the global architecture 810 in response to the delivery of the package-data asset. If an additional request has been received, the user data can be updated like in block 862, after which the process 840 can return to block 854 and can continue as outlined above.

Figure 15:
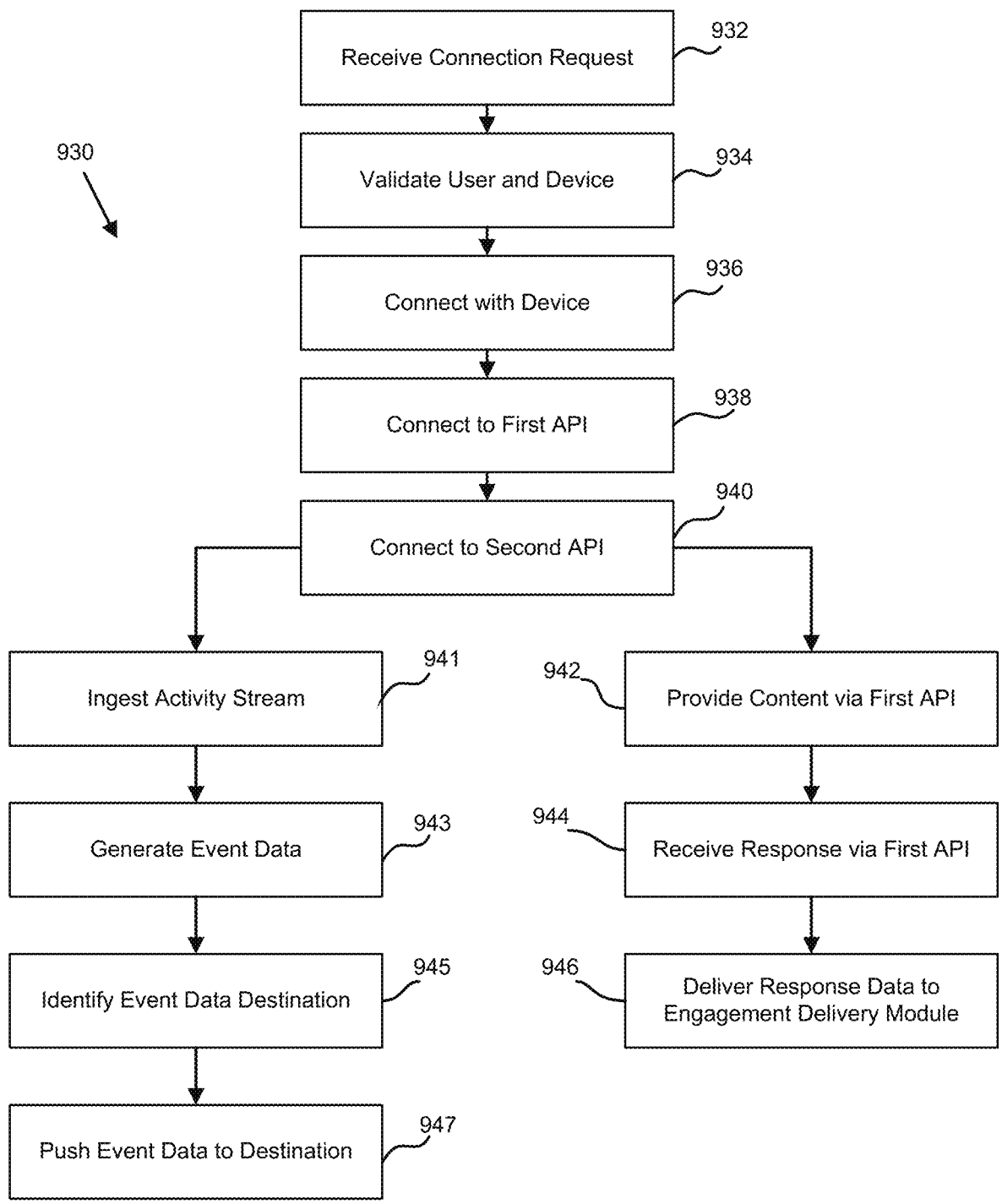
FIG. 15 is a flowchart illustrating one embodiment of a process for redundant content communication.

With reference now to FIG. 15, a flowchart illustrating one embodiment of a process 930 for redundant content communication is shown. The process 930 can be performed by all or portions of the content distribution network 100 including all or portions of the global architecture 810. In some embodiments, the process 930 can be performed by the API management and security microservice 1015, and specifically by the API Gateway and the activity stream API. The process 930 begins at block 932 wherein a connection request is received by the global architecture 810 from the user device 106 and/or supervisor device 110. This connection request can include information identifying the user and/or the device 106, 110, including, for example, a username, password, or the like. After the connection request is then received, the process 930 proceeds block 934, wherein the user and/or the device 106, 110 is validated. In some embodiments, this validation can include determining, based on the received information identifying the user and/or the device 106, 110 is accurate and associated with a current user having the required access.

After the user and/or the device 106, 110 have been validated, the process 930 proceeds block 936, wherein communicating connection with device 106, 110 is generated. After the communicating connection is established with device 106, 110, the process 930 proceeds block 938, wherein a connection with first API, and specifically with the API Gateway is established, and the process 930 proceeds to block 940 wherein a connection with the second API, and specifically with the activity stream API is established. In some embodiments, each of the first API, and the second API, can receive data from the user device, whereas only the first API provides data to the user device. In some embodiments, for example, the first API can provide content and/or package-data assets to the user, and can receive responses and/or request for content from the user. In some embodiments, the connection with one or both of the first and second APIs can be based on tokens exchanged between the device 106, 110 and the global architecture 810. In one embodiment, for example, the generation of the connection with the second API can be based on the receipt of a token from the device 106, 110 and the validation that the token was received.

After connecting to the first and second APIs, the process 930 proceeds to blocks 941 through 947, and specifically to block 941, wherein an activity stream is ingested by the second API. In some embodiments, the activity stream can comprise data indicative of all interactions between the user and the device 106, 110, and/or the user and the global architecture 810. This ingested activity stream can include, for example, responses and/or information requests or content requests. After the ingestion of the activity stream or while ingesting the activity stream, the process 930 can proceed to block 943, wherein the second API generates event data. In some embodiments, an event data can be generated from the ingested activity stream.

After event data has been generated, the process 930 proceeds to block 945, wherein one or several event data destinations are identified. In some embodiments, the event data destination can be a destination for generating event data, and specifically can be one or several modules and/or microservices of the global architecture 810 designated to receive the event data. In some embodiments, for example, the second API can include a database, and/or have access to a database identifying destinations events and/or of event types. After identification of one or several event data destinations, the event data can be pushed to the one or several event data destinations. In some embodiments, this can include pushing the generated events and/or the generated event data to one or several recipient microservices.

In some embodiments, the process 930 can perform steps 942-946 in parallel with steps 941-947, with steps 941-947 being performed by the second API and steps 942-946 being performed by the first API. In some embodiments, this can result in redundant APIs each receiving information from the device 106, 110 and each processing that information. At block 942, content can be provided to the device 106, 110 via the first API. This content can correspond to actual content and/or to a package-data asset. After the content has been provided, the process 930 proceeds to block 944, wherein a response is received. This response can be received by the first API, but can also be received by the first API as a part of the activity stream. After receipt of the response, the process 930 proceeds to block 946, wherein the response and specifically response data received with the response is delivered to the engagement delivery microservice 1020 and specifically to the learner microservice associated with the user from which the response is received. The delivery of this response data to the learner microservice can result in the evaluation of the response data and the subsequent identification and delivery of a next package-data asset to the device 106, 110, which can result in the repeating of steps 942-946.

Core Data Services

Figure 16:
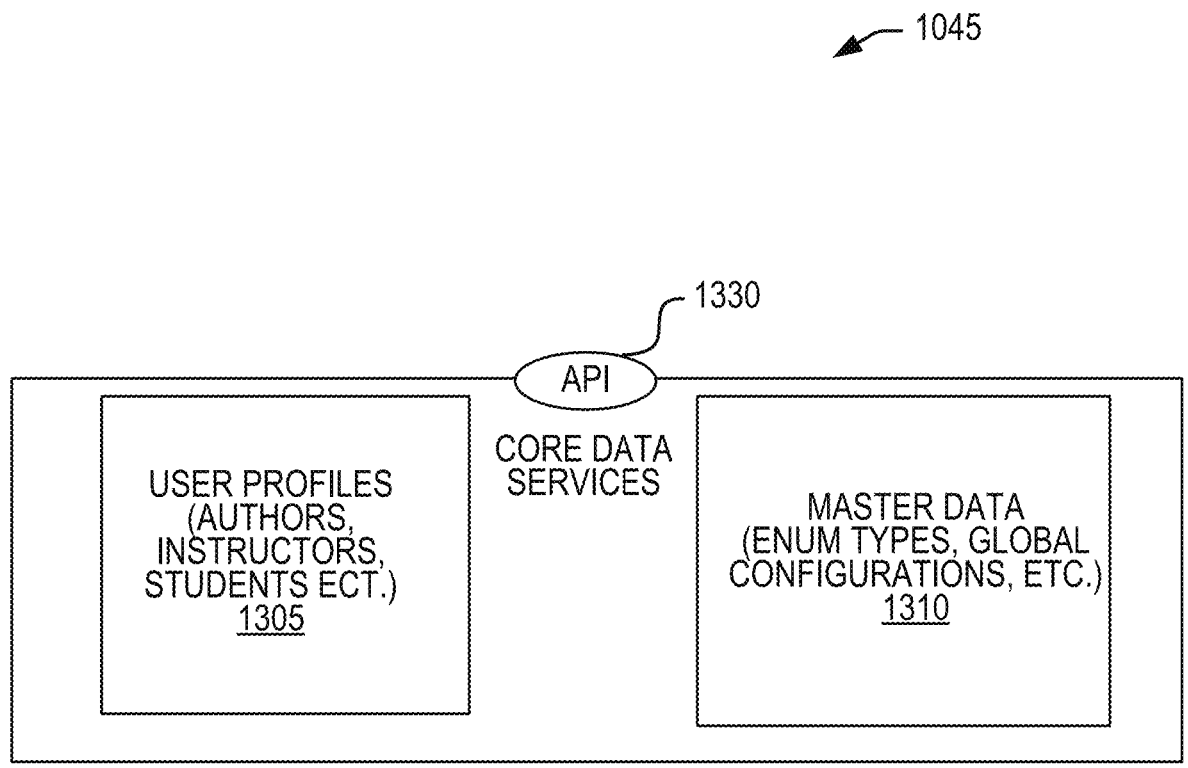
FIG. 16 is a schematic illustration of the core data services microservice.

With reference now to FIG. 16, a schematic illustration of the core data services microservice 1045 is shown. The core data services microservice 1045 exposes the services that facilitate provisioning the entities that constitute the core data model of the global architecture 810, including the User Profile, and others. Specifically, core data services 1045 sources data from external components like Identity Management, Access Management (IDAM), the LMS, and other enabling services, and provides this data to others of the microservices such as, for example, a learning engagement delivery microservice 1020, a learning product builder microservice 1030, a learning asset provisioning microservice 1035, and/or a learning model builder microservice 1040. Core data services microservice 1045 performs the operation of making the global architecture 810 aware of the existence of this data, and enables it be referenced when required. While this data may be stored in the global architecture platform, in some embodiments, the data is not stored in the global architecture platform 810 and in some embodiments, this data is not under control of the global architecture platform 810.

The core data services microservice 1045 includes a master data module 1310, and an API 1330. In some embodiments, the master data module 1310 can comprise a repository of data for consistent application across one or several of the modules or components of the global architecture platform 810. In some embodiments, the master data module 1310 can serve as a source of truth for data contained therein.

The Data Packaging Module

Figure 17:
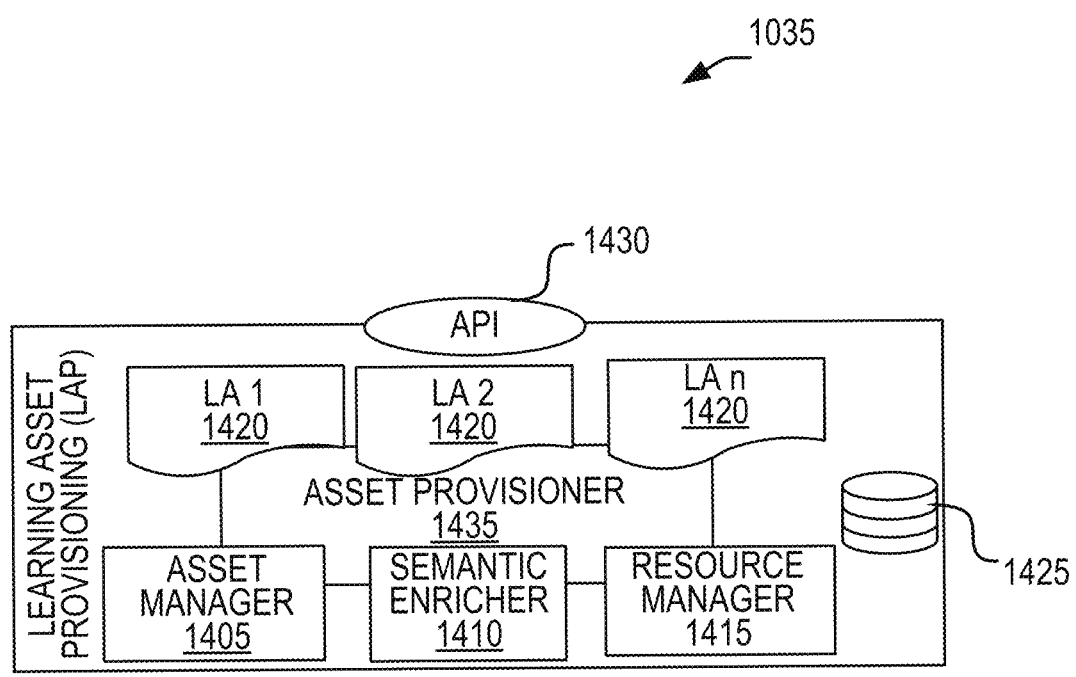
FIG. 17 is a schematic illustration of one embodiment of the data packaging module.

With reference now to FIG. 17, a schematic illustration of one embodiment of the data packaging module 1035 is shown. The learning asset provisioner microservice 1035 allows provisioning of package-data assets into the system. In some embodiments, the provisioning of content can make the global architecture platform 810 "aware" of content via the provisioning of that content. This provisioning can include the creation of a package-data asset associated with content and the enriching of the package-data asset with metadata associated with that content. In some embodiments, this metadata can specify, for example, a type of content associated with the package-data asset, rendering instructions, rendering and/or presentation requirements, or the like. In some embodiments, this metadata that is enriched into the package-data asset can be used by the global architecture platform 810 to facilitate presentation of content and to identify rendering and/or software or hardware resources required to render and/or present the content of the package-data asset. In some embodiments, a package-data asset can be the smallest unit of a learning experience.

The data packaging module 1035 can include an asset manager 1405, a semantic enricher 1410, a resource manager 1415, a database 1425, and an API 1430. In some embodiments, the API 1430 can be RESTful service exposed by the package-data asset provisioning microservice 1035, and in some embodiments, the API 1430 can be a stateless service. The asset manager 1405 can manage package-data assets 1420 and their validations. The semantic enricher 1410 can extract embedded semantic elements from content during provisioning of resources or provisioning of learning assets 1420. The semantic enricher 1410 can further enrich the package-data asset with extracted information as part of package-data asset metadata. The semantic enricher 1410 can be also used for automating resource provisioning by extracting the metadata content embedded in the content at the time of its creation in the content management system. The resource manager 1415 can control services related to learning resource entities including the create, retrieve, update and delete operations. In some embodiments, the resource manager 1415 can manage data at a resource level.

The data packaging module 1035 can include an asset provisioner 1435. The asset provisioner 1435 can encapsulate the delegation and coordination of method call to underlying modules. In some embodiments for example, the asset provisioner 1435 can provide a façade within which delegation and coordination of method calls of underlying modules can be coordinated. Thus, in some embodiments, one or several microservices of the global architecture 810 may interact with the asset provisioner 1435 to access the underlying modules of the data packaging module 1035.

Figure 18:
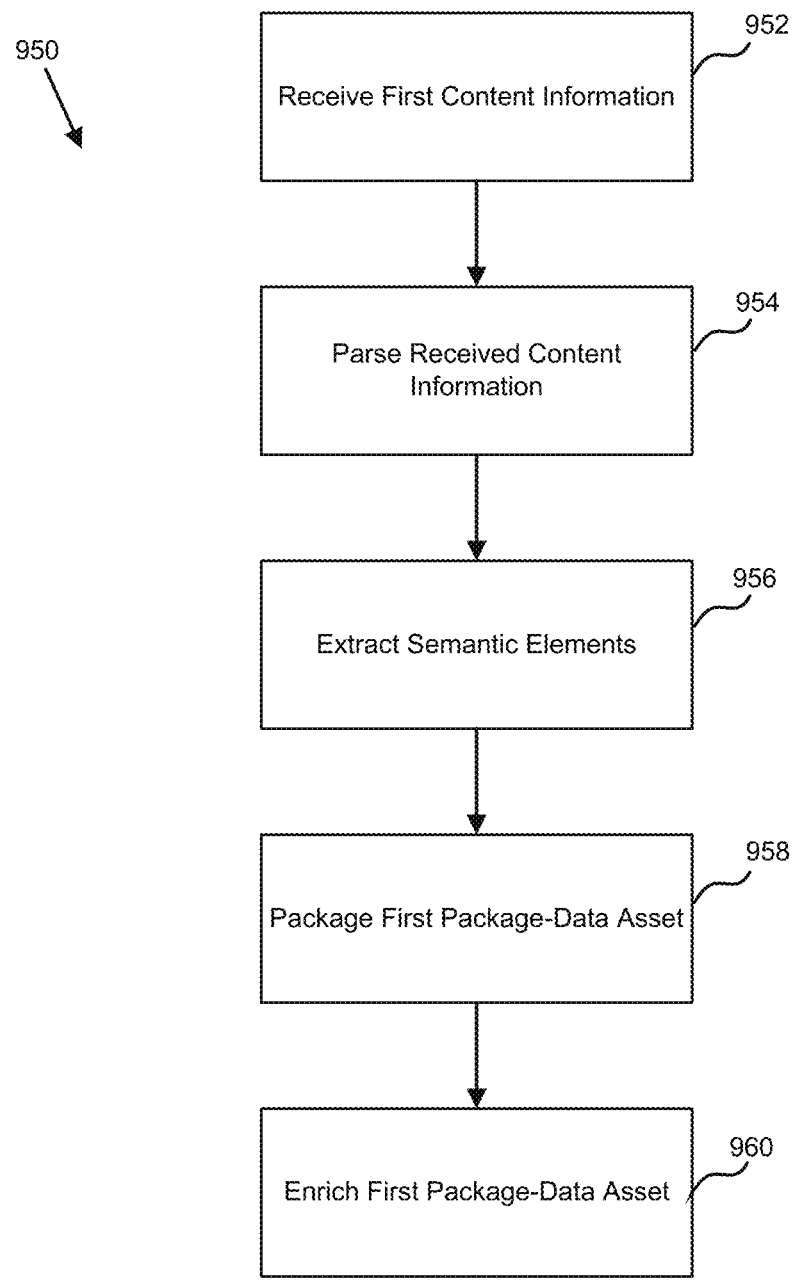
FIG. 18 is a flowchart illustrating one embodiment of a process for automatic generation of a package-data asset.

With reference now to FIG. 18, a flowchart illustrating one embodiment of a process 950 for automatic generation of a package-data asset is shown. The process 950 can be performed by all or portions of the CDN 100 and specifically of the global architecture 810. In some embodiments, the process 950 can be performed by learning asset provisioning microservice 1035. The process 950 begins at block 952, wherein first content information is received. In some embodiments, the first content can comprise metadata associated with one or several pieces of content. In some embodiments, the first content information can be received from the enabling services 1070 when content is non-native and thus located remotely from the global architecture 810, and in some embodiments, the first content information can be received from memory associated with the global architecture 810 such as, for example, the database server 104 and specifically the content library database 303. In some embodiments, the first content information can identify a location of the content associated with the first content information, which location information identifying a location can comprise a URL, directory path, or the like.

After the first content information is received, the process 950 proceeds to block 954, wherein the received content information is parsed. In some embodiments, this parsing can be performed according to a natural language processing algorithm. After the content information is parsed, the process 950 proceeds to block 956 wherein semantic elements are extracted from received first content information. These extracted semantic elements can, for example, identify capabilities required for presentation of the content associated with the received first content information.

After the semantic elements have been extracted, the process 950 proceeds to block 958, wherein a first package-data asset is generated. In some embodiments, the generating of the first package-data asset can include the packaging of a link directing to the location of the content associated with the first package-data asset. This can include, for example, the packaging of a URL, a directory path, or the like. After the first package-data asset is generated, the process 950 proceeds to block 960, wherein the first-package data asset is enriched. In some embodiments, the package-data asset can be enriched with metadata associated with the content and/or relating to the content. In some embodiments, this enrichment can be performed based on and/or with the semantic elements extracted from the received content information. The enriched first package-data asset can be stored in, for example, a database associated with the learning asset provisioning microservice 1035 such as, for example, the learning asset store.

The Model Building Module

Figure 19:
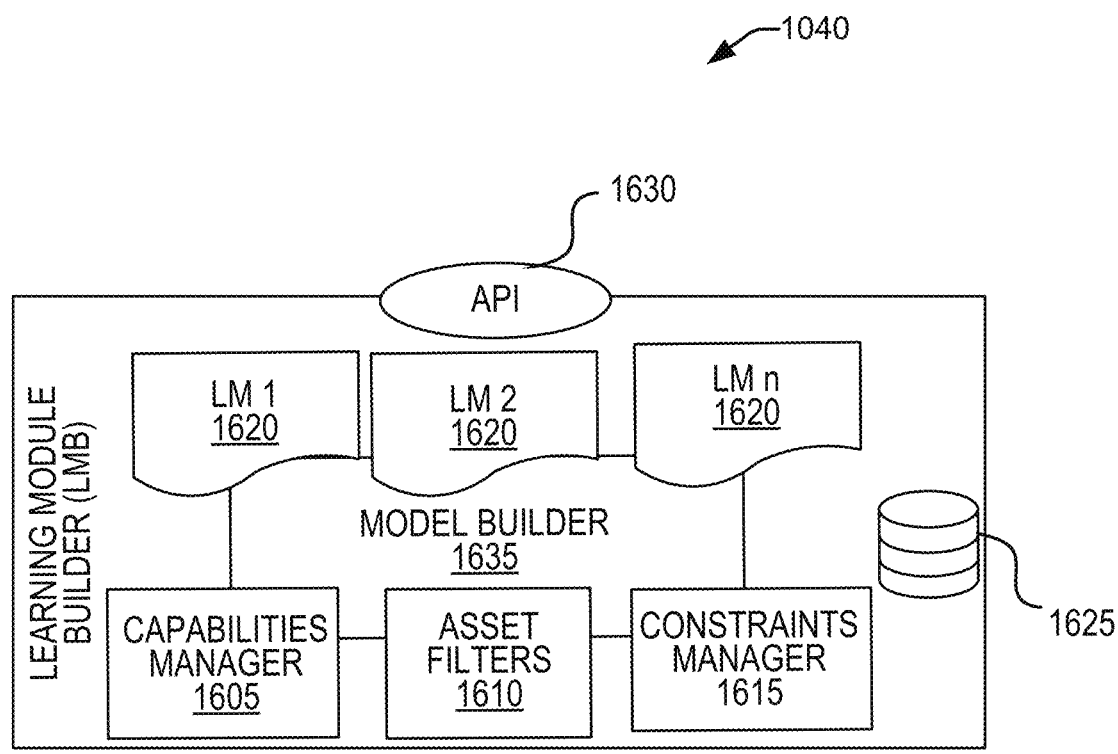
FIG. 19 is a schematic illustration of one embodiment of the learning model builder microservice.

With reference now to FIG. 19 a schematic illustration of one embodiment of the learning model builder microservice 1040, also referred to herein as a model building module 1040 or as a model building microservice 1040 is shown. The model building microservice 1040 can identify and/or determine capabilities, including a configuration of capabilities supported by the global architecture 810 to deliver a learning experience. In some embodiments, this can include identifying and/or defining parameters that can be used to score and/or dynamically provide content to support learning and specifically to support personalized learning. In some embodiments, these parameters can be computed "live" at runtime by the Analytic subsystem, using the particular computational models specified by the model building microservice 1040. In some embodiments, the model built by the model building microservice 1040 can provide the link between computational analytics and the student's experience.

In some embodiments, this learning model builder microservice 1040 can provide the services to configure the capabilities to build a learning model. This learning model can comprise the aggregation of capabilities and/or configurations of capabilities for use in connection with one or several package-data assets. The determination of capabilities and/or configuration capabilities can include determining the capabilities and/or configuration capabilities needed to render and/or provide content associated with existing package-data assets. This determination can include the retrieval of metadata enriched into package-data assets and extracting information from this metadata identifying, for example, the content type and/or capability requirements for the rendering and/or presentation of content associated with that package-data asset. In some embodiments, determining of capabilities and/or configuration capabilities can include determining the capabilities and/or configuration capabilities available to the global architecture 810. This can include, for example, retrieving information identifying software, drivers, apps, or the like existing within the global architecture 810 and the file types, formats, rendering, or the like enabled by those drivers, apps, softwares, or the like.

The model building module 1040 can include: an API 1630, a capabilities manager 1605, one or several asset filters 1610, a constraints manager 1615, a database 1625, and a model builder 1635. The API 1630 can be a RESTful service exposed by learning model builder microservice 1040. In some embodiments, the API 1630 can be a stateless service. The capabilities manager 1605 can manage the list of capabilities that are supported by the global learning platform 810. In some embodiments, the capabilities manager can provide methods to create, retrieve, update and delete the capabilities. Specifically, this can include tracking some or all of the capabilities of the global architecture 810. This can include identifying capabilities of some or all of the microservices that are a part of the global architecture 810 and/or are associated with the global architecture. In some embodiments, this can include capability discovery of capabilities of those microservices of the global architecture 810. The asset filters 1610 can capture and manage the learning models 1620 that can be specific to a set of learning assets 1420. In some embodiments, the asset filters 1610 link capabilities and assets. For example, a product model may include one or several capabilities that define applicability of content and/or assets to that product model. In some embodiments, the asset filter can filter assets to match one or several capabilities of one or several product models. The constraints manager 1615 can capture and manage the constraints on the learning models 1620 that can be very specific to geography and demography of the learner. In some embodiments, these constraints can be based off of for example, a geographic location in which the product model is being used, the legal environment in which the product model is being used, capabilities of the product model, or the like. Models created by the learning model builder microservice 1040 can be stored in the database of the learning model builder microservice 1040.

The model builder microservice 1040 can include the model builder 1635. The model builder 1635 can encapsulate the delegation and coordination of method call to underlying modules. In some embodiments for example, the model builder 1635 can provide a façade within which delegation and coordination of method calls of underlying modules can be coordinated. Thus, in some embodiments, one or several microservices of the global architecture 810 may interact with the model builder 1635 to access the underlying modules of the model builder microservice 1040.

Figure 20:
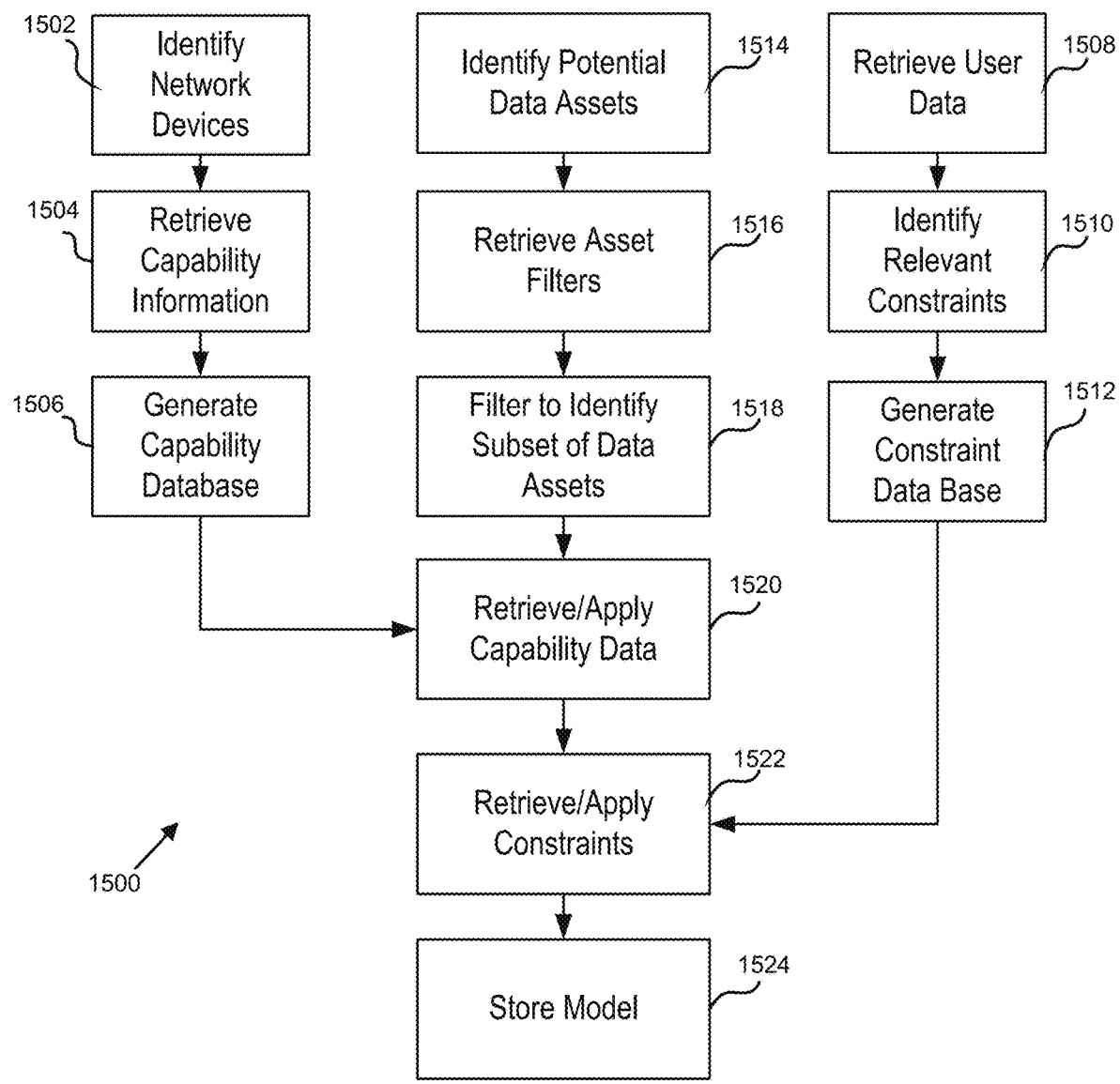
FIG. 20 is a schematic illustration of one embodiment of processes for updating models.

With reference now to FIG. 20, a flowchart illustrating one embodiment of a process 1500 for redundant content communication is shown. The process 1500 can be performed by the global architecture, and specifically by the model building module 1040. In some embodiments, the process can be performed as a part of the execution and/or delivery of a model. The process 1500 includes three components or sub processes that can be simultaneously or serially performed. In some embodiments, the first sub process comprising blocks 1502 through 1506 can be performed by the capabilities manager 1605, the second sub process comprising blocks 1508 through 1512 can be performed by the constraints manager 1615, and the third sub process comprising blocks 1514 through 15, four can be performed by the asset filter 1610, and/or the model builder 1635. The process 1500 can begin at block 1502, wherein one or several services, microservices, and/or modules of the global architecture 810 are identified. After these devices are identified, the process 1500 proceeds to block 1504, wherein capability information is retrieved these identified services, microservices, and/or modules. for the global architecture 810 and/or for some or all of the identified devices coupled to the global architecture 810. This capability information can identify hardware and/or software capabilities. In some embodiments, this retrieving of information regarding capabilities can be performed by the capabilities manager 1605.

After the capability information has been retrieved, the process 1500 proceeds to block 1506 wherein capabilities are identified. In some embodiments, this can include generating a capability database. In some embodiments, the capability database can include data identifying capabilities of the global architecture and/or of devices coupled to the global architecture. The capability database can be generated and/or maintained by the capabilities manager 1605, which can periodically review the capabilities database for accuracy and/or update the capabilities database. The capabilities database can be stored in the database 1625.

At block 1508 of the process 1500, user data is retrieved. In some embodiments, this user data can be for a plurality of users. In some embodiments, this can include information relating to locations of users, legal jurisdictions in which users are located, user demographic information, or the like. After the user data has been retrieved, the process 1500 proceeds to block 1510 wherein relevant constraints identified based on the retrieved user data. In some embodiments, these restraints can include restraints on personal information, restraints on allowable content and/or learning assets, pricing information, or the like. After the relevant constraints been identified, the process 1500 proceeds block 1512 wherein a constraint databases generated. In some embodiments, the constraint database can be generated by the constraints manager 1615, and can be stored in the database, 1625 of the model building module 1040. In some embodiments, the constraints manager can maintain the constraints database and can periodically review the constraints database to determine whether an update is desired, and/or needed.

At block 1514 of the process 1500, one or several potential data assets are identified. In some embodiments, these potential data assets can be package-data assets that can, for example, of the data packaging module 1035. These one or several assets can be identified by the model builder 1635. After one or several potential data assets have been identified, the process 1500 proceeds block 1516 wherein one or several asset filters are identified and/or retrieved. In some embodiments, these asset filters can be used to restrict all potential package-data assets to a desired set or subset of package-data assets. The asset filters can be retrieved by the asset filter 1610 from, for example, the database 1625 of the model building module 1040.

After the asset filters a been retrieved, the process 1500 proceeds to block 1518, wherein the potential package-data assets are filtered by the asset filters to identify a subset of package-data assets. After the subset of package-data acids is been identified, the process 1500 proceeds to block 1520 wherein capability data is retrieved and/or applied to the subset of package-data assets. The capability can be retrieved from the capabilities manager 1605 and/or the database 1625 of the model building module 1040, and can be applied to the subset of package-data assets by the model builder 1635. In some embodiments, the application of capabilities to the package-data assets can enable and/or facilitate rendering of the package-data assets.

A block 1522 constraints are retrieved and applied to the subset of package-data assets. In some embodiments, these constraints can be retrieved from the constraints manager 1615 and/or the database 1625 of the model building module 1040, and can be applied to the subset of package-data assets by the model builder 1635. In some embodiments, these constraints can apply limits on content provisioning, rendering, capabilities, information sharing transmission, or the like. After the retrieval and application of constraints, the process 1500 proceeds to block 1524 wherein a model comprising the subset of package-data assets with applied constraints and/or capability data is stored. The model can be stored in the database 1625 of the model building module 1040.

In some embodiments, this model can be provided and/or accessed

The Product Builder and Experience Composure Modules

Figure 21:
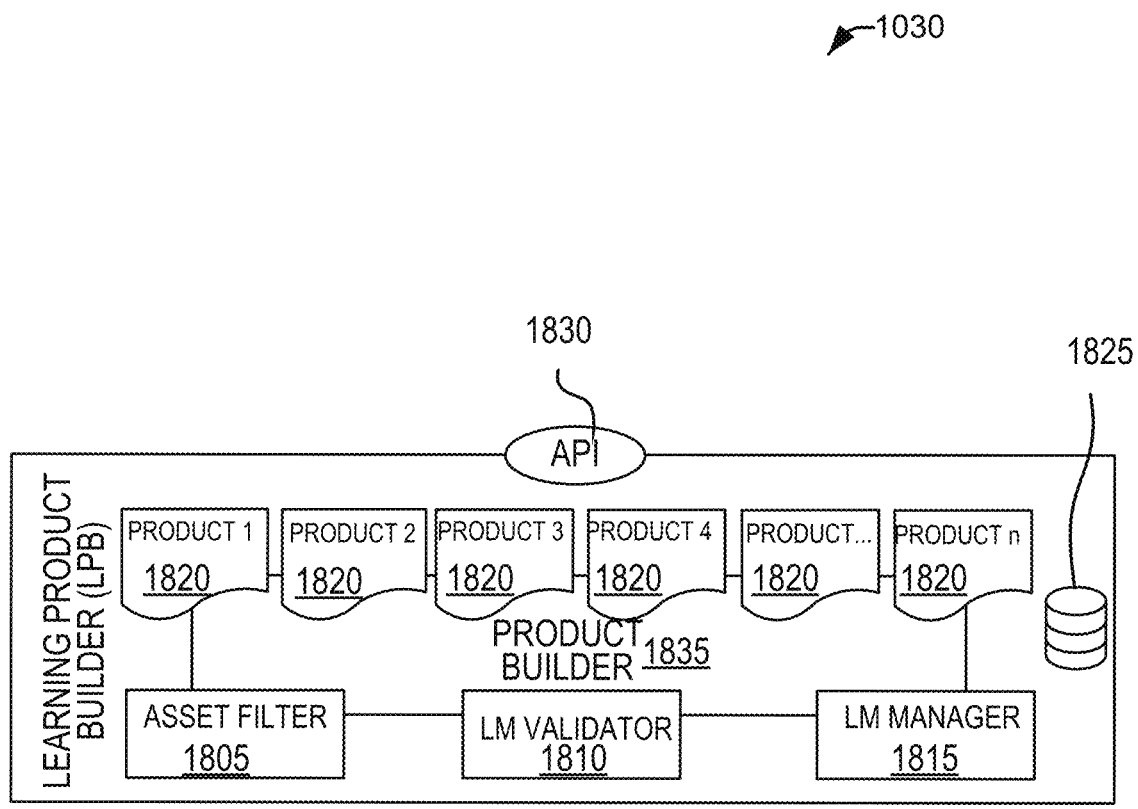
FIG. 21 is a schematic illustration of the learning product builder microservice.

With reference now to FIG. 21, a schematic illustration of the learning product builder microservice 1030, also referred to herein as a product builder microservice 1030 or a product builder module 1030 is shown. The learning product builder microservice 1030 provides services to build products based on the package-data assets and the learning model. Specifically, the learning model product builder microservice 1030 forms a product by the combination of a plurality of package-data assets and one or several learning models associated with those package-data assets. In this built product, the package-data assets can be the means to achieve a learning goal or learning objective, also referred to herein as an objective, of the product. Learning products, once created, are packaged into "Product Offerings." The global architecture 810 can provide products based on a semantically enriched content graph that enables personalization while retaining pedagogical control and from there to dynamically adaptive, model-driven titles. Together with the learning experience composer, the learning product builder offers a powerful options to instructional designers.

The product builder 1030 can include an API 1830, an asset filter 1805, a learning model validator 1810, a learning model manager 1815, a database 1825, and a product builder 1835. API 1830 can be the RESTful service exposed by the learning product builder microservice 1030, and it can be a stateless service. The asset filter 1805 can filter the package-data assets for products 1820. In some embodiments, the asset filters 1805 link capabilities and assets. For example, a product model may include one or several capabilities that define applicability of content and/or assets to that product model. In some embodiments, the asset filter can filter assets to match one or several capabilities of one or several product models. Each product 1820 can, in some embodiments, be associated with at least one learning model. The learning model validator 1810 can ensure that the sequencing of the package-data assets in the product follows the guidelines set by the learning model. In some embodiments, the learning model validator 1810 of the product builder 1030 can verify that the combined package data assets and leaning models follow one or several guidelines associated with the leaning model. Learning model manager 1815 can be responsible for managing the learning model related functions within the learning product builder microservice 1030. The product builder 1835 can create a product 1820 by assembling the information from various other modules of the learning product builder microservice 1030.

Figure 22:
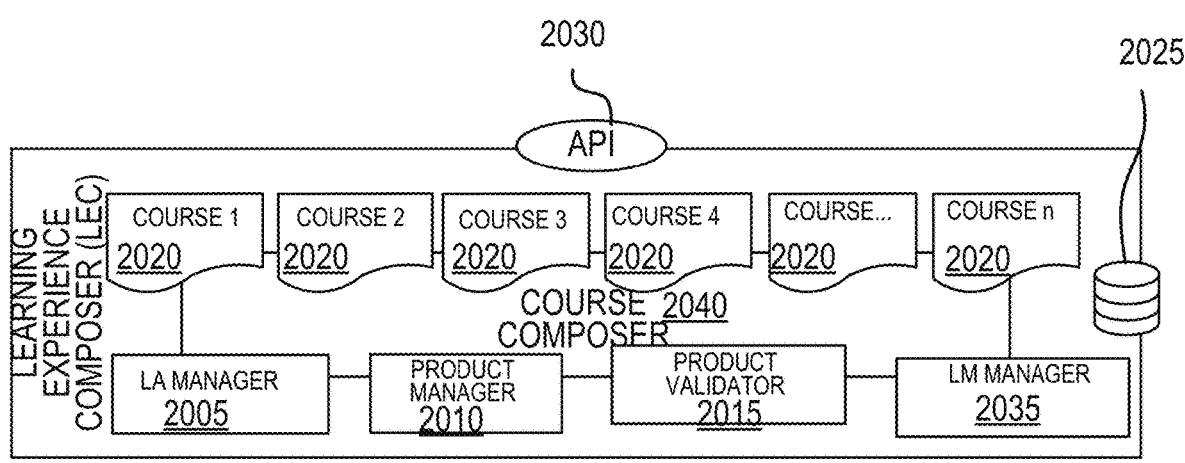
FIG. 22 is a schematic illustration of the learning experience composer microservice.

With reference now to FIG. 22, a schematic illustration of the leaning experience composer microservice 1025, also referred to herein as the experience composer module 1025, as the learning experience composer 1025, or as the experience composer microservice 1025 is shown. The experience composer module 1025 facilitates building a course from a product and assigning a path (content model) to the earning assets. The experience composer module 1025 can include: an API 2030, a learning asset manager 2005, a product manager 2010, a product validator 2015, a learning model manager 2035, a database 2025, and course composer 2040. The API 2030 can be a RESTful service exposed by the leaning experience composer microservice 1025, and it can be a stateless service. The learning asset manager 2005 can be responsible for searching and managing leaning assets 1420. The learning asset manager 2005 can also facilitate the creation of user-defined leaning assets 1420 on the fly during composing of the course 2020. The product manager 2010 can be responsible for managing the product 1820 related service required by the learning experience composer microservice 1025. Courses 2020 can be built on the products 1820 offered by the global architecture 810. Product validator 2015 can be the validation engine to confirm that the course is following the structure and guidelines defined by its underlying product(s) 1820. The leaning model manager 2035 can provide access to the information related to the leaning model(s) 1620 defined in the product 1820 and used for course 2020 creation. The course composer 2040 can be the module that assembles the course and makes it ready for delivery. In some embodiments, the course composer 2040 can coordinate and/or interact with other modules of the experience composer module 1025 to generate one or several courses 2020.

Figure 23:
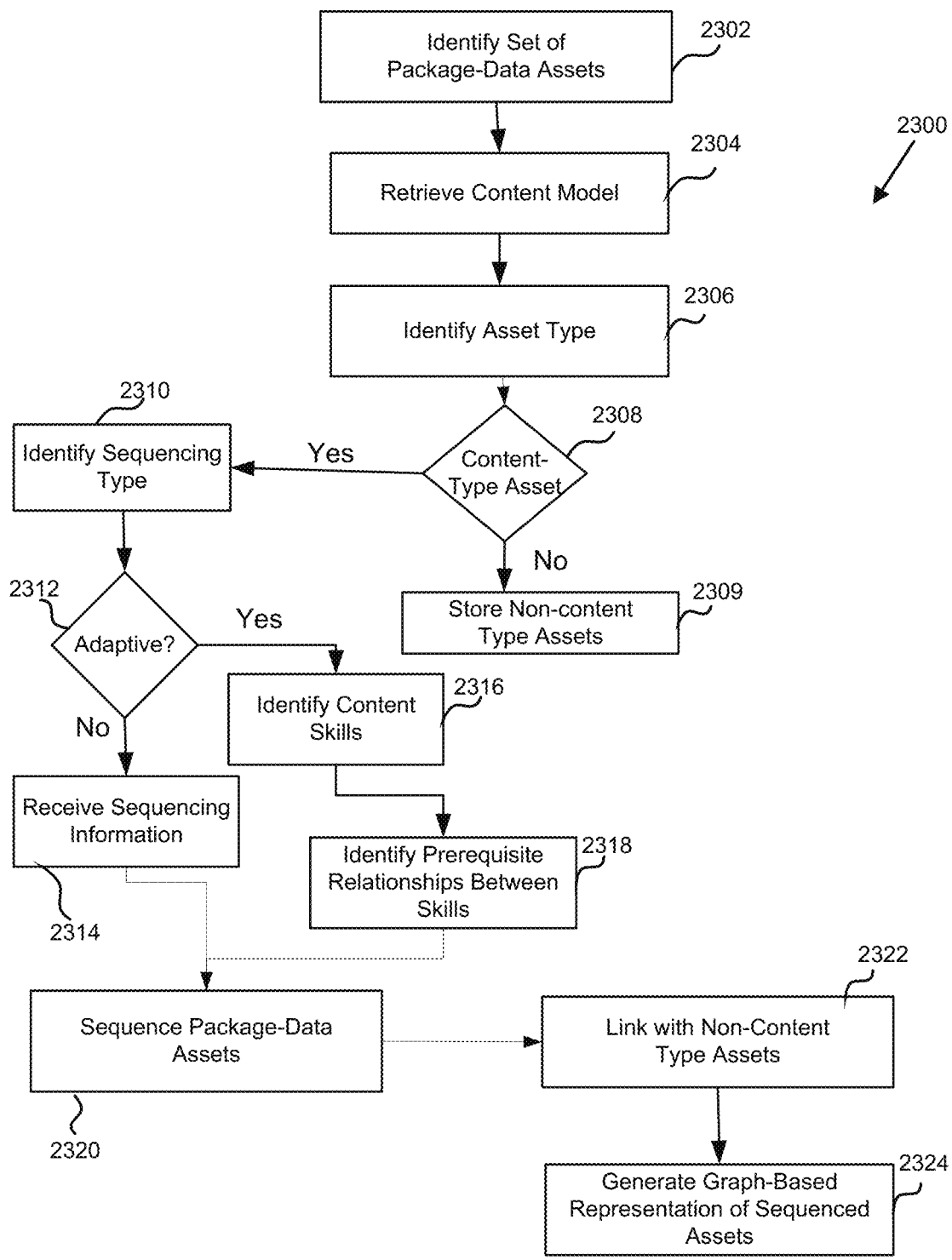
FIG. 23 is a flowchart illustrating one embodiment of a process for automatic generation of a hybrid content graph.

With reference now to FIG. 23, a flowchart illustrating one embodiment of a process 2300 for automatic generation of a hybrid content graph is shown. The process 2300 can be performed by all or portions of the global architecture 810 including, for example, the product builder 1030 and/or the experience composer 1025. The process 2300 begins a block 2302 wherein a set of package-data assets are identified. In some embodiments, the set of package-data assets can be identified in the database 1425 of the data packaging module 1035. The set of package-data assets can be identified by the product builder 1030. After the set of package-data assets has been identified, the process 2300 proceeds to block 2304 wherein a content model is retrieved. In some embodiments, the content model can be retrieved from the database, 1625 of the model building module 1040. The content model can be retrieved by the product builder 1030.

After the content model has been retrieved, the process 2300 proceeds to block 2306 wherein one or several asset types are identified. In some embodiments, for example, the package-data asset can comprise one or several content-type package-data assets and/or one or several non-content-type package-data assets. In some embodiments, the type of a package-data asset can be identified and/or determined based on metadata associated with the package-data asset. This metadata can be retrieved from the database 1425 of the data packaging module 1035 simultaneous with retrieval of the package-data assets forming the set of package-data assets and/or at a time separate from the retrieval of the set of package-data assets. In some embodiments, the identifying of one or several asset types can include identifying a first group including some or all of the assets in the set of set of package-data assets as having a first asset type and identifying a second group including some or all of the assets in the set of package-data assets as having a second asset type. In some embodiments, the first group can include some of the package-data assets in the second group, and in some embodiments, none of the package-data assets in the first group are in the second group. The type of a package-data asset can be identified and/or determined by the product builder 1030 based on metadata associated with the package-data assets.

After the asset type of the package-data assets in the set of package-data assets has been identified, the process 2300 proceeds to decision state 2308. At decision state 2308, one of the package-data assets from the set of package-data assets is selected and it is determined whether the selected package-data asset is a content-type data asset. In some embodiments, this determination of decision state 2308 can be made for some or all of the package-data assets in the set of package-data assets. If it is determined that the package-data asset is a non-content type package-data asset, then the process 2300 proceeds to block 2309, wherein the non-content type package-data asset(s) are stored. In some embodiments, the non-content type package-data asset(s) can be stored in, for example, the database 1825 of the product builder module 1030.

Returning again to decision state 2308, if it is determined that the package-data asset is a content-type package-data asset, then the process 2300 proceeds to block 2310 wherein a sequencing type is determined. In some embodiments, the sequencing type is determined based on one or several inputs received from a user. In some embodiments, this user can control all or portions of the generation of the hybrid content graph. In some embodiments, for example, a user input specifying a sequencing type can be stored in association with it to be generated content graph. In some embodiments, the sequencing type can identify at least one of adaptive sequencing, non-adaptive sequencing, and partially adaptive sequencing After the sequencing type has been identified, the process 2300 proceeds to decision state 2312 wherein it is determined whether the sequencing type is adaptive. In some embodiments, for example, a sequencing of content can be adaptive, can be non-adaptive, or can be partially adaptive. In embodiments in which the sequencing of content is adaptive, next content can be recommended according to one or several models. These one or several models can be the machine learning models or algorithms that can be trained to select next content based on inputs which can, for example, identify attributes of a user or attributes of content. In some embodiments, the attributes of the user can include, for example, user skill level, a user preference, or the like, and attributes of content can include, for example, content difficulty, content discrimination, or the like. In embodiments in which sequencing of content is non-adaptive, next content can be selected according to one or several rules and/or according to prerequisite relationships. In one embodiment of non-adaptive sequencing, content can be sequenced in a knowledge graph completion of one node in the knowledge graph results in presenting of a next node in the knowledge graph to the user. A hybrid knowledge graph can sequence content in both adaptive and the non-adaptive manner. In some embodiments, for example, some nodes may be linked in prerequisite relationships and advancements through those nodes can be according to a predetermined non-adaptive sequencing, whereas other nodes in the knowledge graph may be adaptively linked such that advancements through those adaptively and linked nodes is according to one or several adaptive models.

If it is determined that the sequencing type is non-adaptive, then the process 2300 proceeds to block 2314, wherein sequencing information is retrieved or received. In some embodiments, this sequencing information can be retrieved from, for example, the database 1425 of the data packaging module 1035, from the database 1625 of the model building module 1040, from the enabling services 1070 including, for example, from the LMS 2810 or from the content platform 2820, or from a user input. In some embodiments, the sequencing information can correspond to a sequencing of content such as, for example, a table of contents of a content aggregation can provide sequencing information for content in that content aggregation Returning again to decision state 2312, if it is determined that the sequencing type is adaptive, then the process 2300 proceeds to blocks 2316 and 2318, wherein the adaptive sequencing is generated. As specifically depicted in FIG. 23, at block 2316, content skill are identified. In some embodiments, for example each package data asset can be associated with one or several skills, and identifying the content skill can include determining or identifying this association between package-data asset and skill. In some embodiments, for example, each package-data asset can have metadata which can contain information identifying skill associated with that package data asset. Identifying the content skill of a package data asset can include retrieving this metadata and extracting information identifying the skills of the package data asset from the metadata.

After the content skills have been identified, the process 2300 proceeds to block 2318, wherein prerequisite relationships between the skills are identified. In some embodiments, this can be performed via an iterative statistical analysis, based on empirical or gathered data, or the like. The prerequisite relationships between skills can be, in some embodiments, identified by the product builder module 1030, and specifically by the learning model validator 1810 or the learning model manager 1815.

After the prerequisite relationship between the skills are identified, or alternatively after the sequencing information is received in block 2314, the process 2300 proceeds to block 2320, wherein the package-data assets are sequenced. The package-data assets can be sequenced according to the retrieved sequencing information and/or the prerequisite relationships between skills identified in block 2318. The package-data assets can be sequenced by the product builder 1030 and/or the experience composer module 1025.

After the package-data assets have been sequenced, the process 2300 proceeds to block 2322, wherein the sequenced content-type package-data assets are linked with any non-content type package-data assets. In some embodiments, this can include extracting stored non-content package-data assets from the database in which they were stored in block 2309. In some embodiments, this can include identifying and/or generating links between the package-data assets.

Figure 24:
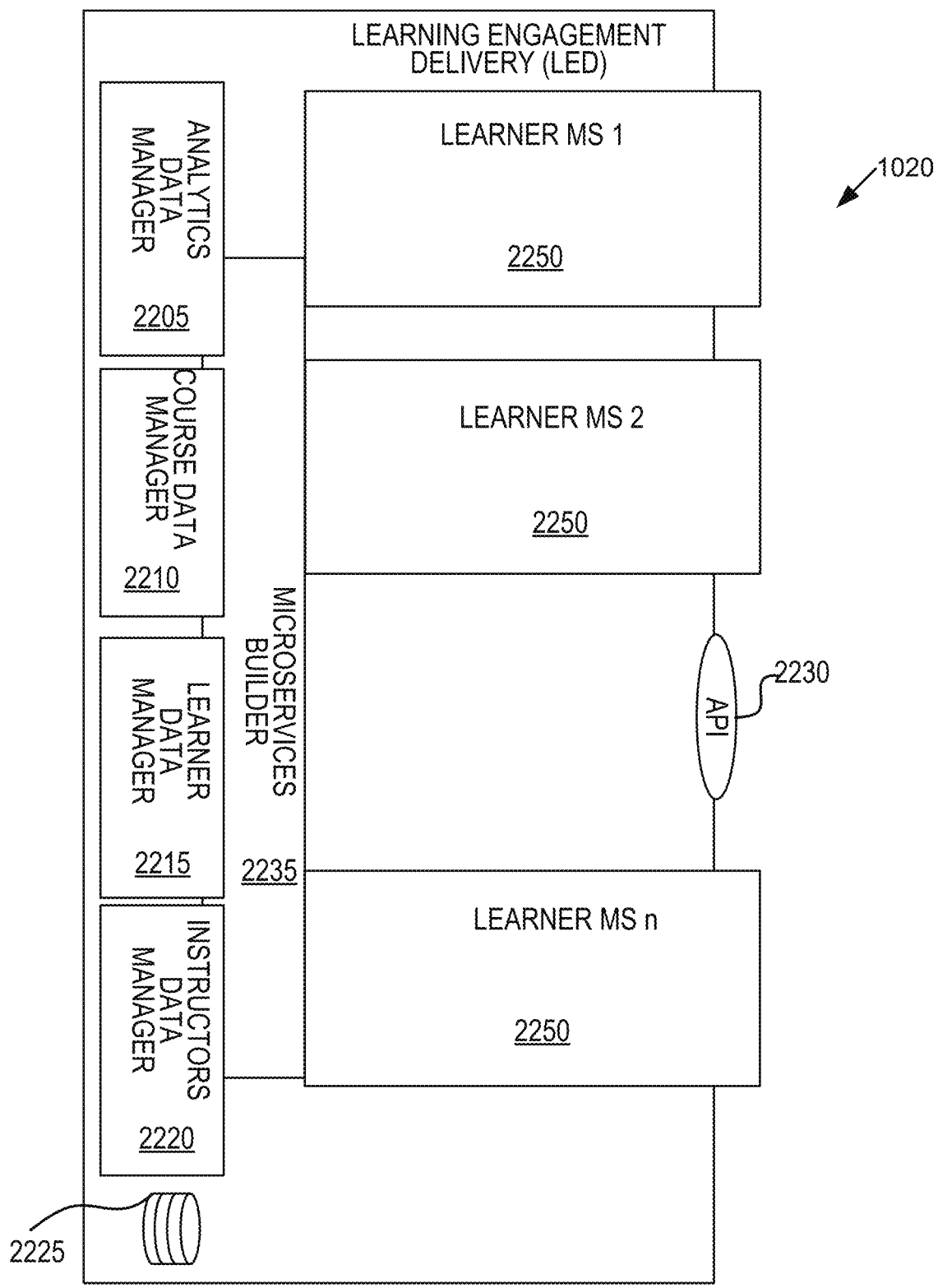
FIG. 24 is a schematic illustration of one embodiment of user microservice.

After the non-content type package-data assets have been linked with the content-type package-data assets, the process 2300 proceeds to block 2324, wherein a graph-based representation of the sequenced assets is generated. In some embodiments, this can include the populating of a graph-based representation of the package-data assets with nodes representing the package-data assets and the linking of these package-data assets in hierarchical relationships via a plurality of edges. In some embodiments, the graph-based representation can be stored in the global architecture 810, and specifically one or both of the databases 1825, 2025.
The Engagement Delivery Modules With reference now to FIG. 24, one embodiment of the learning engagement delivery microservice 1020 is shown. The learning engagement delivery microservice 1020, also referred to herein as an engagement delivery module 1020 or as an engagement delivery microservice 1020, can subscribe the recipient-users to a course and can build a logical microservice (recipient-user microservice, also referred to herein as a learner microservice) for each recipient-user and course combination. The recipient-user microservice instance created for that student and course can be the interaction point between the player device and the global architecture 810 to actually deliver the course and learning experience. Learner microservices can be self-contained microservices and can be deployed locally on the global architecture 810 or remotely on user or supervisor devices 106, 110. While deployed on the global architecture 810, they can use the existing infrastructure to authenticate and authorize the recipient-users, however when deployed remotely. The learner microservices could use their own authentication and authorization mechanism such as, for example, an authentication and authorization module 2405 to ensure the security of the services accessed.

The learning engagement delivery microservice 1020 can include: an API 2230, an analytics data manager 2205, a course data manager 2210, a recipient-user data manager 2215, also referred to herein as a learner data manager 2215, an instructors data manager 2220, a database 2225, and a microservices builder 2235. The API 2230 can be the service exposed by the learning engagement delivery microservice 1020 to enrol recipient-users and build recipient-user microservices 2250, and it can be a stateless service.

The analytics data manager 2205 can extract data from the distributed central store for analytics data for a given recipient-user(s), instructor(s) and course(s). This can include data for evaluating received responses to determine the correctness of a received response and/or the degree of correctness of a received response. The analytics data manager 2205 can keep the data available to be used in building recipient-user microservices 2250.

The course data manager 2210 can retrieve the data related to a specific course, and specifically, this information can be retrieved from one or several databases associated with the global architecture 810 such as, for example, the database 1825 of the learning product builder 1030, or the database 2025 of the learning experience composer 1025.

The recipient-user data manager 2215 can manage the recipient-user related services in the learning engagement delivery microservice 1020. This can include, for example, identifying features, services, and/or capabilities needed for the receipt of content by a user and the providing of these features, services, and/or capabilities to the microservices builder 2235 for user is creation of a user microservice 2250. This information regarding features, services, and/or capabilities can be retrieved from other modules 1055, 1040, 1035, 1030, 1025 of the global architecture 810.

The instructors data manager 2220 can make instructor's data available in the learning engagement delivery microservice 1020. The microservices builder 2235 can build the recipient-user microservices 2250. Specifically, in some embodiments, the microservices builder 2235 can build the user microservices 2250 by communicating with and/or controlling other modules 2205, 2210, 2215, 2220, 2225 of the engagement delivery microservice 1020. The microservices builder 2235 can consolidate the data from analytics data manager 2205, course data manager 2210, recipient-user data manager 2215, instructor data manager 2220, and the database 2225 into a single schema for recipient-user microservices. In some embodiments, microservices builder 2235 can be invoked every time a recipient-user enrols in a course and can build the recipient-user microservice 2250 and can keep that recipient user microservice 2250 ready for deployment. In some embodiments, that recipient user microservice 2250 and/or a record of that recipient user microservice 2250 can be stored in the database 2225, which database 2225 is also referred to herein as the custom microservice database 2225. In some embodiments, for example, the microservices builder 2235 can, upon receive a request for content delivery to a user, determine if a recipient user microservice 2250 has already been generated for the user and/or has already been generated for the combination of the user requesting content and course to which the requested content belongs. If such a microservice is not identified in the database 2225, then the microservice builder 2235 can create the customized microservice 2250 and can update the database 2225 to include information relating to this microservice 2250 and/or to include the microservice 2250.

In some embodiments, the microservice builder 2235 can further create a sandbox for each created user microservice 2250 such that each user microservice 2250 can operate within a self-contained environment to limit security vulnerability of the global architecture. In some embodiments, the microservice builder 2235 can register the recipient-user microservices 2250 with the service registry defined in the API management and security 1015.

Figure 25:
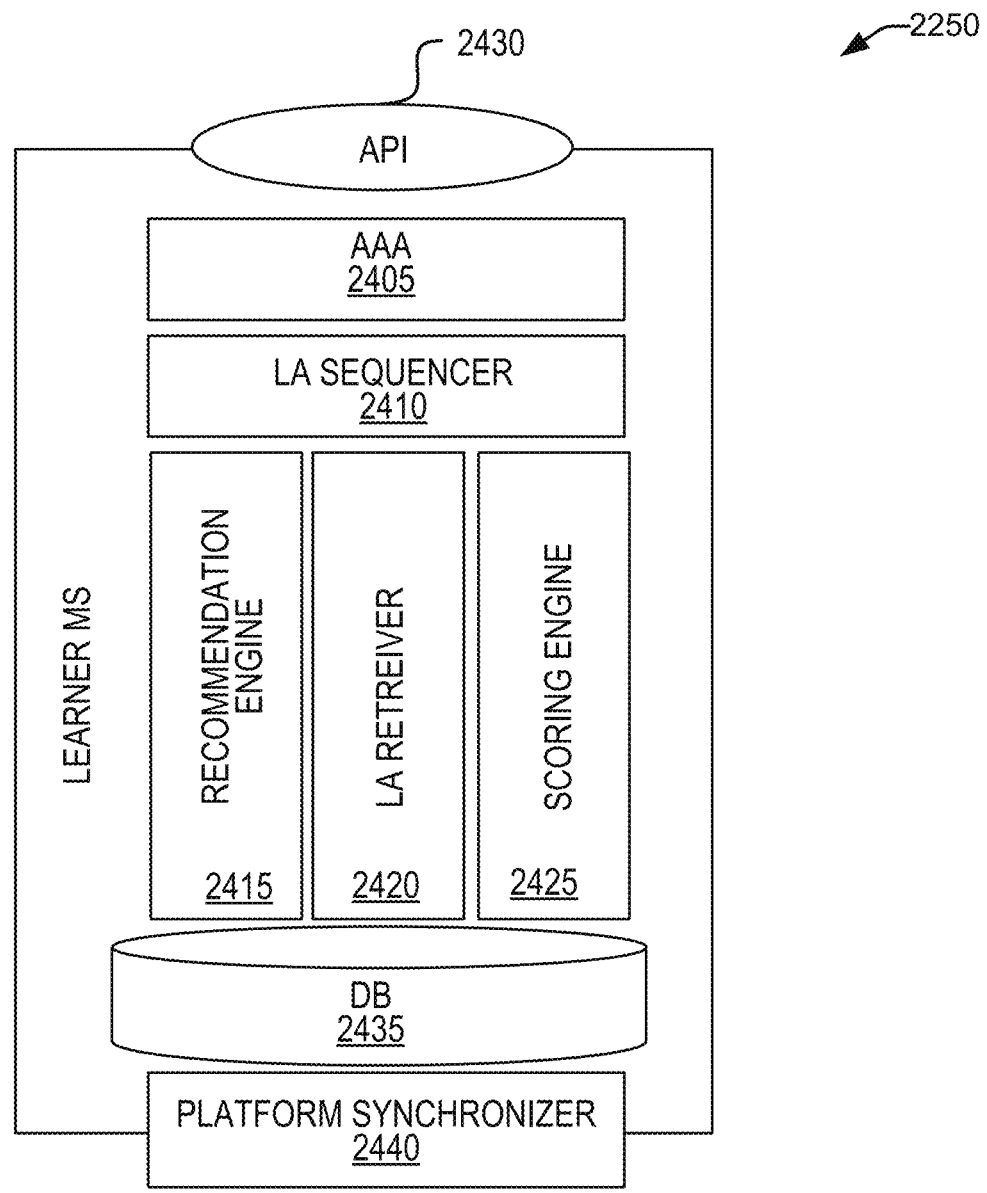
FIG. 25 is a schematic illustration of one embodiment of the user microservice.

With reference now to FIG. 25, a schematic illustration of one embodiment of the user microservice 2250 is shown. In some embodiments, the user microservice 2250 can comprise a platform user microservice 2250-A stored as part of the global architecture 810 and a local user microservice 2250-B stored as a local copy on the user device 106. These versions 2250-A, 2250-B of the user microservice 2250 can facilitate online (connected) or offline (unconnected) user interaction with the global architecture 810 and/or content thereof.

In some embodiments, a recipient-user might service 2250 can include a plurality of modules and/or components. These can include, for example, platform synchronizer 2240. In instances in which the user device 106 is unconnected to the global architecture 810, the platform synchronizer 2240 can synchronize an instance of the recipient-user microservice 2250 on the user device 106, the local user microservice 2250-B, with an instance of the recipient-user microservice 2250, the platform user microservice 2250-A, on the global architecture 810. In embodiments in which the user device 106 is connected with the global architecture 810, the platform synchronizer 2240 can buffer the activity processed through the user microservice 2050 until it can be persisted and processed by the client.

The recipient-user microservice 2250 can further include a database 2435, a recommendation engine 2415, a learning asset retriever 2420, scoring engine 2425, a learning asset sequencer 2410, and/or the authentication and authorization module 2405. In some embodiments, the database 2435 can store data, such as one or several package-data assets for presentation to the user and/or data for sequencing the same. In some embodiments, this data for sequencing the same can include data for user by the scoring engine 2425 in evaluating any responses received to provided package-data assets and/or data, such as one or several models, for use by the recommendation engine 2415 in selecting and/or recommending next content and/or next package-data assets for presenting to the user.

In some embodiments, the learning asset sequencer 2410 can identify and provide a next package-data asset. In some embodiments, for example, the learning asset sequencer 2410 can identify a next learning asset when the sequencing of the learning assets is non-adaptive. In such an embodiments, the learning asset sequencer 2410 can identify completed learning assets in the knowledge graph containing learning assets, can identify the most recently traversed package-data asset, and can identify a next package data asset. In some embodiments, the next package-data asset can be the package-data asset that is a child of the most recently traversed or completed package-data asset. The learning asset sequencer 2410 can further maintain and persist user data and/or the state of a recipient-user for a given course. The learning asset sequencer 2410 can act as a façade to retrieve one or several next package-data asset by internally invoking one or several modules of the global architecture 810 and/or of the user microservice 2250.

The recommendation engine 2415 of the learner microservice 2250 can provide the next package-data asset for a learner to traverse. Particularly, the recommendation engine 2415 can identify one or several next package-data assets according to an adaptive recommendation which can be, for example, based on one or several machine-learning algorithms trained to predict and/or identify next package-data assets. In some embodiments, these one or several next package-data assets can be predicted and/or identified according to one or several attributes and/or features which can be inputted into the machine learning algorithm. These attributes and/or features can include, for example, score, user skill level, package-data asset difficulty level, time on task, course objective, learning objective, or the like. In some embodiments, the user skill level can be specific to the user to whom the package-data asset is to be provided, and in some embodiments, the user skill level can include attributes of other users in, for example, a group such as a class with the user to whom the package-data asset is to be provided. In some embodiments, the recommendation provided by the recommendation engine 2415 can be based on a learning model associated with that particular course, which learning model can be retrieved by the user microservice 2250 from the model builder module 1040.

The learning asset retriever 2420 fetches the package-data asset from a database 1425 of the learning asset provisioning microservice 1035, which database 1425 is also referred to herein as the learning asset store 1425. In some embodiments, the learning asset retriever 2040 can pre-fetch package-data assets and cache them in the database 1425 of the learner microservice 1035 thereby improve response. Further, to support an off-line mode, the learning asset retriever 2420 can also download all package-data assets associated with the course, and maintain them in its cache or in the database 2435.

The scoring engine 2425 contains and/or can access algorithm to measure the performance of the recipient-user, and specifically to evaluate response received from the recipient-user and/or interaction by the recipient user with the global architecture 810. In some embodiments, the scoring engine 2425 can compute the score of a learning asset 1420 of type "assessment" based on the response from the recipient-user. The scoring engine 2425 can also compute one or several scores of learning asset 1420 of type "narrative" based on the recipient-users interaction with the learning asset 1420 during the process of learning.

The user microservice 2250 can further include the API 2430. The API 2430 can be the service interface for the recipient-user microservice 2250. The API 2430 can be stateful such that each subsequent request will fetch a response based on the response of previous request.

Figure 26:
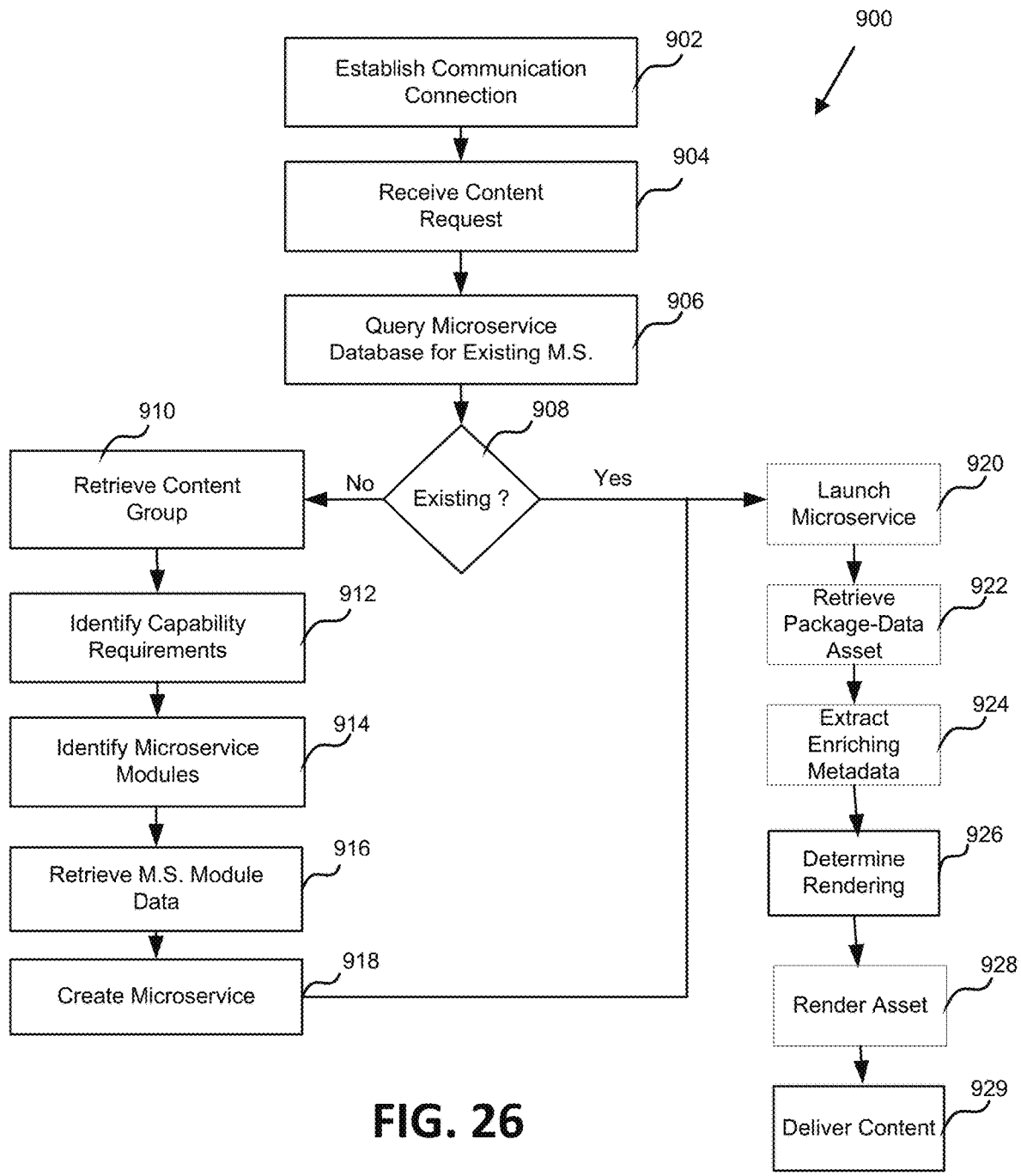
FIG. 26 a flowchart illustrating one embodiment of a process for automated personalized microservice generation is shown.

With reference now to FIG. 26, a flowchart illustrating one embodiment of a process 900 for automated personalized microservice generation is shown. The process 900 can be performed, for example, when content is requested and a personalized microservice has not been previously generated and/or assigned. The process 900 can be performed by the content distribution network 100, including, for example, the global architecture 810 as located within the CDN 100.

The process 900 begins at block 902, wherein a communicating connection with a user device 106 is established. In some embodiments, this communicating connection can be established via one or several communications APIs contained within the API management and security microservice 1015. In some embodiments, the establishment of a communicating connection can include the receipt of a unique user identifier such as, for example, a username and/or password. At block 904 a content request is received. The content request can be received by the server 102 and specifically by the global architecture 810 from the user device 106. The content request can include, for example, identification of the requesting user, identification of the requested content, capability information identifying one or several attributes and/or capabilities of the user device 106, a content group, or the like.

After the content request has been received, the process 900 proceeds block 906 wherein the microservice sub-database, which can be a part of the user profile database 301 of the database server 104 and/or part of the database 2225 is queried. In some embodiments, this query can comprise a request to determine whether the microservice sub-database contains a custom user microservice corresponding to the received content request. In some embodiments, this can include determining whether a custom user microservice is already generated for the user from which the content request is received and/or whether a custom user microservice is already generated for the combination of user in a course for which the content request is received.

At decision state 908, it is determined if the microservice sub-database contains the query for microservice. If it is determined that the microservice sub-database does not contain the query for microservice, then the process 900 proceeds to block 910 wherein a content group for the requested content is identified and/or retrieved, and/or data for the content group is identified and/or retrieved. In some embodiments, the content group can correspond to the course in which the user is enrolled. In some embodiments, the content group can be identified based on information stored in the database server 104, and specifically in the user profile database 301 of the database server 104.

Once the content group has been identified and/or retrieved, process 900 proceeds to block 912 wherein one or several capability requirements for content associated with that content group are determined. In some embodiments, this can include determining capability requirements of the requested content and/or subsequent content to that requested content, which subsequent content can be presented to the user based on user interaction with the global architecture 810. In some embodiments, capability requirements can be stored in the global architecture 810. Specifically, in a database associated with, for example, the learning experience composer 1025, the learning product builder 1030, learning asset provisioning 1035, and/or the learning model builder 1040. These capability requirements are to identify required capabilities of the user device for receipt of content associated with the content group, capability requirements for custom user microservice, or the like.

After the capability requirements are identified, the process 900 proceeds block 914, wherein one or several microservice modules identified. In some embodiments, these include, for example, authentication and authorization module, a learning asset sequencer, recommendation engine, a learning asset retriever, scoring engine, the database, and/or platform sequencer. These modules can be identified from one or several databases of the engagement delivery microservice 1020.

After the microservice modules have been identified, the process 900 proceeds to block 916, wherein microservice module data is received and/or retrieved. In some embodiments, this information can comprise code or code segments to which one or several microservice modules can be created. This microservice module data can be received to retrieved from one of the databases of the engagement delivery microservice 1020 such as, for example database 2225. After the microservice module data has been received or retrieved, the process 900 can proceed to block 918, wherein the custom user microservice is created. In some embodiments, the custom user microservice can be created by the microservice builder 2235 of the engagement delivery microservice 1020 based on the identified capability requirements, the identified microservice modules, the retrieved content groups, and the retrieved microservice module data. In some embodiments, the custom user microservice can include, for example, a recommendation engine which can be an independent recommendation engine and which can comprise a machine-learning algorithm that can be trained to identify next content based on one or several attributes of the next content and/or of the user.

After the microservice has been created, or returning to decision state 908, if it is determined that there is an existing microservice, than the process 900 proceeds to block 920 wherein microservices launched. In some embodiments, the launch of the service can include the generation of the graphical user interface associated with microservice, the transfer of data to the user device 106 and/or the supervisor device 110, and/or the downloading of the microservice to the user device 106 or supervisor device 110 to create a copy or an instance of the learner microservice on the user device 106 and/or supervisor device 110.

After the microservice has been launched, the package data asset corresponding content request received in block 904 is retrieved. In some embodiments, this package-data asset can be retrieved by the learning asset retriever of the custom user microservice from the learning asset store of the learning asset provisioning microservice 1035. After the package-data asset has been retrieved, the process 900 proceeds block 924 wherein enriching metadata is extracted from the package-data asset. This enriching metadata can specify attributes of the content associated with package-data assets such as, for example, the type of the content associated with package-data assets and/or capability requirements for providing the content associated with the package-data asset.

After the enriching metadata has been extracted, the process 900 proceeds to block 926 wherein a rendering of the package-data asset is determined. In some embodiments, this can include the determination of the viewers required to launch and/or present the content. After the rendering has been determined, the process 900 proceeds to block 928 wherein the package-data asset and/or the content associated with the package-data asset is rendered by the learner microservice, and the process then proceeds to block 929, wherein the content requested in block 904 is delivered to the user via the learner microservice. In some embodiments, the delivery of the content can comprise the delivery of one or several package-data assets, each of some or all of the package-data assets can include a link to associated content. In some embodiments, and upon receipt of the one or several package data assets, the content associated with the package data assets can be automatically retrieved via the links associated with each of the some or all of the package-data assets.

Figure 27:
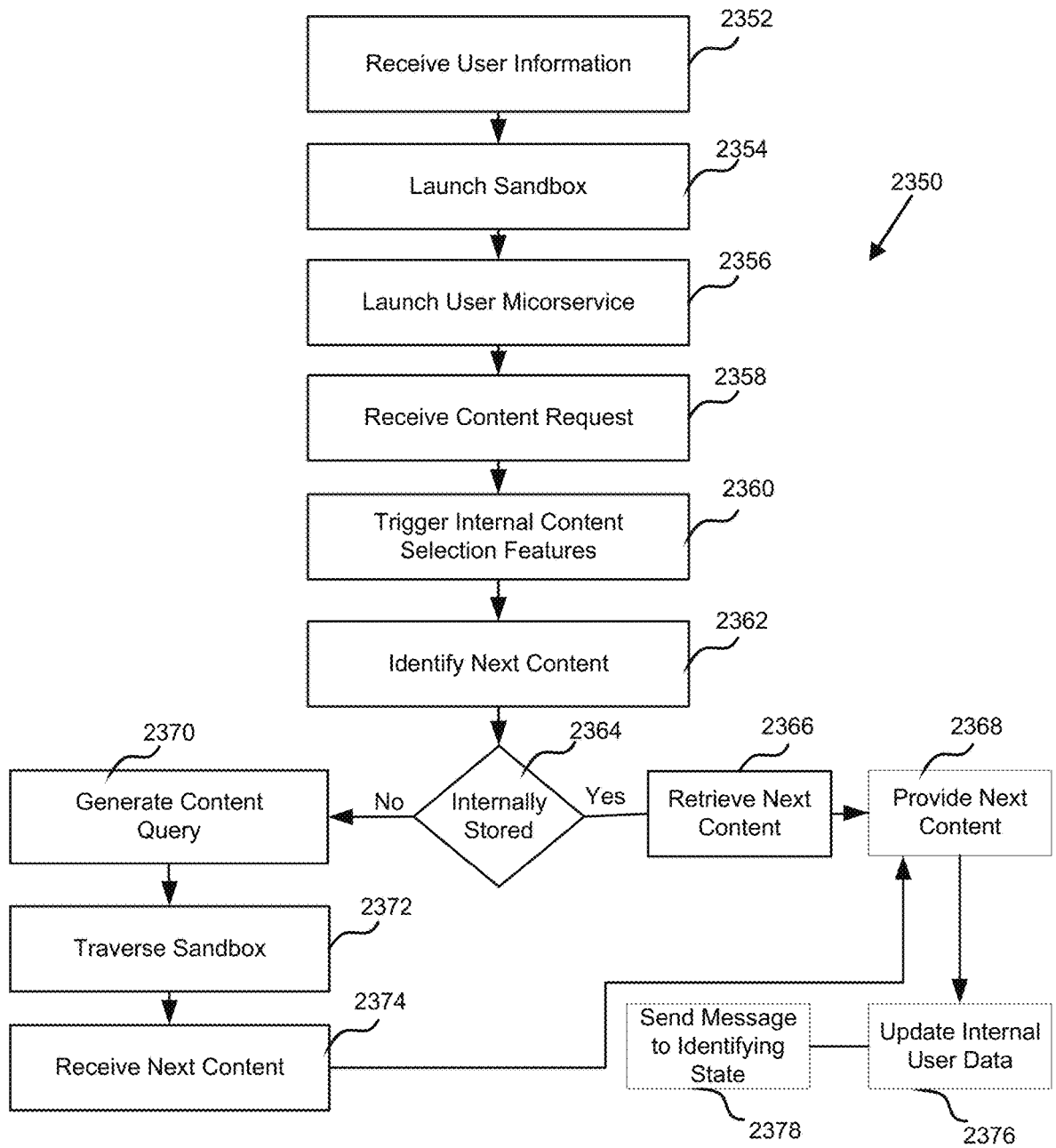
FIG. 27 is a flowchart illustrating one embodiment of a process for content delivery via an individualized and secured content delivery microservice.

With reference now to FIG. 27, a flowchart illustrating one embodiment of a process 2350 for content delivery via an individualized and secured content delivery microservice. The process 2350 can be performed by all or portions of the global architecture 810 including, for example, the engagement delivery module 1020 and/or the user microservice 2250. In some embodiments, for example, the process 2350 can be performed by the global architecture 810 when a platform user microservice 2250-A is used, and the process 2350 can be performed by the user device 106, when a local user microservice 2250-B is used.

The process 2350 begins at block 2352, wherein user information is received. In some embodiments, this can comprise user login information and/or information identifying content and/or a group of content, such as a course requested by the user. The user information can be received API management and security module 1015, and specifically by the API gateway 970. This information can then be sent to, for example, the cross-cutting services 1055, and specifically to, for example, the inter-process communication service 2730, and/or to the service orchestrator 1065 that can, for example, communicate with the IDAM 2805 to determine the validity of the received user information. In some embodiments, alternatively, the user information can be received by the user device 106, and specifically can be received by the client application running on the user device 106, which client application can include the user microservice 2250. In such an embodiment, the received user information can be validated by the authentication and authorization module 2405.

After the user information is received, the process 2350 proceeds to block 2354 wherein sandbox is launched. The sandbox can be launched within the client application of the user device 106 and/or can be launched within the engagement delivery module 1020. The sandbox can create a controlled environment, wherein user microservice 2250 can operate so as to mitigate vulnerability of the global architecture 810. In some embodiments, the sandbox is unique to the user, is unique to the user microservice, or the like. In such an embodiment, the sandbox to be launched is identified based on user information received in block 2352, and the identified sandbox is then launched.

After the sandbox is and launched, user microservice 2250 is launched in the sandbox as indicated in block 2356. In some embodiments, the launch of the user microservice can include the determination of whether an appropriate user microservice 2250 already exists. If such a user microservice 2250 does not exist, then the appropriate user microservice 2250 can be generated according to the process of FIG. 26. Alternatively, if it is determined that the appropriate user microservice 2250 exists, then this user microservice 2250 can be identified and can then be launched. In some embodiments, the appropriate microservice can be a microservice customized for the user and/or customize for the user and the requested content or group of content.

In embodiments in which the process 2350 is performed by the user device 106, user microservice 2250 can be launched by the client app of the user device 106, whereas in embodiments in which the process 2350 is performed by the global architecture 810, the user microservice can be launched by the engagement delivery module 1020, and specifically by the microservice builder 2235 of the engagement delivery module 1020.

After the launch of the user microservice, the process 2350 proceeds block 2358 wherein a content request is received. In some embodiments, the content request can be received by the API 2430 of the user microservice 2250.

After the content request is been received, the process 2350 proceeds to block 2360 wherein one or several internal content selection features are triggered. In some embodiments, these features can include, for example, the learning asset sequencer 2410, and/or the recommendation engine 2415. In some embodiments, these features can all be located within the user microservice 2250, in some embodiments, the user microservice can query other components of the global architecture 810 for requested content via, for example, the platform synchronizer 2440, which can communicate with the Gateway API 970. Thus, for example, in embodiments in which the process 2350 is performed by the global architecture, the internal content selection features can include, for example, the course data manager 2210, the alerting data manager 2215, the experience composer module 1025, product builder module 1030, the asset provisioning module 1035, and/or the model builder module and 40.

After the triggering internal content selection features, the process 2350 proceeds to block 2362. Where next content is identified. In some embodiments, wherein next content is identified. In some embodiments, next content can be identified according to the knowledge graph, which can be generated, for example, in the process depicted in FIG. 23. This next content can, in some embodiments, be adaptively selected and/or be non-adaptively selected. The next content can be selected by the learning asset sequencer 2410 and/or by the recommendation engine 2415.

After the next content has been identified, the process 2350 proceeds to decision state 2364, wherein it is determined if the next content is internally stored, and specifically if the next content is stored in the database 2435 of the user microservice 2250. This can include querying the database 2435 for the next content and receiving a response from the database 2435 indicating the presence or absence of the next content in the database 2435.

If it is determined that the next content is internally stored, then the process 2350 proceeds to block 2366, wherein the next content is retrieved and/or received. In some embodiments, the next content can be received and/or be retrieved by the learning asset retriever 2420.

Returning again to decision state 2364, if it is determined that the next content is not internally stored, then the process 2350 proceeds to block 2370 wherein a content query is generated. In some embodiments, the content query can be generated by the learning asset retriever 2420, which learning asset retriever 2420 can fetch one or several package-data assets from the database 1425 of the learning asset provisioning microservice 1035. In some embodiments, the content query can comprise a request for providing of one or several package-data assets. This request can comprise, for example, one or several electrical communications. After the content query has been generated, the process 2350 proceeds to block 2372, wherein the content query traverses the sandbox. In some embodiments, this can include an evaluation, the content query to determine the safety of the content query and/or to identify any unallowable of the content queries or content contained within the content queries. After the evaluation of the content query, the content query can be provided from the user microservice 2250 to, for example, the cross cutting services 1055, and specifically to the inter-process communication service 2730. In some embodiments, the content query can comprise an event, incorporated into a data stream generated by the cross cutting microservices 1055 in their function as a virtual bus.

After the traversing of the sandbox, the process 2350 proceeds to block 2374, wherein next content is received. In some embodiments, this next content can be received by the learning asset retriever 2420. After the next content has been received, or after the next content has been retrieved, as indicated in block 2366, the process 2350 proceeds to block 2368 wherein the next content is provided. In some embodiments, the next content can be provided to the user of the user device 106 via, for example, the I/O subsystem 526 of the user device 106.

After the next content has been provided, the process 2350 proceeds to block 2376 wherein user data, and specifically user data internal to the user microservice 2250 is updated. In some embodiments, this can include updating the database 2435 to reflect a change state of the user, and specifically to reflect the providing of the next content. After the user data has been updated, the process 2350 proceeds to block 2378, wherein a message identifying the updated user data, and specifically the change state of the user is sent to the global architecture 810. In some embodiments, this message can be generated and sent by the platform synchronizer 2440 in communication with, for example, the Gateway API 970. In addition to this, and in some embodiments, simultaneous with the communicating with the Gateway API then hundred 70, activity data can be sent to the activity stream API 978.

Figure 28:
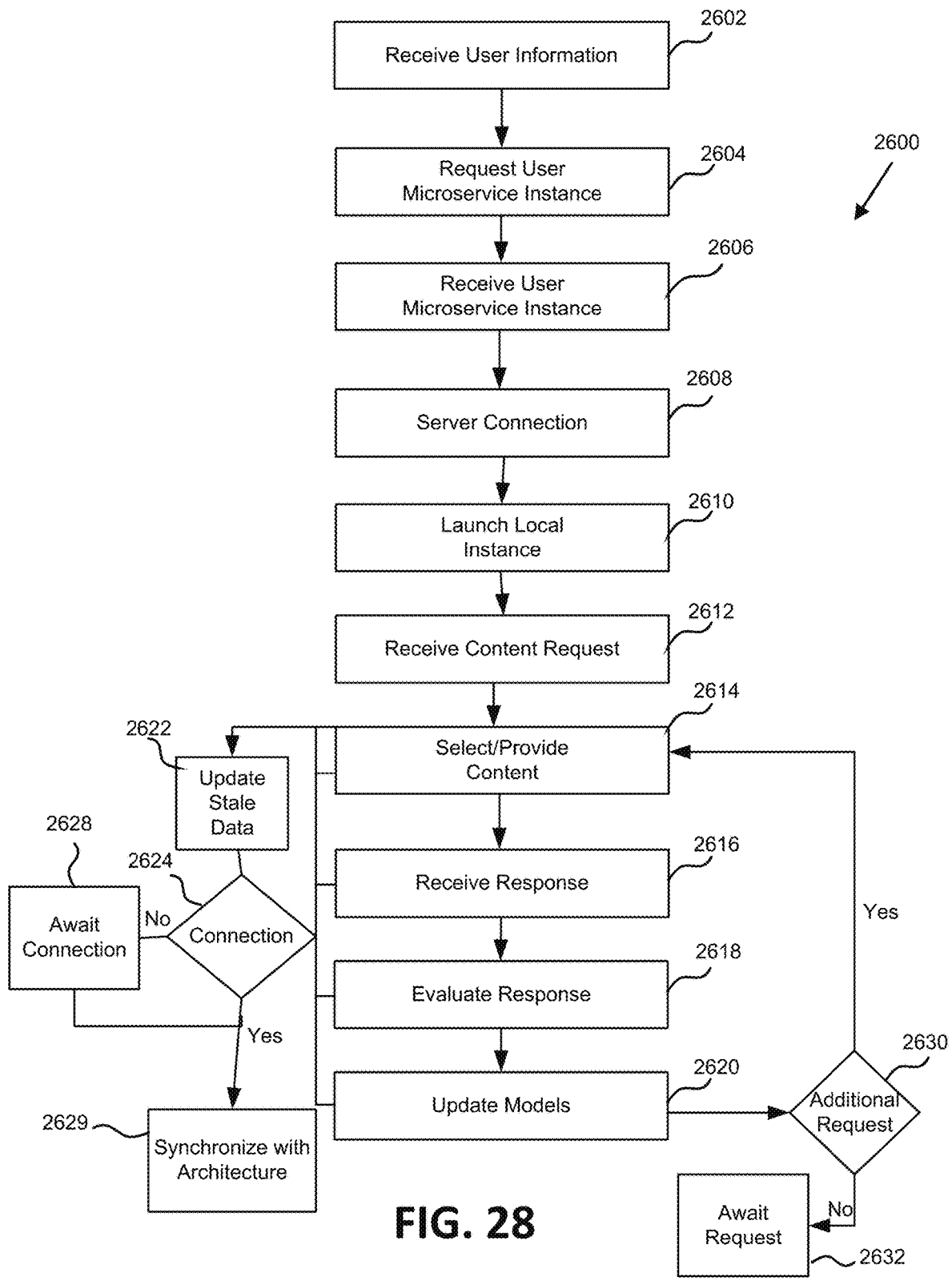
FIG. 28 is a flowchart illustrating one embodiment of a process for off-line operation of the user microservice.

With reference now to FIG. 28, a flowchart illustrating one embodiment of a process 2600 for off-line operation of the user microservice 2250 is shown. The process 2600 can be performed by the user microservice 2250, and specifically by an instance of the user microservice located on the user device 106 operating unconnected with the global architecture.

The process 2600 begins at block 2602, wherein user information is received. In some embodiments, this can comprise user login information and/or information identifying content and/or a group of content, such as a course requested by the user. The user information can be received by the user device 106, and specifically can be received by the client application running on the user device 106, which client application can include the user microservice 2250. In such an embodiment, the received user information can be validated by the authentication and authorization module 2405.

After the user information has been received, the process 2600 proceeds to block 2604, wherein a local user microservice 2250-B is requested. In some embodiments, this request can be made by the user device 106 to the global architecture 810, and specifically to the gateway API 970 which can communicate the request, in some embodiments via the cross-cutting services 1055, to the engagement delivery module 1020 and specifically to the microservices builder 2235 of the engagement delivery module 1020.

After the request for a local instance of the user microservice 2250-B, the process 2600 proceeds to block 2606, wherein the local instance of the user microservice 2250-B is received. In some embodiments, this can be received by the user device via the communication network, and specifically via communications with, for example, the gateway API 970. In some embodiments, the receipt of the local instance of the user microservice 2250-B can be accompanied by receipt of information relating to the user state, and specifically to the user's location in the knowledge graph. In some embodiments, this information can be retrieved by the learning asset retriever as part of the receipt of the local instance of the user microservice 2250. In some embodiments, one or several potential next learning assets can likewise be received as part of the receipt of the local instance of the user microservice 2250. These can be accompanied by information for use by the scoring engine 2425 in evaluating responses received one or several learning assets. Similarly, sequencing information for provided learning assets can be likewise provided to the local instance of the user microservice 2250. This information can include one or several models for adaptive sequencing, one or several rules or prerequisite relationships for non-adaptive sequencing, or the like. Information received simultaneous with the receipt of the local user microservice 2250-B can be stored in the database 2435.

After the local user microservice 2250-B has been received, the process 2600 proceeds to block 2608, wherein the connection with the global architecture 810 is lost. While depicted between blocks 2606 and 2608, the connection with the global architecture 810 can be lost at any point in the process 2600.

At block 2610, the local instance of the user microservice 2250, and specifically the local user microservice 2250-B is launched. In some embodiments, the local instance of user microservice 2250 can be launched within the client application of the user device 106. After the launch of the local instance of the user microservice 2250, the process 2600 proceeds block 2612 wherein a content request is received. The content request can be received by the I/O subsystem 526 of the user device and can be provided to the user microservice 2250. In some embodiments, the content request can be directed to the learning asset sequencer 2410, and/or, the recommendation engine 2415.

After the content request is been received, the process 2600 proceeds to block 2614 wherein content is selected and provided. The content can be selected and provided by one or both of the learning asset sequencer 2410 and the recommendation engine 2415. In some embodiments, the content, which can comprise one or several package-data assets can be selected by identifying the user's location in the knowledge graph, and identifying the next package-data asset based on the user's location in the knowledge graph, as well as, in some embodiments, one or several attributes of the user and/or the package-data asset. After the next package-data asset has been identified, the learning asset retriever 2420 can identify the next package-data asset within the database 2435, and can retrieve the next package-data asset.

After the next package-data asset has been selected, and/or provided, the process 2600 proceeds to block 2616, wherein a response is received. The response can be received by the I/O subsystem 526 of the user device 106 and can be provided to the scoring engine 2425. At block 2618 of process 2600, the received response is evaluated. In some embodiments, the received response can be evaluated by the scoring engine 2425, according to data stored in the database 2435. In some embodiments, this data can specify one or several rules for evaluating the received response, and/or criteria and/or attributes of a correct response. In some embodiments, the scoring engine 2425, can determine whether the received response is correct or incorrect, and/or determine the degree to which the received response is a correct response. In some embodiments, this can include determining a percent correct and/or points earned by the received response.

After the responses been evaluated, the process 2600 proceeds to block 2620 wherein one or several models are updated. In some embodiments, for example, this can include updating a model characterizing one or several attributes of the user such as, for example, a user skill level, a user mastery information, or the like. After the model so been updated, the process proceeds to decision state 2630, wherein it is determined if an additional content request is received. If an additional content request is received, then the process returns to block 2614, and proceeds as outlined above. Alternatively, if an additional content request is not been received, then the process 2600 proceeds to block 2632, and awaits a content request.

Simultaneous with, or after the completion of any of steps 2614 through 2620, the process 2600 can simultaneously proceed to block 2622 wherein state data is updated. In some embodiments, this can include, for example, updating state data within the user microservice 2250 to reflect provided content, a received response, and evaluated response, and/or the result of the evaluated response, and/or one or several updated models. The state data can be updated and can be stored in the database 2435.

After the state data has been updated, and/or simultaneous with the update of the state data, the process proceeds to decision state 2624 wherein it is determined if a connection has been reestablished. If the connection has not been reestablished, then the process 2600 proceeds to block 2628 and awaits for the reestablishment of a connection with the global architecture 810. Alternatively, if connection has been reestablished, or after connection has been reestablished, the process 2600 proceeds to block 2629, wherein state data on the local user microservice 2250-B is synchronized with state data in the global architecture. In some embodiments, the synchronization can be performed by the platform synchronizer 2440. Additionally, upon reestablishment of the connection between the local instance of the user microservice 2250 and the global architecture 810, event data that was captured while the local instance of the user microservice 2250 was unconnected can be provided to the event stream API 978.

The Analytics Module

Figure 29:
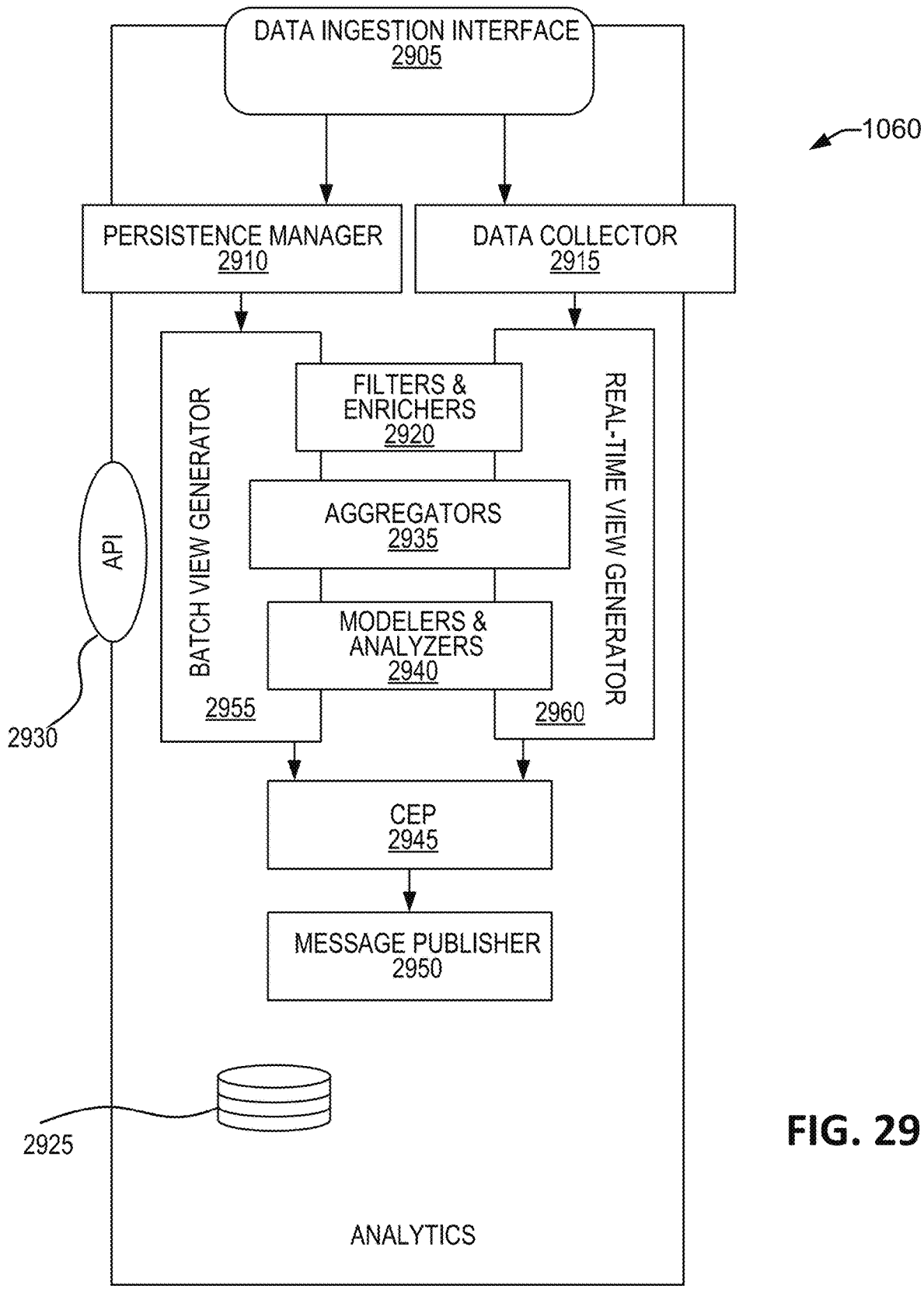
FIG. 29 is a schematic illustration of one embodiment of the analytics components.

With reference now to FIG. 29, a schematic illustration of one embodiment of the analytics components 1060, also referred to herein as the analytics module 1060 or the analytics subsystem, is shown. The analytics component 1060 can provide insight into the historical data captured from the recipient-user activity stream, the global architecture 810 APIs, and potentially other sources as well, in order to produce continuously updated models for reporting, royalties, usage, as well as to drive the learning experience. These models can assess mastery of learning objectives, efficacy of package-data assets, predict a recipient-user's behaviour or provide the data needed to recommend an adaptive path to follow during the learning of course. The analytics component 1060 also accumulates the information on which content has been viewed, and provides the data needed for reporting on utilization and other business and institutional management data. The analytic component 1060 supports both "batch" as well as near real-time event processing.

The analytics subsystem 1060 provides facilities to collect data at high speed, execute analytic models against that data, and to persist and supply access to the results. The analytics subsystem 1060 can provide the facilities of an "Analytics as a Service" ("AaaS") system to the rest of the global architecture 810 via plug-in model files, and permits access to analytic results to other subsystems at high speed through its API 2930. The analytics subsystem 1060 can also support near-real time (tens or hundreds of millisecond) notifications of events through a complex event processing subsystem and a pub/sub notification model.

In some embodiments, for example, the analytics subsystem 1060 receives the activity stream from the user device 106 and/or the client as well as other events passing through the global architecture 810. The analytics subsystem 1060 executes models against these and, along with other responsibilities, maintains constantly updated: student models that identify one or several student's mastery of learning objectives; efficacy models identifying the efficacy of one or several learning assets 1420; one or several difficulty models characterizing the difficulty of one or several package-data assets; one or several predictive and diagnostic models showing systematic sources of error that can be used as inputs into dynamic adaptive learning; and information on which content has been viewed that is needed to calculate royalties.

The analytic subsystem 1060 can monitor student activity and trigger appropriate actions in near real-time. For example, the system may raise a "Do you need help?" alert to a given student when his or her actions indicate that they are having trouble with a particular concept. The analytic subsystem 1060 can provide a place where machine-learning and other services can be plugged in. For example, machine-learning algorithms can be used to identify systematic sources of error for particular assessment questions, and return not only learning mastering information but also coaching tips that can be used by the recommendation engine to address specific misconceptions. The analytic subsystem 1060 can comprise the following components: the API 2930; the data ingestion interface 2905; the persistence manager 2910; the data collector 2915; the filters and enrichers 2920, the aggregators 2935; the modelers and analyzers 2940, the batch view generator 2955; the real-time generator 2960, the complex events processor 2945; and data store 2925.

The API 2930 can allow other global architecture 810 components to obtain information from the analytics subsystem 1060. The API 2930 can be used to call other global architecture 810 components. The data ingestion interface 2905 accepts incoming activity stream messages and API traffic at high speed and classifies it as either batch-mode data, that can be processed on a scheduled basis, or as data that must be processed in near real-time, such as alerts or requests for help. The data ingestion interface 2905 is a logical construct, and defines a single interface for each datatype, formatting the data for that type appropriately before ingesting it into the global architecture 810. The data ingestion interface 2905 may also be used to load batch data into the global architecture 810.

The persistence manager 2910 can manage the storage of incoming, unprocessed data for logging journaling and later processing and data mining. When the data is used by the analytics subsystem 1060 for batch and near real-time view generation, the data is stored in a polyglot persistent store, with the particular storage mechanism chosen based on the type of data. The persistence manager 2910 can be a logical unit which, in some cases, can be physically part of the client SDK. The persistence manager 2910 logical function can identify the data source and format of incoming data, and decide on the appropriate place and format in which to store it persistently. The persistence manager 2910 also profiles the data before storing it, in order to ensure that the data meets the particular security concerns of that data set. In some embodiments, for example, the persistence manage 2910 can identify a exclude PII data from being persisted.

The data collector 2915 caches and groups messages together. In some embodiments, this can occur in instances where meaning is spread across multiple messages. The data collector 2915 also untangles message streams so that messages relevant to a given client app or sequence of activity are serialized. In some embodiments of the analytics subsystem 1060 in the global architecture 810 there are two layers, a "batch" layer and a "speed" layer. The "the batch view generator 2955 generates the batch layer and computes those analytic results that are too computationally intensive to be done in near real-time. Typically, these operations will take minutes to hours to run, though they may take as little as tens of seconds. Whatever is "too long" for the user to wait for is done in "batch" mode. These batch operations can include, for example, big-data operations such as large map-reduce jobs that take a relatively long time to run. These long-running analytic operations can be performed on a scheduled or semi-continuous basis, hence the name "batch" layer.

The function of the batch layer can be both to (a) compute and maintain models that are relatively computationally intensive (for example, the student model) based on the latest data available, and (b) supply data that is combined with that of the speed layer so that decisions are made in near "real-time" using the "batch" data as context. For example, by combining speed layer and batch-layer data, a recommendation can be given in a couple of hundred milliseconds that takes the most up-to-date student model (tens of seconds or minutes old) into account. The output of the batch layer is both persisted and surfaced in a view where it can be combined with that generated by the "speed" layer to make context aware, near real-time decisions. The real-time view generator 2960 is the counterpart of the batch view generator 2955 discussed above, and corresponds to the "speed" layer global architecture 810 architecture. The speed layer executes analytic models that describe what is happening right now, in approximately the last 100 ms. As used herein, approximately identifies a range extending +/−5% around the therewith associated value, +/−10% around the therewith associated value, +/−15 around the therewith associated value, +/−20 around the therewith associated value, and/or any other or intermediate range around the therewith associated value. The speed layer is typically implemented using streaming technology. The results of speed layer processing are surfaced in a "real-time view" (more properly "near real-time view, as this data is typically a few hundred milliseconds old). The model processing components described below combine the "what's happening now" information supplied by the real-time view generator 2960, with the "context" information supplied by the batch view generator, to make contextualized near-real time decisions.

Filters and enrichers 2920 are two types of data transformation operations that the system can perform on combined batch and "real-time" view data. A filter screens out data unless it conforms to a certain pattern. An enricher adds data to what is already there, provided certain criteria are met. The application of these operations is determined by a model file. An aggregator 2935 combines data in certain ways defined by a model file. The aggregator 2935 gathers, groups, consolidates and summarizes information. Modelers and analyzers 2940 implement complex mathematical and other analytical models against data. They are driven by a model file that specifies which operations to perform. The complex event processor 2945 looks at the stream of already analyzed information and decides based on rules or analytic models which actions to take. The system is "complex" because it can evaluate multiple messages and multiple pieces of data and combine them in ways that are much more sophisticated than simple event-based rules. The message publisher 2950 is used by the complex event processor 2945 to notify interested parties that a complex event has occurred—for example, a student has asked for help, and that student is (a) currently enrolled in the course; (b) struggling with concepts x, y & z; (c) has been assigned a peer tutor, and (d) that peer tutor is out of town on holiday.

Data stores 2925 can be used to (a) persist raw, incoming data for logging, journaling and data mining purposes; (b) store processed analytic results, such as the student model, efficacy model, difficulty model, etc.; (c) provide federated or proxy access (views) to external data stores, such as student information systems (SIS) and learning management systems (LMS), whose contents are used within analytic models.

Figure 30:
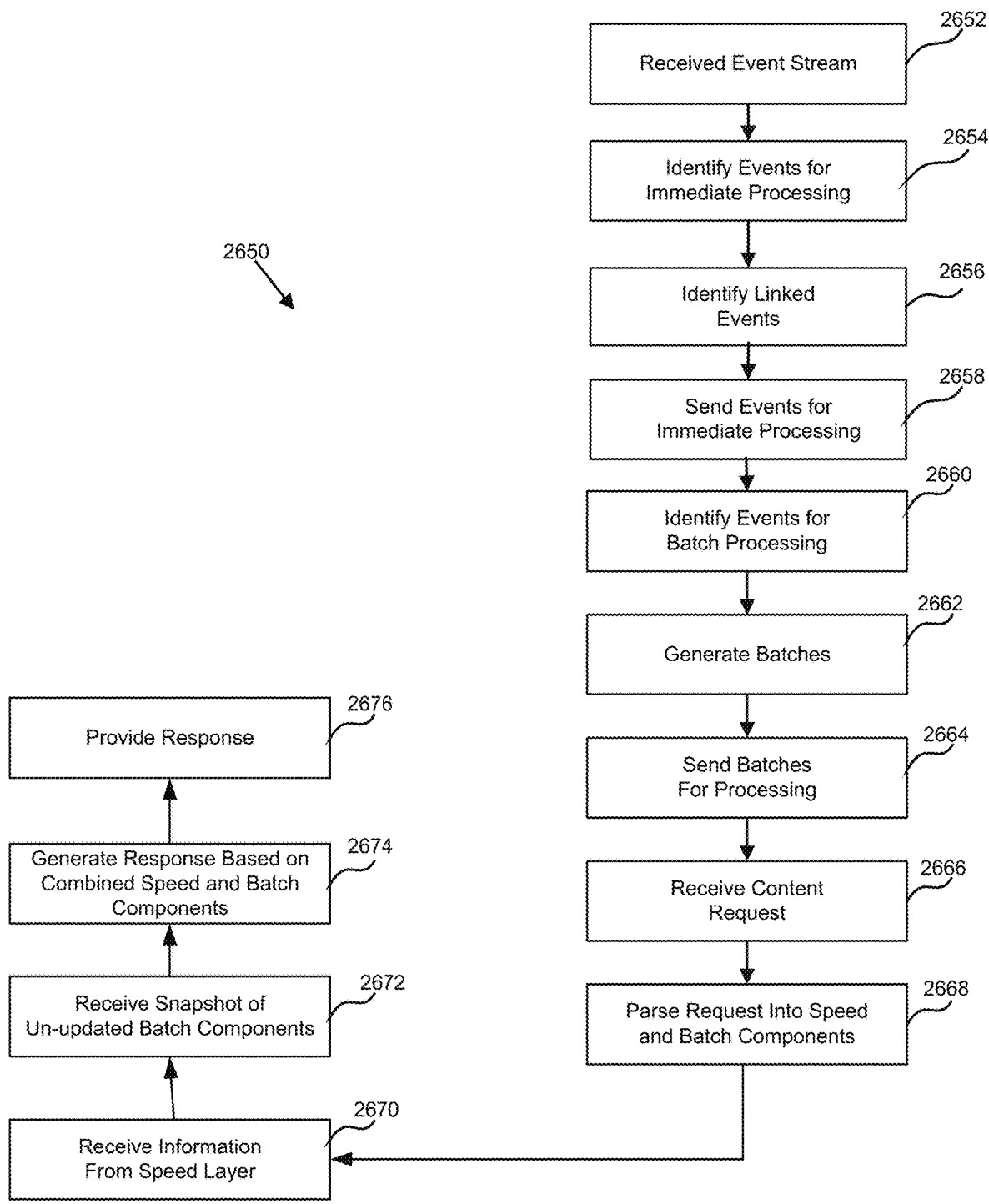
FIG. 30 is a flowchart illustrating one embodiment of a process for hybrid event processing.

With reference now to FIG. 30, a flowchart illustrating one embodiment of a process for hybrid event processing is shown. The process can be performed by the global architecture 810, and specifically by the analytic subsystem 1060. The process begins a block 2652 wherein an event stream is received. In some embodiments, the event stream is generated by the event stream API 978 based on activity data received from one or several client applications running on one or several user devices 106. The event stream can be received by the data ingestion interface 2905.

After the event stream has been received, the process 2650 proceeds to block 2654 wherein events for immediate processing identified. In some embodiments, for example, the data ingestion interface 2905 can accept incoming activity stream messages and API traffic at high speed and can classify events as either batch-mode data, that can be processed on a scheduled basis, or as data for processing in near real-time, such as alerts or requests for help. In some embodiments, for example, the data ingestion interface 2905 can classify events as either for immediate or batch processing based on one or several attributes of the events, which attributes can be carried and metadata associated with those events.

After events have been identified for media processing, the process 2650 proceeds to block 2656, wherein linked messages and/or events are identified. In some embodiments, for example, a message in the event stream may only have meaning in the context of one or several other messages. In some embodiments, identifying linked messages and/or events can include the operation of the data collector 2915 to identify such messages and/or events, and specifically to cache and group messages together when meaning or an event is spread across. In some embodiments, this can include receiving event data, determining if meaning is spread across multiple messages and/or events, and when meaning is spread across multiple messages and/or events, caching and/or storing the relevant messages and/or events. In some embodiments, the data collector 2915 can further untangle and/or serialize these cached and/or stored messages and can properly sequence these cached and/or stored messages to facilitate evaluation of these messages and/or events and the extraction of meaning from the same.

After the linked messages and/or events have been identified, the process 2650 proceeds to block 2658, wherein events for identified for immediate processing are sent for immediate processing. In some embodiments, this can include the sending of these messages and/or events to the real-time view generator 2960. In some embodiments, such messages and/or events can be filtered and/or enriched by the filters and enrichers 2920, and/or aggregated by the aggregators 2935. In some embodiments, these messages, and/or events can be used by the modelers and analyzers 2942 update one or several models.

At block 2660 events and/or messages for batch processing identified. In some embodiments, this can be performed by the data ingestion interface 2905 and can be performed simultaneous with the step of block 2654. In some embodiments, messages, and/or events identified for batch processing can be managed by the persistence manager 2910, which can store these messages, and/or events, and which can generate batches for batch processing as indicated in block 2662. In some embodiments, these batches can be defined by the passing of a predetermined amount of time since the creation and/or generation of the last batch.

When a batch has been completely formed, such as when the amount of time for aggregation of a batch has passed, the batch can be sent for processing. In some embodiments, the batch can be sent by the persistence manager 2910 to the batch/view generator 2955. For processing. The batch/view generator 2955, can filter and/or in rich events within the batch via the filters and enrichers 2920, and/or aggregate the events within the batch via the aggregators 2935. In some embodiments, batch processing can be used to update one or several models with the modelers and analyzers 2940.

In some embodiments, subsequent to the performing the batch processing, the batch/view generator 2955 outputs a data stream to the CFP 2945. Similarly, subsequent to the performing of immediate processing, the real-time view generator 2960 outputs a data stream to the CFP 2945. The CEP 2945, can evaluate the stream of data, and, based on rules or analytic models, identify one or several actions. In some embodiments, these one or several actions can address an anomaly identified by the CEP 2945. Subsequent to processing by the CFP 2945, the message publisher 2950 can publish the results of one or both of the batch processing, and the immediate processing, as well as the results of the processing by the CFP 2945.

At block 2666, a content request is received, the global architecture 810. At block 2668 this received content request is parsed into a speed component for which data from speed processing is desired, and a batch component for which data from batch processing is desired. After the parsing of the request, the process 2650 proceeds to block 2670 wherein information from the speed layer or from immediate processing is received. In some embodiments, this is received via the digest outputted by the message publisher 2950. At block 2672, a snapshot of one or several on updated batch component information is received. In some embodiments, this snapshot may not reflect variation due to events designated for batch processing that have not yet been processed. However, batch component information may not be sensitive to such processing delays.

After the snapshot of un-updated batch components has been received, the process 2650 proceeds to block 2674 wherein a response is generated based on a combination of speed and batch components. Once this responses been generated, the process 2650 proceeds to block 2676 wherein a response to the content request of 2666 is provided.

Cross Cutting Services

Figure 31:
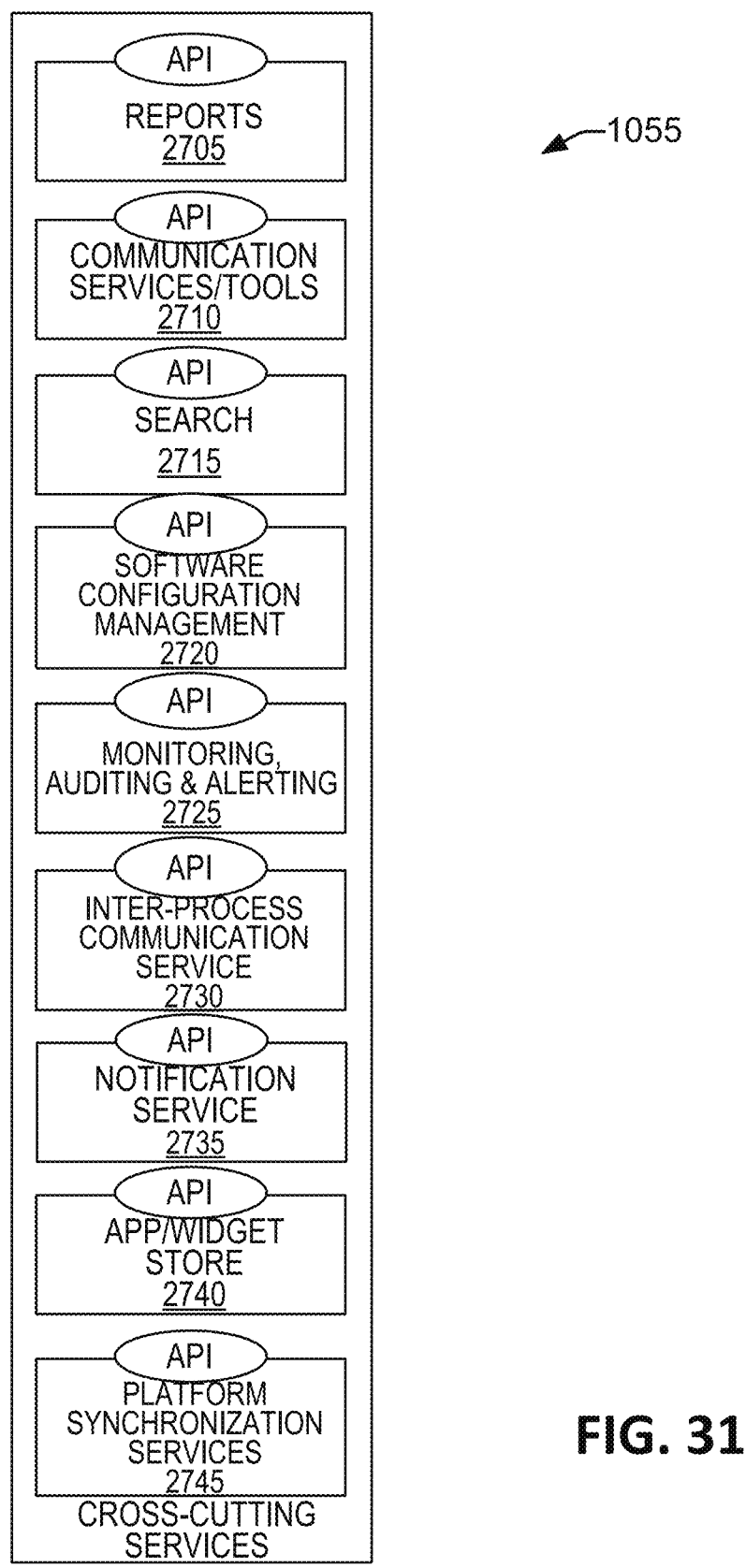
FIG. 31 is a schematic illustration of the cross cutting services microservice.

With reference now to FIG. 31, a schematic illustration of the cross cutting services microservice 1055, also referred to herein as the communications microservice 1055 is shown. The communications microservice 1055 can provide the services that have a scope across all other microservices in the global architecture 810. These services can include, for example, either the infrastructure services such as logging, monitoring, auditing, inter-process communication, etc. or the consumer services such as notification services, reports, etc. The API management and security microservice 1015 can be the entry point into the global architecture 810. The services published by the global architecture 810 can be accessed through the API management and security microservice 1015, which in turn can invoke the appropriate microservices of the global architecture 810. The API management and security microservice 1015 can be the gatekeeper of the global architecture 810 and manages, authenticates, discovers, and routes requests from global architecture 810 API consumers. In some embodiments, the communications microservice 1055 can function as a virtual communication bus that can receive data inputs from other components and/or microservices of the global architecture 810 and can use those received data inputs to generate a digest which is then outputted by the communications microservice 1055. This digest can be continuously delivered in real-time as new data is received by the communications microservice 1055. The other components and/or microservices of the global architecture 810 can subscribe to this digest and can filter and/or scan the digest for information. When this information is identified, this information can be used by the other components and/or microservices to perform one or several actions.

The cross-cutting services microservice 1055 "cut across" all of the other microservices on the global architecture 810. Cross-cutting services microservice 1055 comprises multiple microservice including the reports microservice 2705, the communication services/tools microservice 2710, the search microservice 2715, the software configuration management microservice 2720, the monitoring, auditing and alerting microservice 2725, inter-process communication service microservice 2730, notification service microservice 2735, app/widget store microservice 2740, and platform synchronization services microservice 2745. The reports microservice 2705 allows clients access, via data marts, to the data warehouse that stores the reports as well as other data retrieved from the global architecture 810. The reports microservice 2705 can be an external engine which supports the following described functions. Analytical query that encapsulates the information resulting from running any standard statistical, predictive or machine learning algorithms. SQL query function that can be a standard SQL 92/2011 compliant query of one of following three types: BQ—signifying the type which is required to run only on batch mode; RQ—signifying the query which needs the access of most recently produced data; and CQ—signifying the query which needs to run against both ancient and recently produced data. The reports microservice 2705 can create pre-processed reports. This request executes and produces a pre-processed report that was previously created and stored for later retrieval. The reports microservice 2705 can asynchronously consolidate the data from all of the microservices in the global architecture 810 and/or in the cross-cutting services microservice 1055. In some embodiments, this can free the rest of the global architecture 810 from performance and scaling issues. To support near real-time reporting, the entire paradigm can support eventual consistency using steaming services such as AWS Kinesis/Spark Streaming to keep updating the reporting database, so that the reporting is as close to real-time as is possible.

The search microservice 2715 can be a service which contains all the indexed data from the other microservices databases and acts as a free text search microservice. As for the reports, the same principle of creating a microservice to receive the data asynchronously as well as via streams is enabled. The query service provides full text searches. The search microservice 2715 automatically re-indexes data through a scheduler service, which re-indexes the data based on rules. The search microservice 2715 supports the following options: fielded search; free-text search; pagination; faceting or delivering searches based on aspects and facets; and caching of popular searches. Because of the adaptive display of resources to recipient-users, personalization of search results to an individual recipient-user may take into account the paths the recipient-user has taken and/or may potentially take or have taken in traversing the available content. In other words, in an adaptive situation the recipient-user will not necessarily see all the content that is potentially available to them within a given product, so the search results are tailored according to the paths already taken or potentially to be taken.

The software configuration management microservice 2720 provides an API to track and control changes in the global architecture 810 and software being used in the global architecture 810. This includes revision control and the establishment of baselines. Since the global architecture 810 is an auto scaling, self-configuring, self-managing entity, this service controls and tracks changes made to the service in order to help with the following: providing accurate configuration information to assist decision making, e.g. the authorization of changes, the planning of releases, and to help resolve incidents and problems faster; and maintaining accurate configuration by ensuring the definition of control of the components making up a service and its infrastructure.

The monitoring, auditing and alerting microservice 2725 comprises monitoring, auditing, and alerting components. The monitoring component provides real-time insight into how many instances are deployed, depth of queues, resource utilization, and other factors. The auditing component can identify any data that has been changed in the system and/or within any entity. Auditing component functions can include: the auditing component captures the data that has been changed hat is then sent asynchronously to the appropriate API; the auditing component captures all data changes in a sequential manner, with timestamps; all entities in the system are audited, and all changes are pushed via asynchronous methods to a data store; the auditing component can be durable, highly reliable and fault tolerant to insure changes are captured; and the auditing component can provide an easy way to view the API/engine to show the audit trail for any entity in the system, and allow mapping to the corresponding audit trail. The alert component can raise alerts, which alerts can identify one or several problems identified, in for example, the audit trail for any entity in the system.

The inter process communication service microservice 2730 provides a consistent way for different microservices to queue events or actions one after the other, so that a larger workflow encompassing multiple microservices is enabled. The inter process communication service microservice 2730 provides a stable and consistent way for all microservices to communicate with each other and any microservice can be called or can call any other microservice provided that certain conditions and policies are met. In short, the inter process communication service microservice 2730 can implement a message-passing interface which allows for request-reply as well as pub-sub models to provide for use of services where services "know" each other as well as when services do not have knowledge of each other. The notification services microservice 2735 provides a mechanism to message other systems/devices/users or clients when a near-real time alert condition occurs or when the system needs to send a communication apprising the entity of the current situation. When other microservices need to raise a notification, they call the notification services microservice 2735 service which does the actual job of raising the notification.

The APP/WIDGET STORE microservice 2740 comprises a plurality of widgets. Widgets can be UI components developed to render a particular service or group of services provided by the global architecture 810. UI components can have the ability to operate in two modes, offline and online, and are downloaded into the client app as "plug-and-play" based on need and current task. Players can be a specific type of components which render specific types of learning content provided by the global architecture 810, generally for reverse compatibility with legacy content types. The use of "Origami" widgets to populate components and to render text metadata (such as section headings) gives the global architecture 810 the option of ensuring the same look and feel across devices—for high-stakes assessment preparation, for example—or using the device-native experience that many users prefer. Widgets/Components provide global architecture 810 resources (for example, a note taking widget), interactivity (e.g. choice lists for assessment questions), and also render content, including narrative, "rich" and assessment-type content. The global architecture 810 does not itself contain content; rather it contains references to the required content, and to metadata associated with that content. These references are created when content is provisioned. When content or associated content metadata is rendered by the client, the client fetches it directly from the CMS or CDN without going through the global architecture 810. The allows for maximum scale and for the use of content delivery networks to cache content at the edges of the network to minimize retrieval times.

Enabling Services

Figure 32:
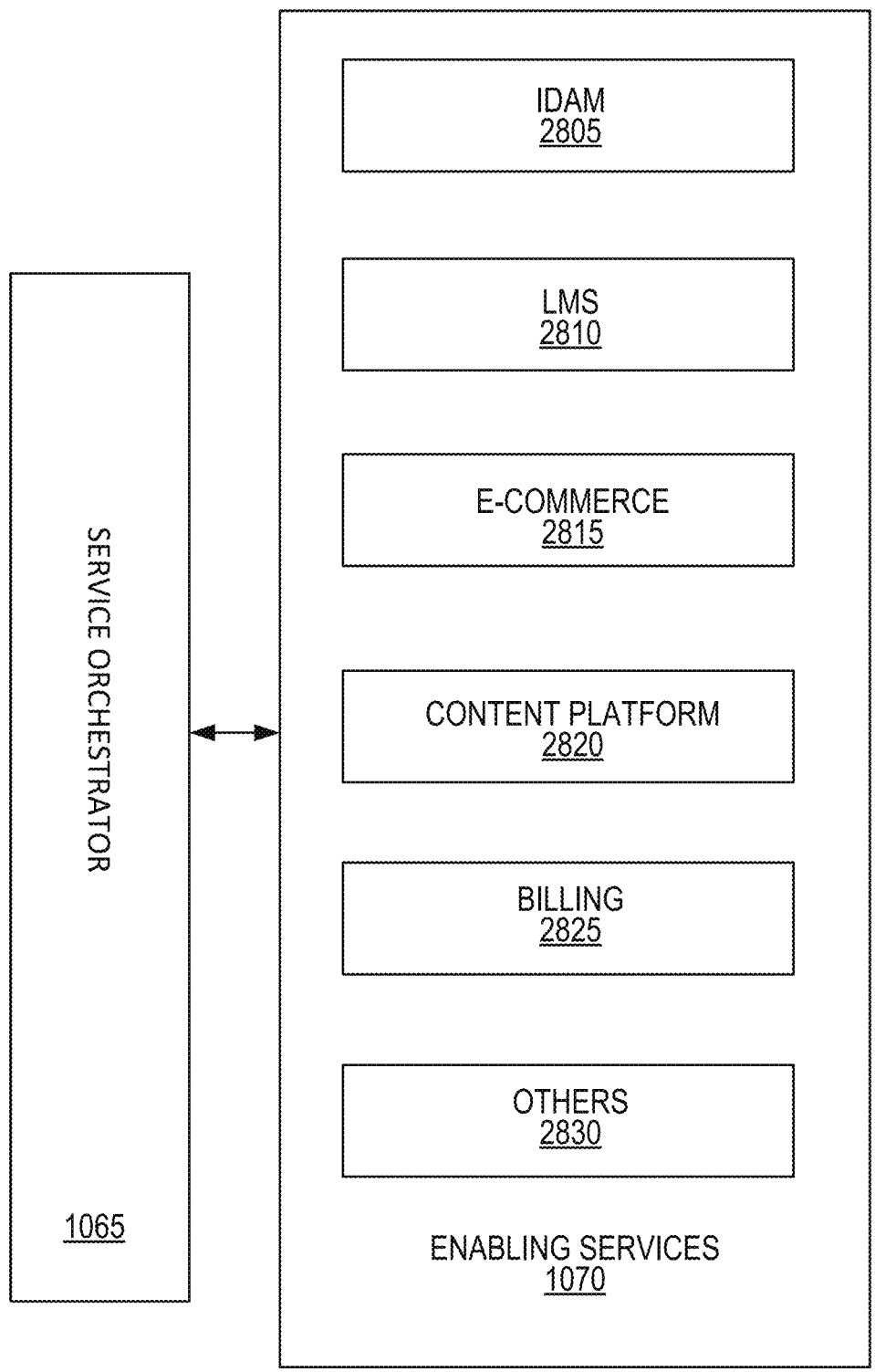
FIG. 32 depicts a detailed block diagram of the enabling services component in connection to the service orchestrator component.

With reference now to FIG. 32, depicts a detailed block diagram of the enabling services component 1070 in connection to the service orchestrator component 1065. Service orchestration can be the process of integrating two or more services together to automate a process, or synchronize data in real-time. The global architecture 810 uses a Service Orchestrator 1065 in this architecture to provide the global architecture 810 with a single, simple and consistent methodology to interact with all $3^{rd}$ Party Data Sources. The service orchestrator component 1065 communicates with the enabling services component 1070 over an enterprise service bus. The enabling services component 1070 is comprised of components including: an identity access and management component 2805, a learning management solution component 2810, an e-commerce component 2815, a content platform component 2820, a billing component 2835, and any other components 2830.

The identity access and management component 2805 provides single sign-on (SSO), social sign-on, adaptive authentication, strong authentication, federation, self-service, adaptive risk, web services security, and fine-grained authorization. At the highest level identity access and management component 2805 consists of a single, self-contained Java application; service components such as stateful or stateless session management; client-side APIs in C, Java, and REST; service provider interfaces to enable custom plugins; and policy agents for web and app server containers to enforce access policies to protected web sites and services. The learning management solution component 2810 is a software application for the administration, documentation, tracking, reporting and delivery of electronic educational technology (also called e-learning) courses or training programs. Colleges, universities and schools use the learning management solution component 2810 to manage their students and the global architecture 810 integrates with them, so as to provide a seamless experience to the recipient-user. The learning management solution component 2810 is a framework that handles all aspects of the learning process. It delivers and manages instructional content, identifies and assesses individual and organizational learning or training goals, tracks the progress towards meeting those goals, and collects and presents data for supervising the learning process of the organization as a whole.

The global architecture 810 supports the ability of recipient-users to buy titles and to show these products based on a pricing strategy that needs to support globalization, payments, etc. using the e-commerce component 2815. The e-commerce component provides web catalog management, order management, a shopping cart, and a payments engine. Web catalog management: is a system that ensures the quality of the data and its configurability to the recipient-user's required format. It's a system that allows suppliers to quickly broadcast updates and introduction of new items. Order Management is the administration of business processes related to orders for global architecture 810 products. The system automates and streamlines order processing for business. The system generally manages vendors and order fulfilment. The shopping cart is a digital place where recipient-users can store global architecture 810 products and construct an order for eventual consumption through multiple channels, and the ecommerce system can manage and maintain the cart for each and every user of the system. The payments engine: can be a streamlined end to end payment processing on the global architecture 810.

Figure 33:
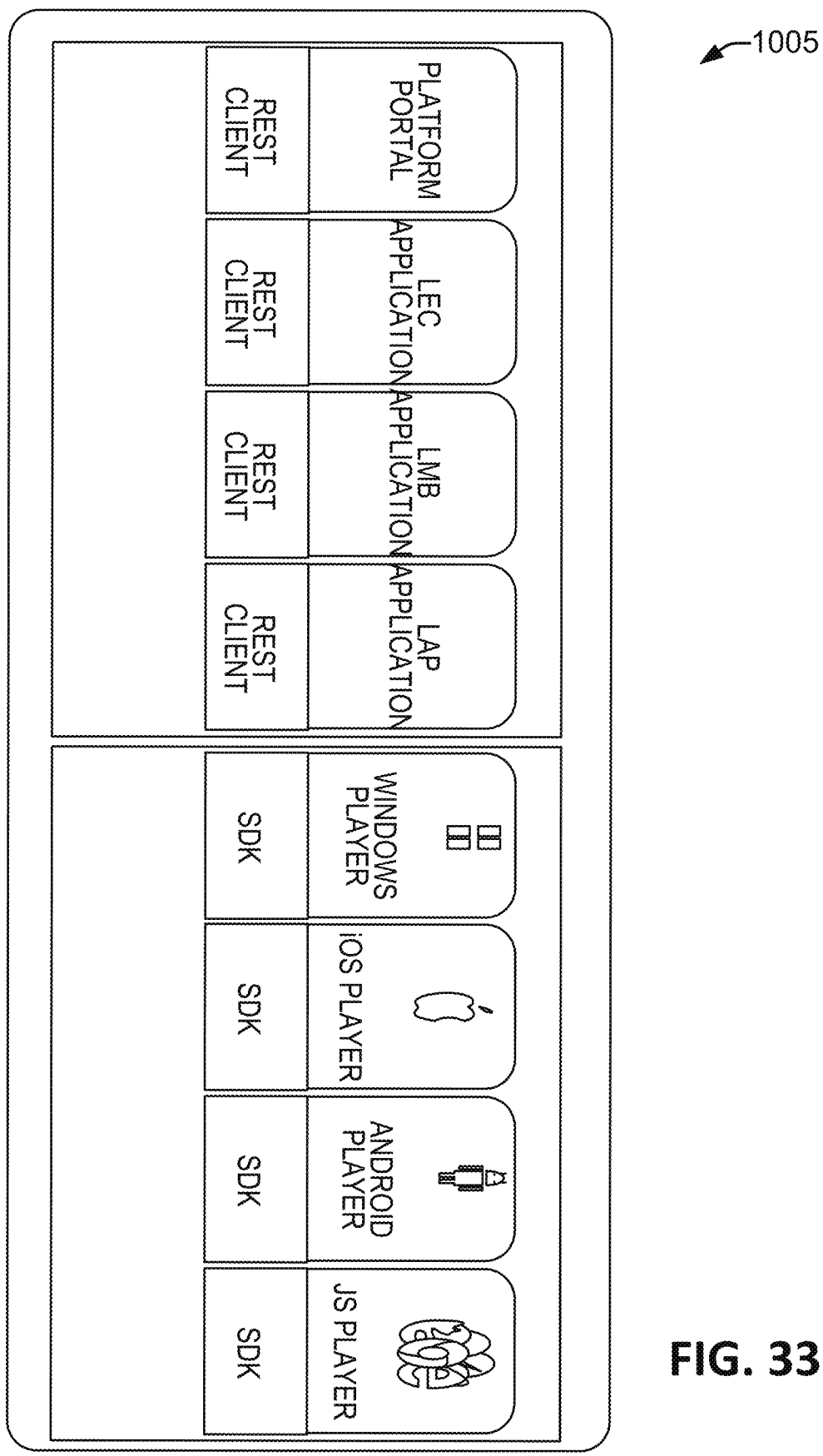
FIG. 33 is a detailed block diagram of one or several applications.

FIG. 33 is a detailed block diagram of applications 1005. At a high level, Application 1005 functions are distributed into the components described below. The Software Development Kit is a set of libraries that interact with the global architecture 810 APIs and provide various facilities—such as default widgets, dynamic widget loading mechanisms, etc.—that are useful to application developers on a given global architecture 810. There can be multiple SDKs, each specific to their respective Web or device OS (iOS, Android, etc.) global architecture 810. In some embodiments, player can be the end user applications or client which render the learning content provided by the Global learning platform 810. From the perspective of the global architecture 810, Applications 1005 can be the UI for the various microservices that make up the Global learning platform 810. As used herein, the combination of an SDK, along with a container, with components and Players make up an application.

Figure 34:
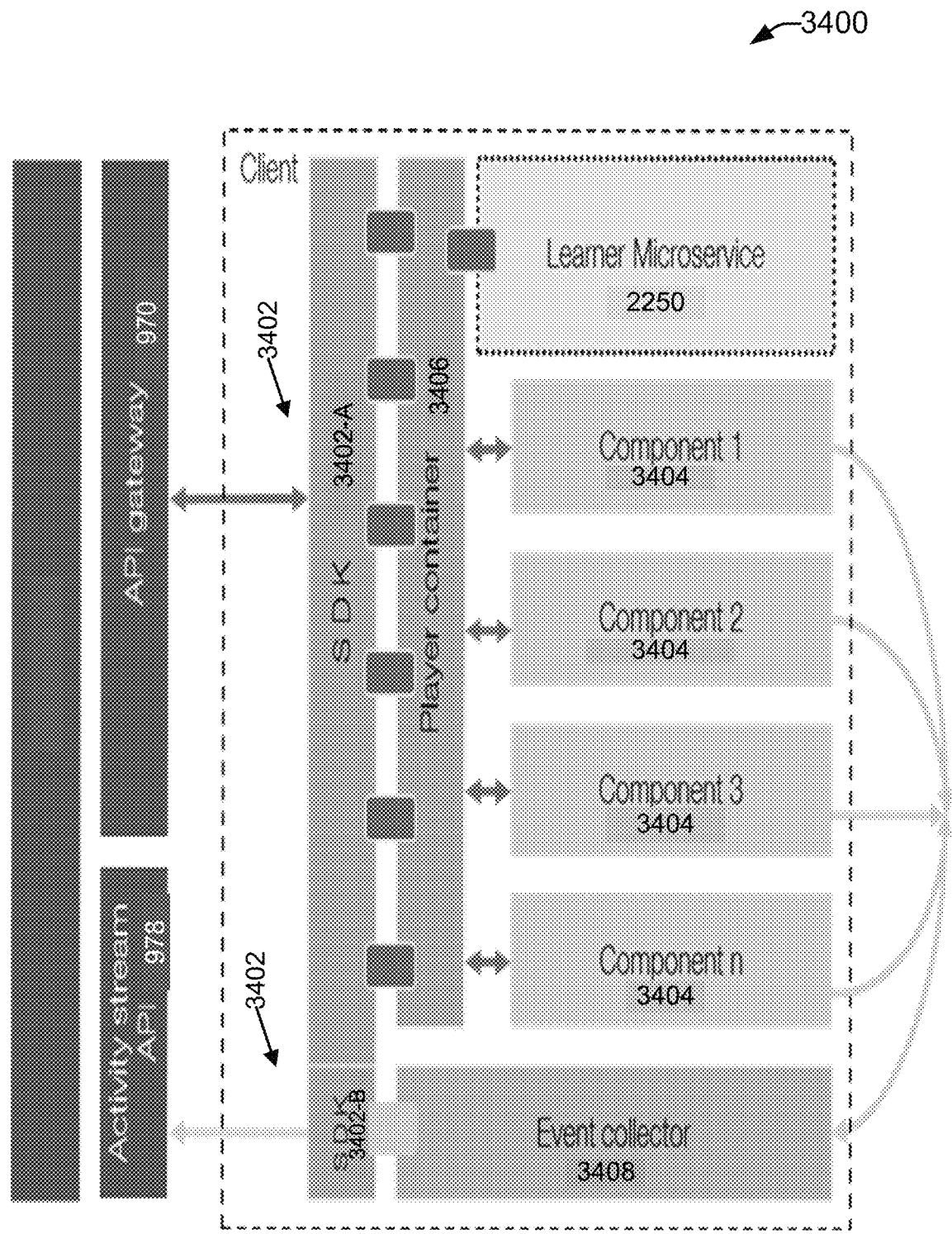
FIG. 34 is detailed block diagram of one embodiment of a client architecture of a client application.

FIG. 34 is detailed block diagram of one embodiment of a client architecture 3400 of a client app. In some embodiments, a single client architecture 3400 can be provided and/or customized for each environment supported—one client architecture 3400 for the Web, one client architecture 3400 for iOS, etc. The "look and feel" of the client UI can be configurable through the content plan, style sheets, and the rendering components that are dynamically loaded.

In other words, the client can be an all-purpose "reader" for all types of native content of the global architecture 810.

The client architecture 3400 can be built around a "software development kit" (SDK) 3402 that can control and/or regulate interactions with the API gateway 970. The SDK 3402 can be a set of libraries. The SDK 3402 can be provided for the Web, and additional SDKs 3402 can be specific to each OS or platform to be supported. In some embodiments, each SDK encapsulates the same functionality for the implementation of clients) on each platform (Web, Android, iOS, Xbox, etc.). In some embodiments, each of the clients supporting the client architecture 3400 will have the SDK 3402 to "talk" to the global architecture 810. In some embodiments, for example, the client architecture 3400 can comprise a first SDK 3402-A that can facilitate communication with the API gateway 970 and a second SDK 3402-B that can facilitate communication with the activity stream API 978.

The client architecture 3400 can include a plurality of components 3404. The components 3404 can be widgets or UI components developed to render a particular service or group of services provided by the Platform. The components 3404 can provide resources (for example, a note taking widget), interactivity (e.g. choice lists for assessment questions), and also render content, including narrative, "rich", and assessment-type content. The client architecture 3400 can further include a player container 3406. The player container can facilitate in the proper loading and/or unloading of components or other resource components.

Additionally, in some embodiments, the client architecture 3400 can include a user microservice 2250 and an event collector 3408. The event collector can generate a semanticized stream of collected activity data characterizing user interactions with all or portions of the client architecture 3400. In some embodiments, this semanticized stream of collected activity data can be formulated into one or several events. In some embodiments, the event collector 3408 semanticizes and sends to the global architecture 810 each interaction had by the user with the user device 106 operating the client app. In some embodiments, these events and/or the semanticization of the events can be performed by the event collector 3408, and in some embodiments, these events and/or the semanticization of the events can be created by other portions of the client app or client architecture 3400.

The event collector 3408 can send the events to the second SDK 3402-B, also referred to herein as the events SKD 3402-B. The events SDK 3402-B, sends the events received from the event collector 3408 to the activity stream API 978. In cases where the client app is disconnected and the learner microservice 2250 is installed and running locally, the local instance of the learner microservice 2250 can also receive these events from the events SDK 3202-B. The local instance of the user microservice 2250 can use this event information to support current interactively, and also to cache the events locally for later transmission to the global architecture 810 when the client app re-connects with the global architecture 810.

The components 3404 and/or the user microservice 2250 can connect to the container 3406, which can in turn connect to the first SDK 3402-A. The first SDK 3402-A can communicatingly connect with the API gateway 970 to send data such as response data to the global architecture 810 and to receive data such as one or several package-data assets from the global architecture 810.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein, the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read-only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for hybrid content provisioning of remote content stored on a remote content platform and native content stored within the system, the system comprising:
    a memory comprising:
        a content library database containing native content; and
        an asset database comprising a plurality of package-data assets each comprising a link directing to content, wherein the content comprises native content and remote content, wherein the remote content is stored on the remote content platform;
    at least one server comprising: a communications microservice; a data packaging module; a model building module; and an engagement delivery module, wherein each of the data packaging module, the model building module, and the engagement delivery module are configured to send data to the communications microservice and receive a digest from the communications microservice, and wherein the at least one server is configured to:
        receive first content information associated with first content stored on the remote content platform;
        package the received first content information into a first package-data asset comprising a link directing to first content stored on the remote content platform and enrich the first package-data asset with metadata relating to the received first content, wherein the received first content information is packaged and wherein the first package-data asset is enriched via the data packaging module;
        receive a first content request;
        identify a first package-data asset associated with remote content;
        deliver the first package-data asset to a user device;
        receive a second content request;
        identify a second package-data asset associated with native content; and
        deliver the second package-data asset to the user device.

2. The system of claim 1, wherein the first package-data asset is deliverable to the user device subsequent to receipt of an indicator of completion of enriching from the digest from the communications microservice.

3. The system of claim 2, wherein the at least one server is further configured to:
    receive second content information associated with the second content, wherein the second content comprises native content;
    package the received second content information into a second package-data asset comprising a link directing to the second content; and
    enrich the second package-data asset with metadata relating to the second content.

4. The system of claim 3, wherein the received second content information is packaged via the data packaging module, and wherein the second package-data asset is enriched via the data packaging module.

5. The system of claim 4, wherein the at least one server is further configured to: store the first package-data asset and the second package-data asset in the asset database.

6. The system of claim 5, wherein the metadata enriching the first package-data asset identifies a first content type and wherein the metadata enriching the second package-data asset identifies a second content type.

7. The system of claim 6, wherein the first content type specifies a file type of the first content linked by the first package-data asset and the second content type specifies a file type of the second content linked by the second package-data asset.

8. The system of claim 7, wherein the file type of the first content is the same as the file type of the second content.

9. The system of claim 8, wherein the at least one server is further configured to determine a type of each of the first package-data asset and the second package-data asset.

10. A method for hybrid content provisioning of remote content stored on a remote content platform and native content, the method comprising:
    receiving at least one server first content information associated with first content stored on a remote content platform;
    packaging with the at least one server the received first content information into a first packaged data-asset comprising a link directing to content stored on the remote content platform;
    enriching with the at least one server the first packaged data-asset with metadata relating to the received content;
    receiving at the server a first content request from a first user device;
    identifying a first package-data asset associated with remote content;
    delivering the first package-data asset to the first user device;
    receiving at the server a second content request from the first user device;
    identifying a second package-data asset associated with native content; and
    delivering the second package-data asset to the first user device.

11. The method of claim 10, wherein the at least one server comprises: a communications microservice; a data packaging module; a model building module; and an engagement delivery module.

12. The method of claim 11, wherein the received first content information is packaged via the data packaging module, and wherein the first package data-asset is enriched via the data packaging module.

13. The method of claim 12, wherein each of the data packaging module, the model building module, and the engagement delivery module send data to the communications microservice and receive a digest from the communications microservice.

14. The method of claim 13, wherein the first package-data asset is deliverable to the user device subsequent to receipt of an indicator of completion of enriching from the digest from the communications microservice.

15. The method of claim 14, further comprising:
    receiving second content information associated with the second content, wherein the second content comprises native content;
    packaging the received second content information into a second package-data asset comprising a link directing to the second content; and
    enriching the second package-data asset with metadata relating to the second content, wherein the received second content information is packaged via the data packaging module, and wherein the second package-data asset is enriched via the data packaging module.

16. The method of claim 15, further comprising storing the first package-data asset and the second package-data asset in an asset database comprising a plurality of package-data assets each enriched with metadata and each comprising a link directing to associated content.

17. The method of claim 16, wherein the metadata enriching the first package-data asset identifies a first content type and wherein the metadata enriching the second package-data asset identifies a second content type.

18. The method of claim 17, wherein the first content type specifies a file type of the first content linked by the first package-data asset and the second content type specifies a file type of the second content linked by the second package-data asset.

19. The method of claim 18, wherein the file type of the first content is the same as the file type of the second content.

20. The method of claim 19, further comprising: determining a type of each of the first package-data asset and the second package-data asset.

* * * * *